(12) United States Patent
Mori

(10) Patent No.: US 7,506,832 B2
(45) Date of Patent: Mar. 24, 2009

(54) MOTORIZED RETRACTOR

(75) Inventor: Shinji Mori, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 603 days.

(21) Appl. No.: 11/103,514

(22) Filed: Apr. 12, 2005

(65) Prior Publication Data

US 2005/0224621 A1    Oct. 13, 2005

(30) Foreign Application Priority Data

Apr. 13, 2004 (JP) .............................. 2004-117915
Sep. 2, 2004 (JP) .............................. 2004-256079

(51) Int. Cl.
*B60R 22/46* (2006.01)

(52) U.S. Cl. .................................. 242/374; 242/390.8

(58) Field of Classification Search ................ 242/374, 242/390.8, 390.9; 280/806, 807; 297/475, 297/476, 477, 478; 192/74, 75, 76, 103 B, 192/105 CD, 105 CE See application file for complete search history.

(56) References Cited

U.S. PATENT DOCUMENTS

| | | | | |
|---|---|---|---|---|
| 1,972,915 A | * | 9/1934 | Barton ........................ | 192/35 |
| 3,625,326 A | * | 12/1971 | Rix et al. ...................... | 192/45 |
| 4,592,520 A | * | 6/1986 | Kawaguchi ................. | 242/372 |
| 4,669,680 A | * | 6/1987 | Nishimura et al. ....... | 242/375.3 |
| 6,343,759 B1 | * | 2/2002 | Specht ..................... | 242/375.1 |
| 6,427,935 B1 | * | 8/2002 | Fujii et al. ................ | 242/390.9 |
| 2001/0045483 A1 | * | 11/2001 | Tanaka et al. ............ | 242/390.9 |
| 2003/0116956 A1 | * | 6/2003 | Bullinger et al. ............ | 280/806 |
| 2003/0224887 A1 | * | 12/2003 | Bullinger et al. ............ | 474/101 |
| 2004/0021029 A1 | * | 2/2004 | Eberle et al. ............. | 242/390.9 |

FOREIGN PATENT DOCUMENTS

| | | |
|---|---|---|
| JP | 2001-63522 | 3/2001 |
| JP | 2001-163186 | 6/2001 |
| JP | 2001-347923 | 12/2001 |

* cited by examiner

*Primary Examiner*—Peter M Cuomo
*Assistant Examiner*—Scott Haugland
(74) *Attorney, Agent, or Firm*—Roberts Mlotkowski Safran & Cole, P.C.; Thomas W. Cole

(57) ABSTRACT

A motorized retractor which includes a spool with a webbing wound therearound, a reversible motor, a forward and a reverse driving force transmission mechanisms. The forward and the reverse driving force transmission mechanisms are provided between the spool and an output shaft of the motor, respectively. The forward driving force transmission mechanism reduces forward rotation of the output shaft by a predetermined reduction ratio and transmits this rotation to the spool for rotating the spool in a winding direction. The reverse driving force transmission mechanism reduces reverse direction rotation of the output shaft by a reduction ratio which is lower than the predetermined reduction ratio of the forward driving force transmission mechanism, and transmits this rotation to the spool for rotating the spool in the winding direction. The forward and the reverse driving force transmission mechanisms both block transmission to the output shaft of rotations generated at the spool side.

4 Claims, 35 Drawing Sheets

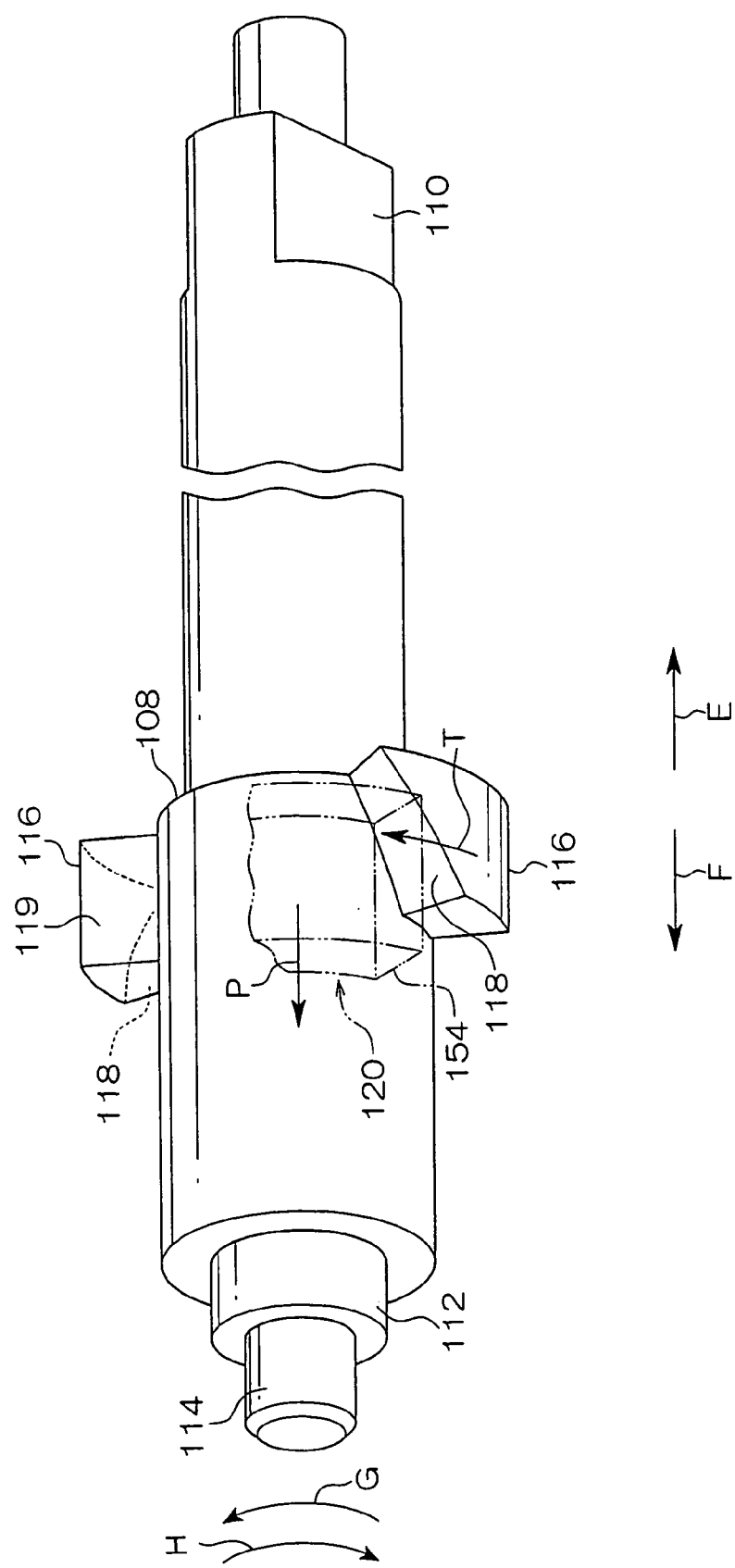

MOTORIZED RETRACTOR

CROSS-REFERENCE TO RELATED APPLICATION

This application claims priority under 35 USC 119 from Japanese Patent Application Nos. 2004-117915 and 2004-256079, the disclosures of which are incorporated by reference herein.

BACKGROUND OF THE INVENTION

1. Field of the Invention

The present invention relates to a motorized retractor which is employed at a seat belt apparatus for restraining the body of an occupant sitting on a seat of a vehicle or the like with a webbing, and which enables winding and unwinding of the webbing.

2. Description of the Related Art

A seatbelt apparatus which restrains an occupant sitting in a seat with a long belt-form webbing is attached to a vehicle such as a passenger car or the like. Among such seatbelt apparatuses, a "three-point"-type seat belt apparatus is equipped with a retractor (a webbing winding device) which stores the webbing in a wound state and retains the webbing to be unwindable.

The retractor is provided with a winding spool and an urging member, such as a spiral spring or the like. A length (longitudinal) direction base end side of the webbing is anchored at the spool, and the webbing is wound onto the spool, from the base end side, by rotation of the spool. The urging member urges the spool in a direction for winding up the webbing. At a seat belt apparatus which is equipped with this retractor, when an occupant has applied the webbing, the spool is urged in the direction for winding up the webbing by urging force of the urging member. As a result, slack of the webbing is taken up and the webbing restrains the occupant. Hence, when the occupant releases the state of application of the webbing, the webbing is wound onto the spool by the urging force of the urging member.

At this time, if the urging force of the urging member is too small, the webbing ends up in a slack state rather than being completely wound up, which causes a deterioration in appearance at times of non-use of the webbing. On the other hand, if the urging force of the urging member is too large, this can cause an occupant to whom the webbing is applied to experience a sense of constriction.

Accordingly, motorized retractors (motor-type seatbelt retractors) have been considered (see, for example, Japanese Patent Application Laid-Open (JP-A) No. 2001-163186). In a motorized retractor, urging force of the urging member is reduced, to relieve or suppress the sense of constriction experienced by an occupant, and the motorized retractor is equipped with a mechanism (a "winding-assistance mechanism") which drives the spool with driving force of a motor, in order to compensate for a lowering in the force for winding the webbing onto the spool that results from the reduction of the urging force.

A motorized retractor (seatbelt apparatus) equipped with such a winding-assistance mechanism has a structure in which, when a buckle switch senses that engagement of a buckle with a tongue plate has been released, that is, when an occupant releases a state of application of the webbing, the motor operates for a certain amount of time and turns the spool in the direction for winding up the webbing.

However, in a case in which urging force of the urging member is reduced to relieve the sense of constriction experienced by an occupant, as described above, this reduction causes a slight slackness of the webbing in the applied state, and results in a reduction of restraining effectiveness of the webbing at a time of vehicle collision or the like.

Therefore, a motorized retractor has been considered which is equipped with a mechanism (a "pretensioner mechanism") which improves restraining effectiveness of the webbing by forcibly rotating the spool in the winding direction with driving force of the motor when a risk of collision is detected, (see, for example, JP-A No. 2001-347923).

A motorized retractor that is equipped with such a pretensioner mechanism has a structure which detects a state of rapid deceleration of the vehicle with an acceleration sensor, and forcibly rotates the spool in the winding direction with the driving force of the motor in accordance with an electronic signal from the acceleration sensor.

Now, there have been calls for development of a motorized retractor that is equipped with a combination of the two mechanisms described above, the winding-assistance mechanism and the pretensioner mechanism. For such a case, because, as described above, the two mechanisms both have structures which wind the spool in the winding direction with driving force of a motor, it is preferable to provide a single motor for the two mechanisms.

However, there is a problem in that capabilities that are required of the motor, a reduction mechanism of the motor and so forth are mutually contradictory between the winding-assistance mechanism and the pretensioner mechanism.

Specifically, in a motorized retractor which is equipped with a winding-assistance mechanism, in consideration of safety of an occupant and the like, a winding torque on the spool that results from driving force of the motor is preferably set to a low level for supplementing the urging force of the urging member. Therefore, the reduction mechanism is specified with a low reduction ratio.

In contrast, in a motorized retractor which is equipped with a pretensioner mechanism, it is necessary to forcibly wind up the webbing in opposition to an inertial force of the occupant, who will be acting to move toward a front side of the vehicle because of the rapid deceleration of the vehicle. Therefore, it is necessary to set the winding torque on the spool from the driving force of the motor to be high. Accordingly, the reduction mechanism is specified with a high reduction ratio.

Consequently, it has been difficult to provide the two mechanisms, the winding-assistance mechanism and the pretensioner mechanism, with a single motor (and reduction mechanism). In the meantime, in cases in which dedicated motors and reduction mechanisms have been separately provided for the two mechanisms, there have been problems in that costs are higher and the bodies of the motorized retractors are larger.

SUMMARY OF THE INVENTION

In consideration of the circumstances described above, an object of the present invention is to provide a motorized retractor which is capable of providing, with a single motor, the mutually contrasting characteristics required for both a winding-assistance mechanism and a pretensioner mechanism.

A first aspect of the present invention is to provide a motorized retractor comprising: a spool, around which a webbing for restraint of an occupant is wound; a motor capable of rotating in a forward direction and in a reverse direction, the motor including an output shaft; a forward driving force transmission mechanism provided between the spool and the output shaft of the motor, the forward driving force transmission mechanism reducing a forward direction rotation of the output shaft by a predetermined reduction ratio and transmitting the rotation to the spool for rotating the spool in a winding direction, and the forward driving force transmission mechanism blocking transmission of a rotation generated at the spool side thereof to the output shaft; and a reverse driving force transmission mechanism provided between the spool and the output shaft separately from the forward driving force transmission mechanism, the reverse driving force transmission mechanism reducing a reverse direction rotation of the output shaft by a reduction ratio which is lower than the predetermined reduction ratio of the forward driving force transmission mechanism, and transmitting the rotation to the spool for rotating the spool in the winding direction, and the reverse driving force transmission mechanism blocking transmission of a rotation generated at the spool side thereof to the output shaft.

The motorized retractor described above is equipped with the motor, and with the forward driving force transmission mechanism and the reverse driving force transmission mechanism for transmitting driving force of the motor to the spool. Thus, the motorized retractor is capable of transmitting the driving force of the motor to the spool via two different transmission paths.

That is, when the output shaft of the motor rotates in the forward direction, the rotation is reduced by the forward driving force transmission mechanism and transmitted to the spool. As a result, the spool rotates in the winding direction. In contrast, when the output shaft of the motor rotates in the reverse direction, the rotation is reduced by the reverse driving force transmission mechanism and transmitted to the spool. As a result, the spool again rotates in the winding direction.

Here, the reduction ratio of the forward driving force transmission mechanism is set higher than the reduction ratio of the reverse driving force transmission mechanism. Thus, when the spool is rotated in the winding direction by the forward driving force transmission mechanism, the spool is turned with a higher torque. In contrast, when the spool is rotated in the winding direction by the reverse driving force transmission mechanism, the spool is turned with a lower torque.

Accordingly, when a vehicle occupant releases application of the webbing or the like at a usual time, the output shaft of the motor rotates in the reverse direction, the spool is rotated in the winding direction with a low torque by the reverse driving force transmission mechanism, and the webbing is wound onto the spool. Therefore, even if, for example, an urging force of an urging member which urges the spool in the winding direction is lowered to ameliorate a sense of constriction of the vehicle occupant when the webbing is applied, a reduction in force for winding the webbing onto the spool that results from the reduction in the urging force can be compensated for by the driving force of the motor, and the webbing can be completely wound up onto the spool and stored (a "winding-assistance mechanism").

At other times, when, for example, the webbing is in the applied state and a possibility of a vehicle collision is sensed or the like, the output shaft of the motor rotates in the forward direction and the spool is rotated in the winding direction with a high torque by the forward driving force transmission mechanism. Thus, the webbing can be forcibly wound onto the spool, a small amount of slackness (looseness) in the webbing in the applied state is eliminated, and a restraining force on the vehicle occupant from the webbing can be increased (a "pretensioner mechanism").

Thus, with the motorized retractor relating to the first aspect, it is possible to provide, with a single motor, the mutually contrasting capabilities required for a winding-assistance mechanism and a pretensioner mechanism.

As the forward driving force transmission mechanism of the motorized retractor relating to the first aspect, it is possible to employ a driving force transmission mechanism which includes a clutch that is a structural member of a webbing winding device described in Japanese Application No. 2003-6978, which has been filed in Japan by the present applicant(s) and is incorporated herein by reference.

In the first aspect, the reverse driving force transmission mechanism may include: a transmission shaft connected with the output shaft of the motor, rotation of the output shaft being transmitted to the transmission shaft for rotating the transmission shaft; a rotating body which is supported to be rotatable relative to the shaft and which is connected with the spool, the rotating body being capable of rotating the spool; an intermediate plate supported at the transmission shaft to be movable along an axial direction of the transmission shaft, the transmission shaft pushing the intermediate plate at a time of rotation of the transmission shaft by reverse direction rotation of the output shaft, for moving the intermediate plate along the axial direction of the transmission shaft, engaging the intermediate plate with the rotating body and causing the rotating body to rotate integrally with the transmission shaft; and a retainer which urges the intermediate plate in a direction for releasing engagement of the intermediate plate with the rotating body.

In the motorized retractor described above, the shaft is connected to the output shaft of the motor, and the rotating body and intermediate plate are supported at the shaft. The rotating body is freely rotatable relative to the shaft, is connected to the spool, and is formed to be capable of rotating the spool. The intermediate plate is movable relative to the shaft along the axial direction thereof, and is urged in the direction for releasing the engagement with the rotating body by the retainer. Therefore, usually, the rotating body and the intermediate plate are freely rotatable relative to one another, and transmission to the output shaft of the motor of rotations generated at the spool side is prevented.

When the output shaft of the motor rotates in the reverse direction, this rotation is transmitted to the shaft and turns the shaft. At such a time, the intermediate plate is pushed against by the shaft and the intermediate plate moves along the axial direction of the shaft, against the urging force of the retainer. The intermediate plate engages with the rotating body, and the rotating body is rotated integrally with the shaft. Because the rotating body is connected with the spool, the spool is rotated in the winding (take-up) direction by the rotating body.

Further, in the first aspect, the shaft may include an engaging protrusion which protrudes in a radial direction of the transmission shaft, the intermediate plate includes an engaging recess portion which is engageable with the engaging protrusion, and at least one of the engaging protrusion and the engaging recess portion includes an inclined face which is inclined relative to a circumferential direction of the transmission shaft and which is caused, by inertial resistance of the intermediate plate in opposition to rotation of the transmission shaft, to generate a force for pushing the intermediate plate toward the rotating body.

The engaging protrusion provided at the shaft engages with the engaging recess portion provided at the intermediate plate. Thus, the intermediate plate is coupled with the shaft. Further, at least one of the engaging protrusion and the engaging recess portion is provided with the inclined face which is angled relative to the circumferential direction of the shaft.

This inclined face is caused to generate a force pushing the intermediate plate toward the rotating body by inertial resistance of the intermediate plate, which opposes the rotation of the shaft. Accordingly, when this pushing force is equal to or greater than a predetermined value (that is, when a rotation force of the shaft is equal to or greater than a predetermined value), the intermediate plate rotates together with the shaft and moves along the axial direction of the shaft against the urging force of the retainer. As a result, the intermediate plate engages with the rotating body and turns the rotating body together with the shaft.

Further again, the rotating body may include: a clutch gear connected with the spool; a base which is capable of engaging with the intermediate plate; and a friction spring disposed between the clutch gear and the base, the friction spring transmitting a rotation of the clutch gear to the base and, when a load equal to or greater than a predetermined value acts on the clutch gear, delinking rotation transmission between the clutch gear and the base by the load and making the clutch gear and the base able to slip relative to each other.

The rotating body which structures the reverse driving force transmission mechanism is provided with the clutch gear which is connected to the spool and the base which is engageable with the intermediate plate. The clutch gear and the base are coupled by the friction spring.

Accordingly, when, as a result of rotation of the shaft, the intermediate plate is pushed by the shaft and engaged with the base, the base rotates integrally with the intermediate plate. This rotation of the base is transmitted to the clutch gear via the friction spring, and the clutch gear rotates. Hence, because this clutch gear is connected to the spool, the spool is rotated in the winding direction by the clutch gear.

Here, when, for example, the webbing is drawn out by an arm or the like of a vehicle occupant from a state in which the webbing has been wound onto the spool, and a load of at least a predetermined value acts on the clutch gear via the spool, the friction spring delinks transmission between the clutch gear and the base of a rotation caused by this load, and enables relative rotation between the clutch gear and the base. Thus, in a state in which the webbing is interfering with the vehicle occupant or the like, forcible winding of the webbing onto the spool can be prevented, excessive loads can be prevented from acting on components beyond the clutch gear (i.e., structures from the base toward the output shaft of the motor), and damage to the components, burnout of the motor and the like can be prevented.

Further yet, the reverse driving force transmission mechanism may include: a rod connected with the output shaft of the motor, rotation of the output shaft being transmitted to the rod for rotating the rod; a rotating body which is supported to be rotatable relative to the rod and which is connected with the spool, the rotating body being capable of rotating the spool; a rotor which is integrally coupled with the rod; a meshing weight supported at the rotor to be movable in a radial direction of the rotor and, at a time of rotation of the rotor by reverse direction rotation of the output shaft, the meshing weight being moved toward an outer side in the radial direction of the rotor by centrifugal force which acts on the meshing weight, for engaging with the rotating body and causing the rotating body to rotate integrally with the rotor; and a return spring which urges the meshing weight toward an inner side in the radial direction of the rotor.

The rod is connected to the output shaft of the motor, and the rotating body and the rotor are supported at this rod. The rotating body is freely rotatable relative to the rod and is connected to the spool, and is formed to be capable of rotating the spool. Further, the rotor is integrally coupled with the rod and supports the meshing weight. This meshing weight is movable in the radial direction relative to the rod, and is urged to the radial direction inner side relative to the rotor, by the urging force of the return spring, to release engagement of the meshing weight with the rotating body at usual times. Therefore, the rotating body and the meshing weight (the rotor) are usually freely rotatable relative to one another. Thus, transmission to the output shaft of the motor of rotations generated at the spool side can be prevented.

Here, when the output shaft of the motor rotates in the reverse direction, this rotation is transmitted to the rod and turns the rod, and the rotor integrally coupled with the rod also rotates. Because the meshing weight is supported at the rotor, the meshing weight rotates to follow the rotor, and a centrifugal force acts on the meshing weight. Consequently, the meshing weight is moved to the radial direction outer side of the rotor by the centrifugal force, against the urging force of the return spring, and engages with the rotating body, and the rotating body is integrally rotated with the rotor. Hence, because this rotating body is connected to the spool, the spool is rotated in the winding direction by the rotating body.

In a motorized retractor relating to the first aspect, the rotating body may include: a clutch gear connected with the spool; a base which is capable of engaging with the meshing weight; and a friction spring disposed between the clutch gear and the base, the friction spring transmitting a rotation of the clutch gear to the base and, when a load equal to or greater than a predetermined value acts on the clutch gear, delinking rotation transmission between the clutch gear and the base by the load and making the clutch gear and the base able to slip relative to each other.

In the motorized retractor described above, the rotating body which structures the reverse driving force transmission mechanism is provided with the clutch gear which is connected to the spool and the base which is engageable with the meshing weight. The clutch gear and the base are coupled by the friction spring.

Accordingly, when, as a result of rotation of the rod and the rotor, the meshing weight is engaged with the base, the base rotates integrally with the meshing weight. This rotation of the base is transmitted through the friction spring to the clutch gear, and the clutch gear rotates. Hence, because this clutch gear is connected to the spool, the spool is rotated in the winding direction by the clutch gear.

Here, when, for example, the webbing is drawn out by an arm or the like of a vehicle occupant from a state in which the webbing has been wound onto the spool, and a load of at least a predetermined value acts on the clutch gear via the spool, the friction spring delinks transmission between the clutch gear and the base of a rotation caused by this load, and enables relative rotation between the clutch gear and the base. Thus, in a state in which the webbing is interfering with a vehicle occupant or the like, forcible winding of the webbing onto the spool can be prevented, excessive loads can be prevented from acting on components beyond the clutch gear (i.e., structures from the base toward the output shaft of the motor), and damage to the components, burnout of the motor and the like can be prevented.

In a motorized retractor relating to the first aspect, the meshing weight is supported at a shaft of the rotor, and the meshing weight is turned about the shaft toward the outer side in the radial direction of the rotor, by the centrifugal force which acts on the meshing weight at the time of rotation of the rotor, for engaging with the rotating body.

In the motorized retractor described above, the rod is connected to the output shaft of the motor, and the clutch gear and the rotor are supported at this rod. The clutch gear is freely rotatable relative to the rod and is connected to the spool, and is formed to be capable of rotating the spool. Further, the rotor is integrally coupled with the rod and supports the spring weight. This spring weight is formed to be movable in the radial direction relative to the rotor.

Further, this motorized retractor is provided with a clutch spring, which is provided to be coaxial with the clutch gear and a coiling direction end portion of which is coupled with the rod. A coiling direction other end portion of this clutch spring engages with the spring weight, and the clutch spring retains the spring weight at the radial direction inner side relative to the rotor. This clutch spring is usually relatively rotatable with respect to the clutch gear which is connected to the spool, and prevents transmission to the output shaft of the motor of rotations generated at the spool side.

Here, when the output shaft of the motor rotates in the reverse direction, this rotation is transmitted to the rod and the rod rotates, and the rotor integrally coupled to the rod also rotates. Because the spring weight is supported at the rotor, the spring weight rotates to follow the rotor, and a centrifugal force acts on the spring weight. Therefore, the spring weight is moved by the centrifugal force to the radial direction outer side relative to the rotor, against the urging force of the clutch spring. When the spring weight moves to the radial direction outer side of the rotor, the coiling direction other end portion of the clutch spring is moved one way in the coiling direction by the spring weight, and an outer radius dimension of the clutch spring is enlarged. Consequently, the clutch spring engages with the clutch gear, and the clutch gear is integrally rotated together with the rod. As a result, the spool is rotated in the winding direction by the clutch gear.

Further still, in a motorized retractor relating to the first aspect, the reverse driving force transmission mechanism may include: a base which is capable of rotation about an axis thereof; a rotor which is integrally coupled with the base and connected with the output shaft of the motor, rotation of the output shaft being transmitted to the rotor for rotating the rotor; a clutch gear which is provided to be relatively rotatable with respect to the rotor and which is connected with the spool, the clutch gear being capable of rotating the spool; a clutch spring provided to be coaxial and relatively rotatable with respect to the clutch gear, a coiling direction one end portion of the clutch spring being coupled with the rotor, and, due to a coiling direction other end portion of the clutch spring moving to one way in the coiling direction, an outer radius dimension of the clutch spring being enlarged for engaging the clutch spring with the clutch gear and causing the clutch gear to rotate integrally with the rotor; a lever provided to be rotatable relative to the base about the axis thereof, the lever being continuously urged one way about the axis of the base, the lever being engaged with the coiling direction other end portion of the clutch spring, and, due to the lever turning to another way about the axis of the base, the lever causing the coiling direction other end portion of the clutch spring to move to the one way in the coiling direction; and a plurality of weights supported at the base to be movable in respective radial directions of the base, the plurality of weights being coupled with the lever, the plurality of weights being retained at inner sides in the radial directions of the base by the lever, and, at a time of rotation of the base by reverse direction rotation of the output shaft, the plurality of weights being moved toward respective outer sides in the radial directions of the base by centrifugal forces which act on the plurality of weights, and causing the lever to turn to the other way about the axis of the base.

The motorized retractor described above is provided with the base which is rotatable around the axis thereof. The rotor which is connected to the output shaft of the motor is integrally coupled to this base. Further, the clutch gear is connected to the spool, and this clutch gear is provided to be relatively rotatable with respect to the rotor. Moreover, the rotor is coupled with the coiling direction one end portion of the clutch spring, which is provided to be coaxial with the clutch gear, and the coiling direction other end portion of this clutch spring is coupled with the lever, which is provided to be rotatable relative to the base about the axis thereof. This lever is usually urged in one direction about the axis of the base, and the lever is coupled with the plurality of weights which are respectively supported to be movable in the respective radial directions relative to the base. These weights are retained at the radial direction inner side of the base by the urging force that acts on the lever. In this state, the clutch spring is relatively rotatable with respect to the clutch gear connected to the spool. Thus, transmission to the output shaft of the motor of rotations generated at the spool side is prevented.

Here, when the output shaft of the motor rotates in the reverse direction, this rotation is transmitted to the rotor and the rotor rotates, and the base which is integrally coupled to the rotor also rotates. Because the plurality of weights is supported at the base, the plurality of weights rotates to follow the base, and respective centrifugal forces act on the plurality of weights. As a result, the plurality of weights are respectively moved to the radial direction outer side of the base by the centrifugal forces. When the plurality of weights moves to the radial direction outer side of the base, the lever is turned in the other direction about the axis of the base by the plurality of weights. When the lever is turned in the other direction about the axis of the base, the coiling direction other end portion of the clutch spring, which is coupled to this lever, moves the one way in the coiling direction, and the outer radius dimension of the clutch spring is enlarged. In consequence, the clutch spring engages with the clutch gear, and the clutch gear integrally rotates together with the rotor. As a result, the spool is rotated in the winding direction by the clutch gear.

Further still again, the forward driving force transmission mechanism includes: a worm gear connected with the output shaft of the motor, rotation of the output shaft being transmitted to the worm gear for rotating the worm gear, and the reverse driving force transmission mechanism includes a worm wheel portion, which meshes with the worm gear, and an output-splitting gear which is provided to be coaxial and integral with respect to the worm wheel portion, the output-splitting gear including a cog portion which meshes with outward teeth which are formed at the rotor.

In the motorized retractor described above, when the output shaft of the motor rotates, the worm gear which structures the forward driving force transmission mechanism rotates, and the output-splitting gear of the reverse driving force transmission mechanism, which is meshed with the worm wheel portion at the worm gear, rotates. Because the outward teeth of the rotor are meshed with the cog portion of this output-splitting gear, the rotor rotates together with the base. Thus, in this motorized retractor, the single output-splitting gear, which is provided between the worm gear that structures the forward driving force transmission mechanism and the rotor that structures the reverse driving force transmission mechanism, meshes with both the worm gear and the rotor and splits output of the motor. Accordingly, it is possible to achieve simplification and a reduction in size of an output-splitting structure.

Further still yet, the motorized retractor may further comprise a case, wherein the reverse driving force transmission mechanism is formed as a unit in which the base, the rotor, the clutch gear, the clutch spring, the lever, the plurality of weights and the output-splitting gear are accommodated all together in the case, and the worm wheel portion of the output-splitting gear is exposed from the case for meshing with the worm gear.

In the motorized retractor described above, the structural members which structure the reverse driving force transmission mechanism are formed as a unit which is wholly accommodated within a case, but the worm wheel of the output-splitting gear is exposed from this case and meshes with the worm gear of the forward driving force transmission mechanism. That is, with this motorized retractor, the reverse driving force transmission mechanism has a structure in which structural components subsequent to an output-splitting point are all together formed as a sub-assembly. Consequently, the reverse driving force transmission mechanism can be dealt with as a single component.

BRIEF DESCRIPTION OF THE DRAWINGS

FIG. 9 is a perspective view showing structure of a shaft which is a structural member of the motorized retractor relating to the first embodiment of the present invention.

DETAILED DESCRIPTION OF THE INVENTION

FIRST EMBODIMENT

Figure 1:
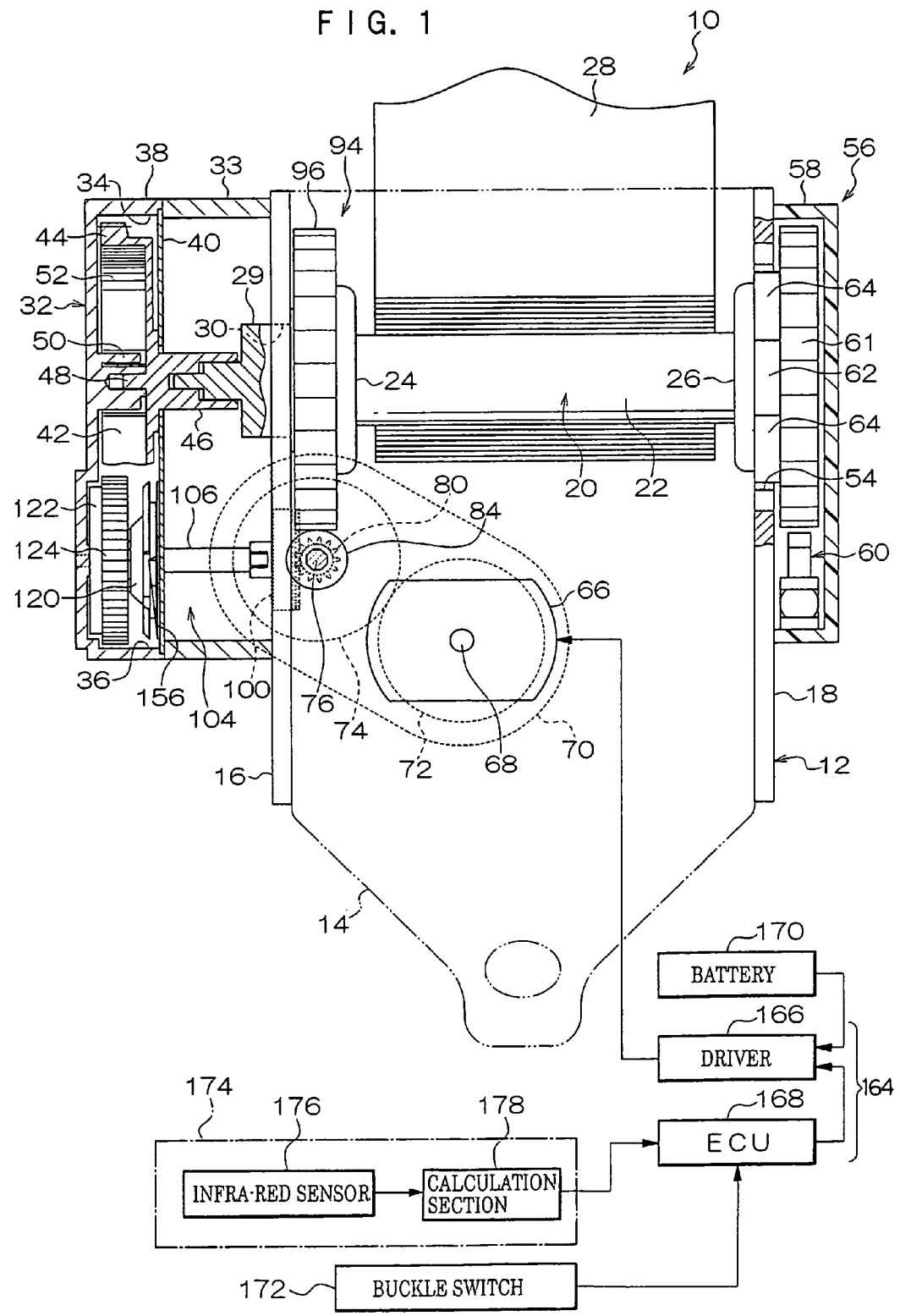
FIG. 1 is a schematic rear sectional view showing overall structure of a motorized retractor relating to a first embodiment of the present invention.

FIG. 1 shows a schematic rear sectional view of overall structure of a motorized retractor 10 relating to a first embodiment of the present invention.

As shown in FIG. 1, the motorized retractor 10 is provided with a frame 12. The frame 12 is provided with a substantially plate-form rear plate 14. This rear plate 14 is fixed to a vehicle body by an unillustrated fastening mechanism such as bolts or the like. Thus, the motorized retractor 10 is fixed to the vehicle body. A pair of leg pieces 16 and 18 are provided extending from both ends in the width direction of the rear plate 14, in parallel with one another. A spool 20, which is produced by die-casting or the like, is rotatably disposed between the leg pieces 16 and 18.

The spool 20 is provided with a spool main body 22 and a pair of flange portions 24 and 26, at two end portions of the spool main body 22. The spool main body 22 has a substantially tubular form, and the two flange portions 24 and 26 are each formed in a substantially circular disc shape. Thus, the spool 20 is formed in a drum shape overall.

A base end portion of a webbing 28, which is formed in a long belt shape, is fixed between the flange portions 24 and 26 of the spool main body 22. When the spool 20 is rotated in one direction about an axis thereof (below referred to as a winding direction), the webbing 28 is wound, from the base end side thereof, onto an outer peripheral portion of the spool main body 22 in a layered form. When the webbing 28 is pulled on at a distal end side thereof, the webbing 28 that has been wound up on the outer peripheral portion of the spool main body 22 is drawn out and, in accordance therewith, the spool 20 rotates in a direction opposite to the direction of rotation when the webbing 28 is wound up. (Below, the direction of rotation of the spool 20 when the webbing 28 is being drawn out is referred to as an unwinding direction.)

The spool 20 is also provided with a shaft support portion 29, which protrudes coaxially from an end portion of the spool 20 at the flange portion 24 side thereof. The shaft support portion 29 passes substantially coaxially through a circular hole 30, which is formed in the leg piece 16, and protrudes to outside the frame 12. A case 32 is provided at an outer side of the frame 12, at the leg piece 16 side thereof. The case 32 is arranged to oppose the leg piece 16 along the axial direction of the spool 20. The case 32 is fixed to the leg piece 16 with a spacer 33 therebetween. The spacer 33 is a tubular member with a substantially rectangular ring shape in cross-section.

The case 32 is provided with a case main body 38 and a cover 40. The case main body 38 includes a first accommodation portion 34 and a second accommodation portion 36 (see FIG. 2), which have circular shapes in cross-section. The cover 40 has the form of a thin, flat plate, which closes off the first accommodation portion 34 and the second accommodation portion 36 (and is not shown in FIG. 2). A barrel drum 42, which structures a reverse driving force transmission mechanism, is accommodated inside the first accommodation portion 34 of the case main body 38.

The barrel drum 42 is formed with the shape of a tube with a base, with a short axial direction dimension, which opens toward a side thereof that is opposite from the side at which the leg piece 16 is disposed. Outward teeth 44 are formed at an outer peripheral portion of the barrel drum 42, and serve as a spur gear.

A circular tube-form coupling portion 46 is provided coaxially protruding from a face of a base wall of the barrel drum 42, toward the leg piece 16 side thereof. This coupling portion 46 passes through a circular hole formed in the cover 40, and is coaxially and integrally coupled with the shaft support portion 29 which passes through the circular hole 30 of the leg piece 16.

A cylindrical support shaft 48 is provided protruding, coaxially with the barrel drum 42, from a face of the base wall of the barrel drum 42 that is opposite from the side thereof at which the leg piece 16 is disposed. This support shaft 48 is rotatably supported at a bearing portion 50, which is provided protruding from a central portion of the first accommodation portion 34. Thus, the shaft support portion 29 side of the spool 20 is rotatably supported at the case 32, via the barrel drum 42.

Figure 3:
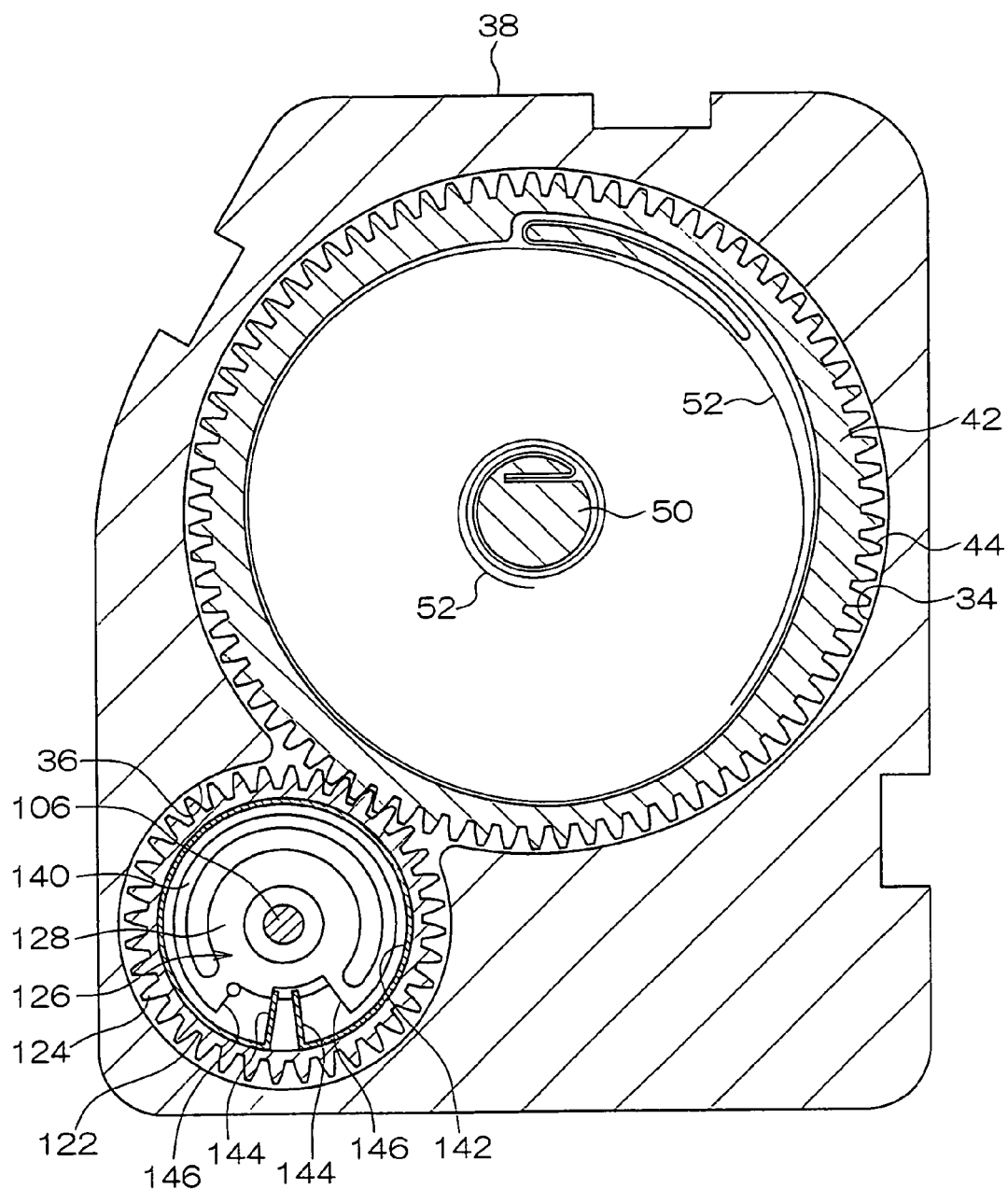
FIG. 3 is a side sectional view showing partial structure of a reverse driving force transmission mechanism which is a structural member of the motorized retractor of FIG. 1.

As is shown in FIG. 3, a spiral spring 52 is accommodated inside the barrel drum 42. An inner end of the spiral spring 52 is anchored at the bearing portion 50 of the case main body 38, and an outer end of the spiral spring 52 is anchored at the barrel drum 42. This spiral spring 52, via the barrel drum 42, urges the spool 20 in the winding direction.

An urging force of this spiral spring 52 (and a consequent winding force of the webbing 28) is set to be relatively weak, at a level such that slackness of the webbing 28 that is applied to a vehicle occupant is eliminated. That is, the urging force of the spiral spring 52 is set to have a strength corresponding to a characteristic of not constricting the vehicle occupant in the state in which the webbing 28 is applied. Thus, the urging force of the spiral spring 52 is not required to be strong enough to completely wind up the webbing 28 that has been drawn out from the spool, in opposition to frictional forces and the like.

The spool 20 is also provided with an unillustrated support shaft which protrudes coaxially from an end portion at the flange portion 26 side of the spool 20. This support shaft substantially coaxially passes through an inward teeth ratchet hole 54, which is formed in the leg piece 18, and protrudes outside of the frame 12. This support shaft is rotatably supported by a substantially cup-form case 58, which is fixed to an outer face of the leg piece 18 in a state in which an opening end of the case 58 is fitted together with the outer face of the leg piece 18, and which structures a lock mechanism 56.

The lock mechanism 56 is a mechanism which usually allows free rotation of the spool 20 in the winding direction and the unwinding direction, but which blocks rotation of the spool 20 in the unwinding direction at times of rapid deceleration of the vehicle. In this first embodiment, when an acceleration sensor 60 blocks rotation of a ratchet gear 61 in the unwinding direction, a lock plate 64 is caused to protrude from a lock base 62 by relative rotation of the ratchet gear 61 and the spool 20, the lock plate 64 meshes with the inward teeth of the ratchet hole 54 in the leg piece 18, and the lock plate 64 blocks unwinding direction rotation of the spool 20. It is also possible to couple the lock base 62 and the spool 20 together with a torsion bar and, after the above-mentioned locking, allow the spool 20 to rotate in the unwinding direction while the torsion bar twists, thus implementing energy absorption (i.e., implementing a force-limiting function).

The motorized retractor 10 is further equipped with a motor 66. The motor 66 is disposed downward of the spool 20, between the pair of leg pieces 16 and 18 of the frame 12, and is retained to be fixed with respect to the frame 12. An output shaft 68 of the motor 66 protrudes to a side of the motor 66 opposite from the side thereof at which the rear plate 14 is disposed. A gear housing 70 is provided at this output shaft 68 side of the motor 66.

The gear housing 70 is integrally fixed to the frame 12 by a fastening member such as screws or the like. A distal end side of the output shaft 68 of the motor 66 is rotatably supported by the gear housing 70.

A pair of gears 72 and 74, which respectively serve as outward tooth spur gears, are accommodated inside the gear housing 70 in a state of being meshed with one another. The gear 72 is integrally joined to be coaxial and attachable/detachable with the output shaft 68. Meanwhile, the gear 74 is integrally coupled to be coaxial and attachable/detachable with a worm shaft 76, an axial direction of which is parallel with the output shaft 68. The gear 74 has a greater pitch diameter and a greater number of teeth than the gear 72.

Figure 4:
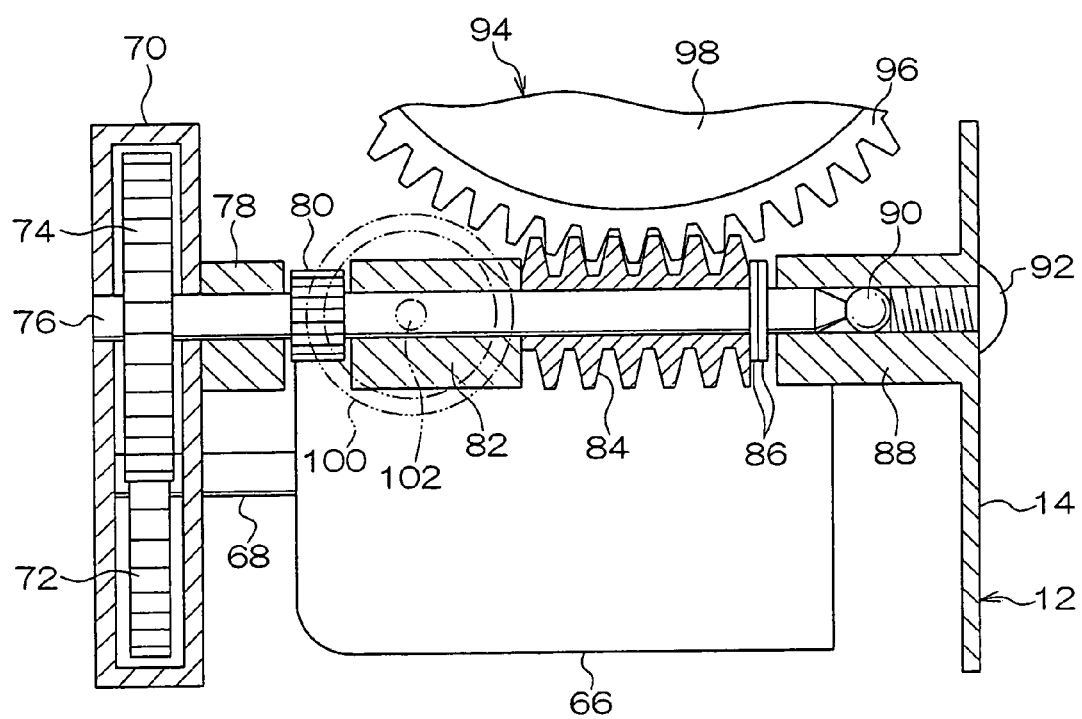
FIG. 4 is a side sectional view showing structure of peripheral members including a motor which is a structural member of the motorized retractor of FIG. 1.
Figure 5:
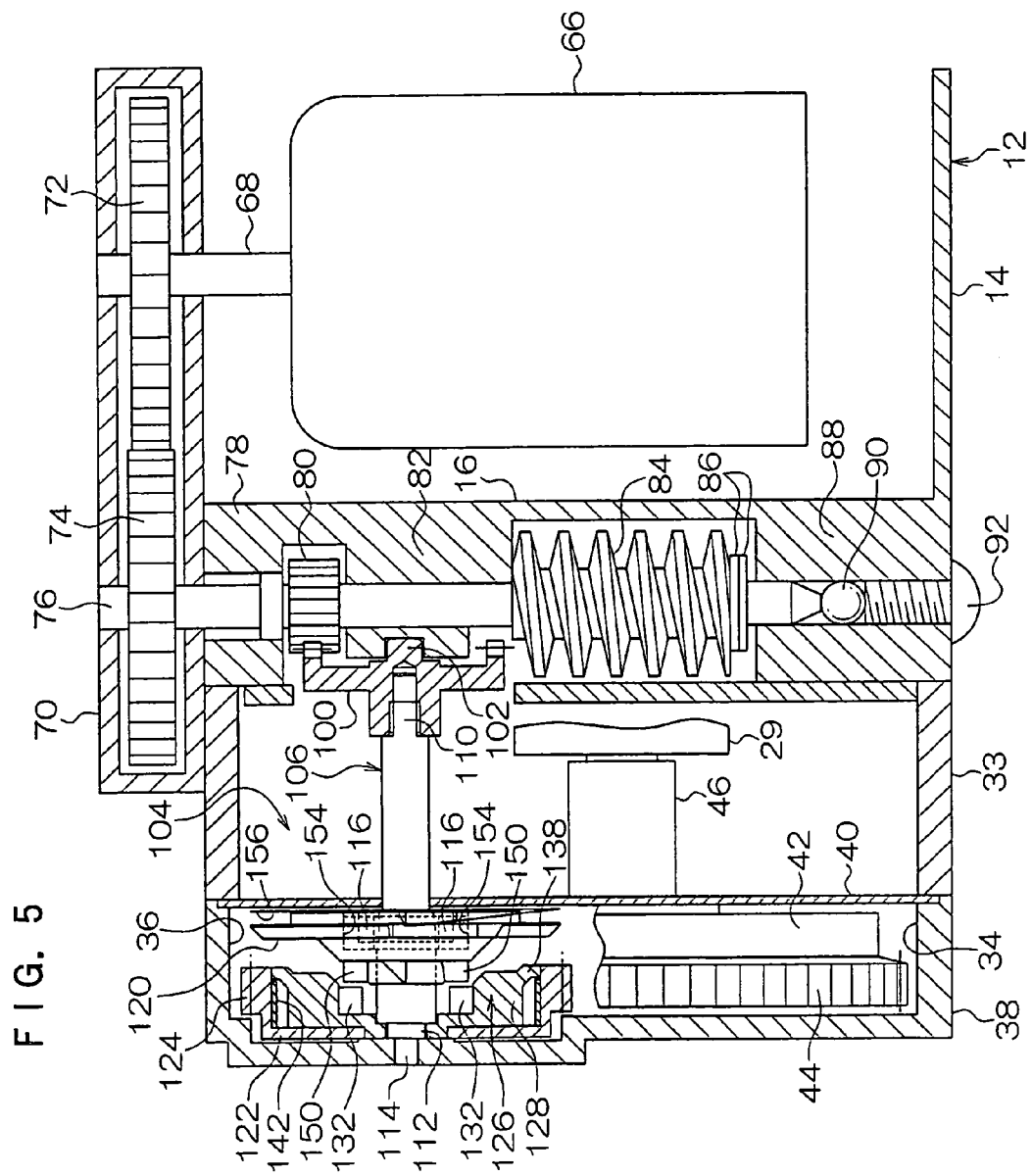
FIG. 5 is a plan sectional view showing structure of peripheral members including the reverse driving force transmission mechanism which is a structural member of the motorized retractor of FIG. 1, which shows a state in which engagement of a rotating body with an intermediate plate is released.
Figure 6:
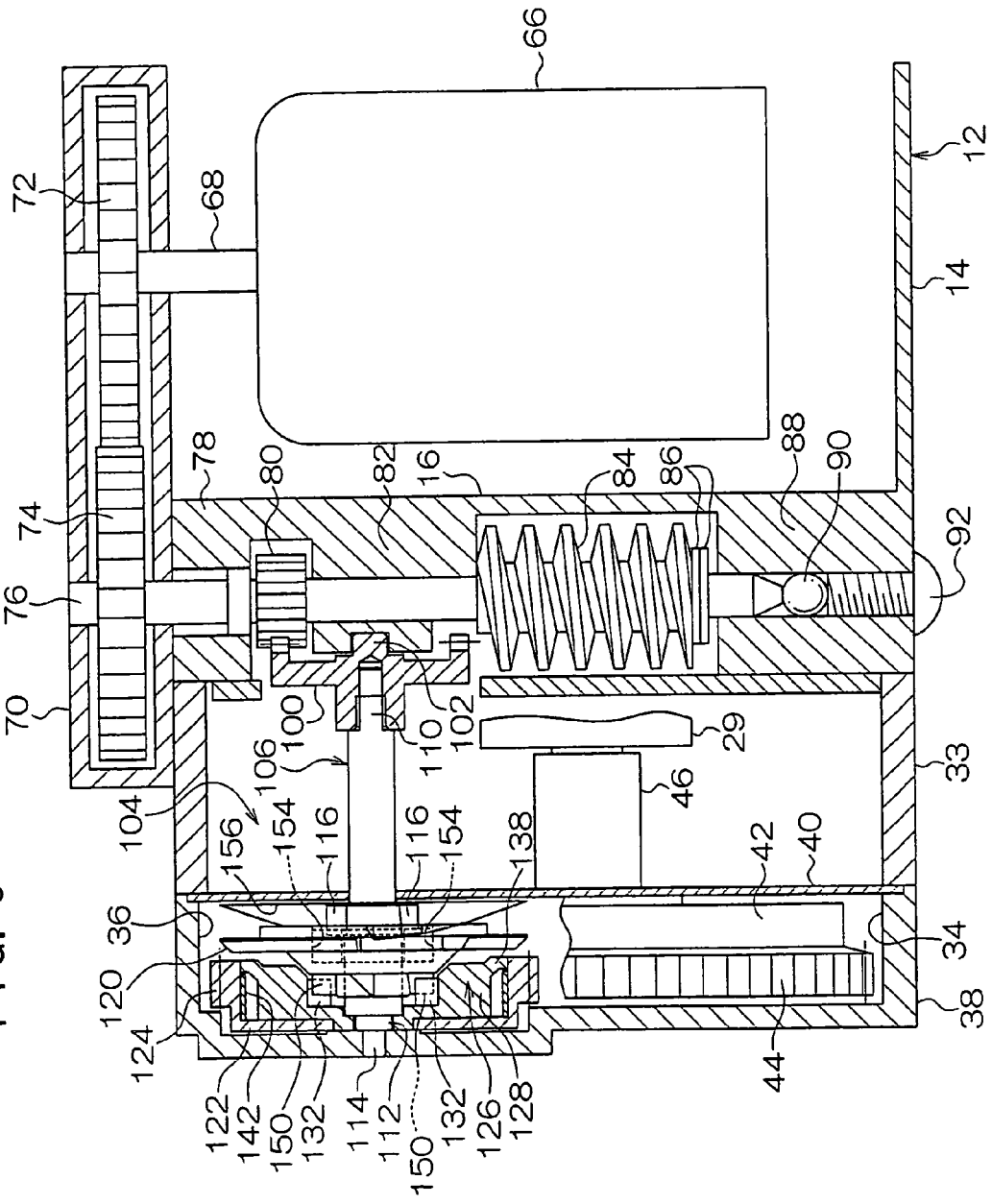
FIG. 6 is a plan sectional view showing a state in which the rotating body and intermediate plate of FIG. 5 are engaged.

As is shown in FIGS. 4 to 6, the worm shaft 76 protrudes from the gear housing 70, and a distal end side of the worm shaft 76 passes through a bearing 78, which is formed integrally at the leg piece 16. Furthermore, at an opposite side of the bearing 78 from the side thereof at which the gear housing 70 is disposed, a gear 80, which structures the reverse driving force transmission mechanism, is disposed to be coaxial with respect to the worm shaft 76. The gear 80 is formed as an outward tooth spur gear, and is integrally coupled with the worm shaft 76 in a state in which the worm shaft 76 passes through a through-hole formed at an axial central portion of the gear 80.

At a side of the gear 80 that is opposite from the side thereof at which the bearing 78 is disposed, a bearing 82 is provided. The bearing 82 is formed integrally with the leg piece 16, and the worm shaft 76 passes through the bearing 82. At a side of the bearing 82 that is opposite from the side thereof at which the gear 80 is disposed, a worm gear 84, which structures a forward driving force transmission mechanism, is disposed to be coaxial with respect to the worm shaft 76. In a state in which the worm shaft 76 passes through a through-hole formed at an axial central portion of the worm gear 84, the worm gear 84 is coupled to the worm shaft 76 to be integral with the worm shaft 76 with respect to a direction around the axis thereof.

Further, one or a plurality of an E-ring 86 is fixed at a side of the worm gear 84 that is opposite from the side thereof at which the bearing 82 is disposed. The E-ring 86 limits displacement of the worm gear 84 along the axial direction of the worm shaft 76.

At a side of the E-ring 86 that is opposite from the side thereof at which the worm gear 84 is disposed, a bearing 88 is provided. The bearing 88 is formed in a substantially tubular shape, and an end portion of the bearing 88, at a side thereof that is opposite from the side at which the worm gear 84 is disposed, is integrally joined to the rear plate 14. A steel ball 90 is accommodated inside the bearing 88. An outer radial dimension of the steel ball 90 is slightly smaller than an inner radial dimension of the bearing 88. The steel ball 90 makes contact with a distal end portion of the worm shaft 76, the distal end of which is formed in a taper shape.

At a side of the steel ball 90 that is opposite from the side thereof at which the worm shaft 76 is disposed, an inner periphery portion of the bearing 88 is formed with a female thread, and an adjustment screw 92 is screwed thereinto from an opening end of the bearing 88 at the rear plate 14 side thereof. A distal end portion of the adjustment screw 92 presses against the steel ball 90, thus pushing against the distal end of the worm shaft 76. As a result, displacement of the worm shaft 76 in the axial direction is limited.

Meanwhile, above the aforementioned worm gear 84, a first clutch 94 is provided, which structures the forward driving force transmission mechanism. The first clutch 94 is provided with a worm wheel 96, which is formed in a ring shape. The worm wheel 96 is disposed between the leg piece 16 and the flange portion 24, to be coaxial and relatively rotatable with respect to the spool 20. Both ends in the axial direction ends of the worm wheel 96 are closed off by disc-form members 98 (see FIGS. 2 and 4).

The first clutch 94 is provided with an unillustrated adapter, which is disposed at the spool 20 side of the first clutch 94. This adapter is provided coaxially and integrally with the spool 20 between the flange portion 24 and the shaft support portion 29. The adaptor passes through the disc-form members 98 of the worm wheel 96 to be slideable thereagainst, and rotatably supports the worm wheel 96, causing the worm wheel 96 to mesh with the worm gear 84.

An unillustrated transmission member is accommodated inside the worm wheel 96. The first clutch 94 is formed such that, when the worm wheel 96 rotates in the winding direction (the direction of arrow A in FIG. 2), the transmission member associates the worm wheel 96 with the adapter to enable transmission of the rotation. On the other hand, the first clutch 94 is structured such that, when the worm wheel 96 turns in the unwinding direction (the direction of arrow B in FIG. 2) or is stopped (when a load on the transmission member is released), the first clutch 94 will return to a state in which the mechanical association caused by the transmission member is cancelled.

The first clutch 94 of the structure described above is formed so as to transmit forces of rotation of the output shaft 68 of the motor 66 through the gears 72 and 74, the worm shaft 76 and the worm gear 84 to the worm wheel 96. When the output shaft 68 of the motor 66 rotates in a forward direction (the direction of arrow C in FIG. 2), the worm wheel 96 is turned in the winding direction (the direction of arrow A in FIG. 2), and when the output shaft 68 of the motor 66 turns in a reverse direction (the direction of arrow D in FIG. 2), the worm wheel 96 is turned in the unwinding direction (the direction of arrow B in FIG. 2).

Here, as this worm wheel 96, it is possible to employ a clutch which is a structural member of a webbing winding (take-up) device described in Japanese Application No. 2003-6978, which has been filed in Japan by the present applicant(s) and is incorporated herein by reference.

As shown in FIG. 1, a face gear 100, which structures the reverse driving force transmission mechanism, is provided downward of the first clutch 94, at a side of the worm shaft 76 that is opposite from the side thereof at which the motor 66 is disposed. This face gear 100 meshes with the aforementioned gear 80. As shown in FIGS. 4 to 6, a cylindrical shaft support portion 102 is provided protruding from an end face at the gear 80 side of the face gear 100 to be coaxial with the face gear 100. The shaft support portion 102 is rotatably supported by the bearing 82 of the leg piece 16.

At a side of the face gear 100 that is opposite from the side thereof at which the worm shaft 76 is disposed, a second clutch 104 is provided. The second clutch 104 structures the reverse driving force transmission mechanism.

Next, the second clutch 104 will be described with reference to FIGS. 5 to 11.

Figure 7:
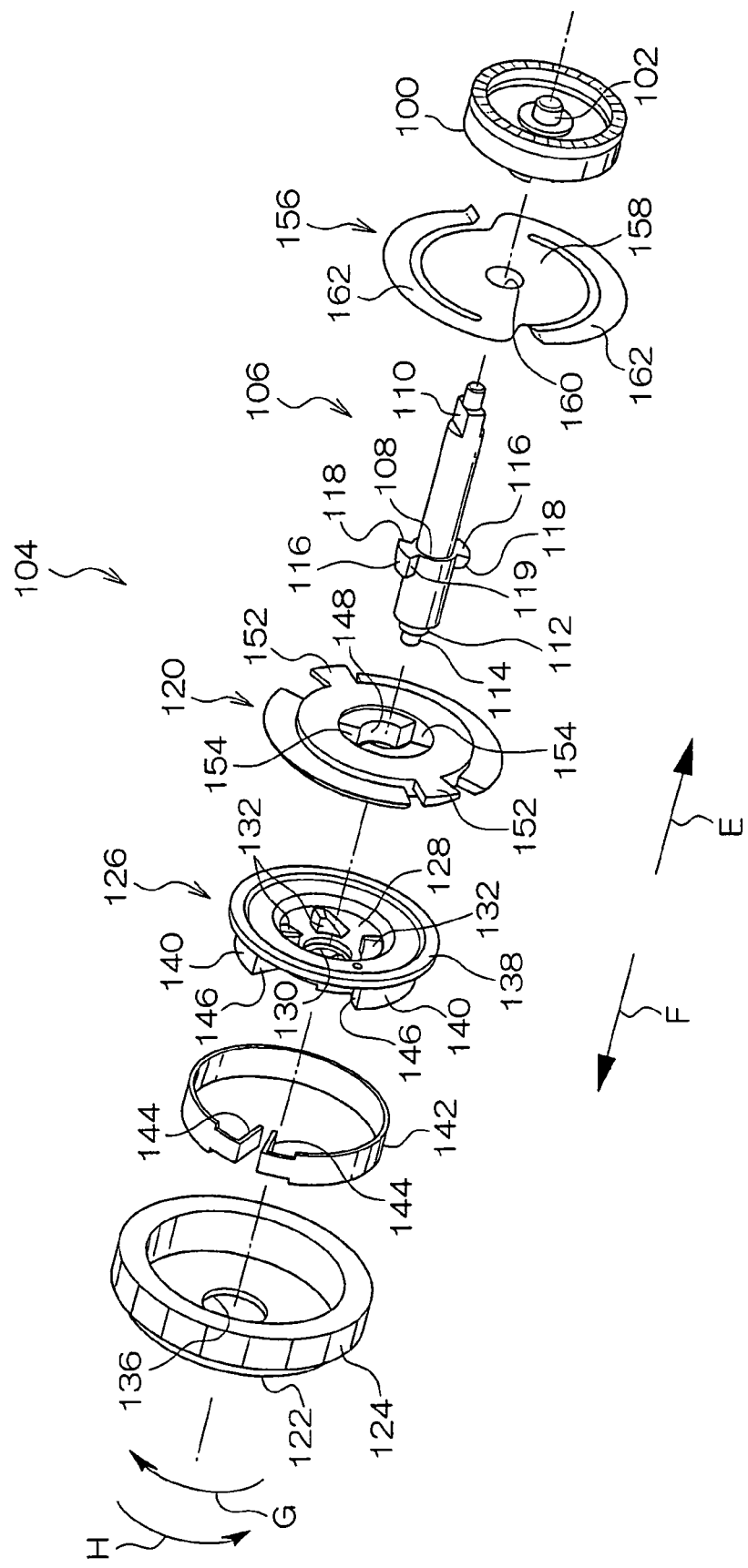
FIG. 7 is an exploded perspective view showing structure of principal elements of the reverse driving force transmission mechanism which is a structural member of the motorized retractor of FIG. 1.
Figure 8:
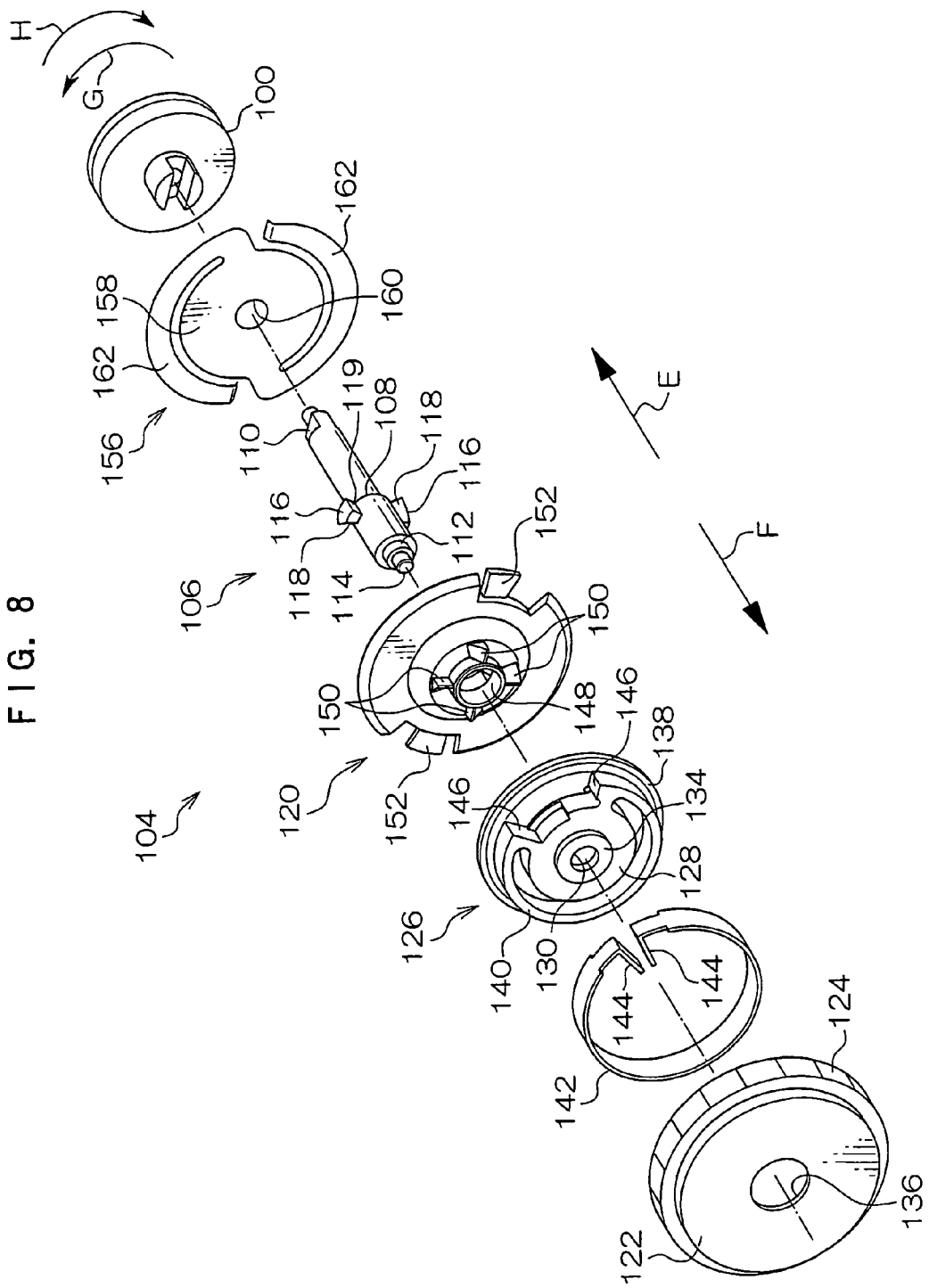
FIG. 8 is an exploded perspective view showing structure of the principal elements of the reverse driving force transmission mechanism which is a structural member of the motorized retractor of FIG. 1.

As shown in FIGS. 7 and 8, the second clutch 104 is provided with a cylindrical shaft 106. The shaft 106 serving as a transmission shaft features a step portion 108 at an axial direction central portion of the shaft 106. An axial direction one end side of the shaft 106 (the side in the direction of arrow E in FIGS. 7 and 8) has a small diameter, and an axial direction other end side of the shaft 106 (the side in the direction of arrow F in FIGS. 7 and 8) has a large diameter.

The shaft 106 is disposed to be perpendicular with respect to the worm shaft 76 and parallel with respect to the spool 20. A coupling portion 110 is provided at an axial direction one end portion of the shaft 106. This coupling portion 110 is coaxially and integrally coupled with the aforementioned face gear 100, at a side of the face gear 100 that is opposite from the side thereof at which the shaft support portion 102 is disposed.

As shown in FIGS. 5 and 6, the axial direction other end side of the shaft 106 (the side with the larger diameter) passes through a through-hole formed in the cover 40 of the case 32 and is disposed inside the second accommodation portion 36 of the case main body 38. A cylindrical relative rotation shaft portion 112 is provided protruding coaxially from this axial direction other end portion of the shaft 106. A cylindrical shaft support portion 114 is provided protruding coaxially from a distal end of the relative rotation shaft portion 112. The shaft support portion 114 has a smaller diameter than the relative rotation shaft portion 112. This shaft support portion 114 is rotatably supported by the case main body 38.

Thus, the shaft 106 is supported, by the face gear 100 and the shaft support portion 114, to be non-movable in the axial direction thereof but rotatable about the axis thereof.

A pair of engaging protrusions 116, which protrude in radial directions, are provided at a region of the larger diameter axial direction other end side of the shaft 106, at a position that corresponds with the step portion 108. The pair of engaging protrusions 116 are disposed at mutually opposite sides in a circumferential direction (sides which are opposite by 180°, which is to say positions with point symmetry about a center on the axis of the shaft 106).

As shown in FIG. 9, at each of this pair of engaging protrusions 116, one side wall, which corresponds to the circumferential direction of the shaft 106 (a side wall at a side in the direction of an arrow G of FIGS. 7 to 9), serves as an angled face 118 which is inclined to a helical form with respect to the circumferential direction of the shaft 106, and another side wall (a side wall at a side in the direction of an arrow H of FIGS. 7 to 9) serves as a parallel face 119, which is parallel with respect to the radial direction of the shaft 106. (In other words, each of the engaging protrusions 116 is formed with a trapezoid shape in cross-section.) These two engaging protrusions 116 correspond with an intermediate plate 120, which is described later.

Figure 10A:
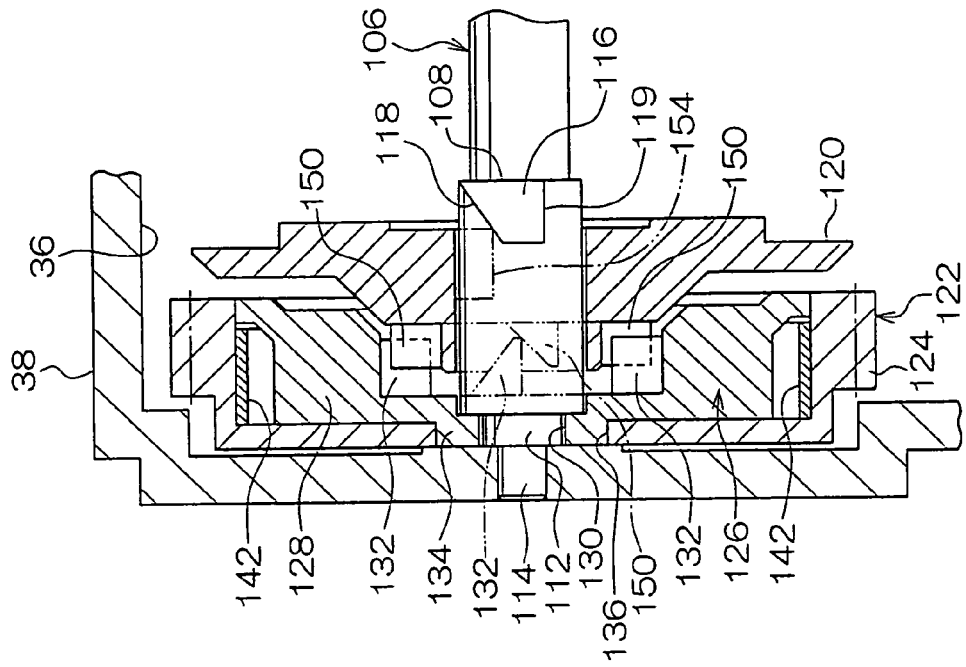
FIG. 10A is a plan sectional view showing partial structure of the reverse driving force transmission mechanism which is a structural member of the motorized retractor of FIG. 1, which shows the state in which engagement of the intermediate plate with the rotating body is released.
Figure 10B:
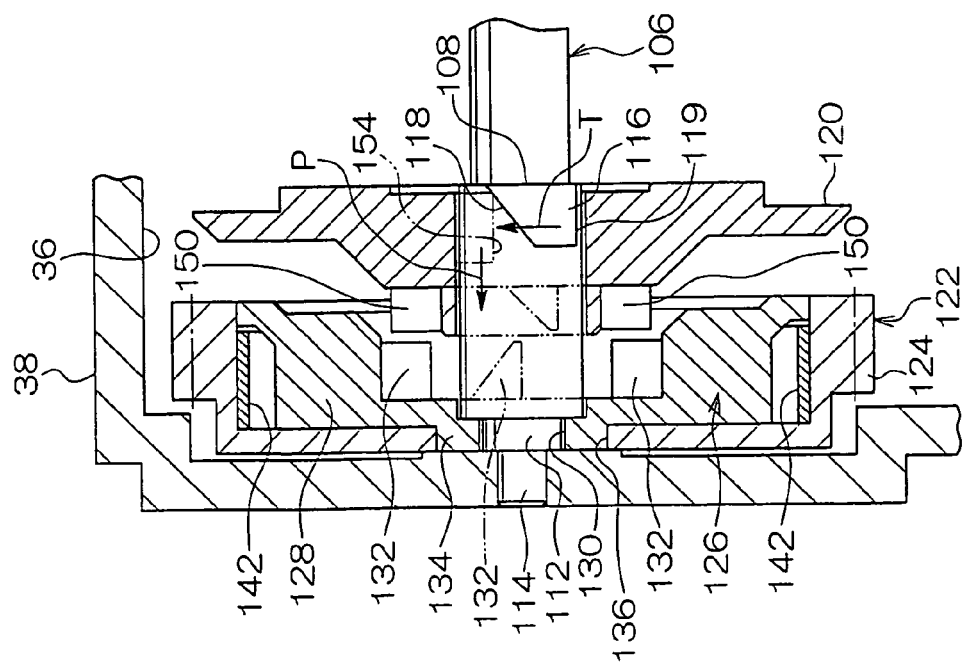
FIG. 10B is a plan sectional view showing the state in which the rotating body and intermediate plate of FIG. 10A are engaged.

Meanwhile, inside the second accommodation portion 36 at the axial direction other end side of the shaft 106, a clutch gear 122 is disposed to be coaxial with respect to the shaft 106. The clutch gear 122 is formed in the shape of a circular tube having a base, an axial direction dimension of which is short. As shown in FIGS. 10A and 10B, a radial direction inner side portion of the base wall of the clutch gear 122 partially abuts against a step portion which is formed at a face of the base wall of the second accommodation portion 36. Further, outward teeth 124 are formed at an outer peripheral portion of the clutch gear 122. These outward teeth 124 serve as a spur gear and mesh with the outward teeth 44 of the barrel drum 42.

A substantially cylindrical base 126 is disposed at an inner side of the clutch gear 122 to be coaxial with respect to the clutch gear 122 (that is, coaxial with respect to the shaft 106). The base 126 is provided with a main body portion 128, which has the form of a circular tube with a base, an axial direction dimension of which is short.

A circular hole 130 is formed through a central portion of the main body portion 128, along the axial direction of the main body portion 128. The relative rotation shaft portion 112 of the shaft 106 is inserted into this circular hole 130 to be freely rotatable. Hence, the main body portion 128 (i.e., the base 126) is supported to be freely rotatable relative to the shaft 106, and axial direction movement of the main body portion 128 relative to the shaft 106 is limited by a hole edge portion of the circular hole 130 abutting against a step portion at a base end side of the relative rotation shaft portion 112.

Four engaging pawls 132 are provided at an inner side of the main body portion 128. The engaging pawls 132 are formed integrally with a base wall and an inner peripheral wall of the main body portion 128. The engaging pawls 132 are disposed at equidistant intervals along a circumferential direction of the main body portion 128 (that is, at intervals of 90° along the circumferential direction). One side wall of each of these engaging pawls 132, corresponding with the circumferential direction of the main body portion 128 (at a side in the direction of arrow G of FIGS. 7 and 8), is formed as an inclined face which is angled with respect to the circumferential direction of the main body portion 128. (That is, the engaging pawls 132 are formed with substantially triangular shapes in cross-section.) These engaging pawls 132 correspond with the intermediate plate 120, which will be described below.

As shown in FIG. 8, a circular tube-form tube portion 134 is provided coaxially at the clutch gear 122 side of the main body portion 128. This tube portion 134 fits, to be freely rotatable, in a circular hole 136, which is formed at a central portion of the clutch gear 122. A distal end side of the tube portion 134 abuts against a step portion which is formed at a bottom wall face of the second accommodation portion 36.

Further, at the opening side of the main body portion 128, a circular disc-form flange portion 138 is provided coaxially and integrally extending toward the radial direction outer side of the main body portion 128. An outer radius dimension of this flange portion 138 is formed to be slightly smaller than an inner radius dimension of the clutch gear 122, and the flange portion 138 fits in at the opening side of the clutch gear 122 to be freely rotatable.

Further still, at the radial direction outer side of the main body portion 128, a side wall portion 140 with an annular cross-section (a substantially 'C'-shaped cross-section) is integrally provided to be coaxial with respect to the main body portion 128 and the flange portion 138. An outer radius dimension of this side wall portion 140 is significantly smaller than the inner radius dimension of the clutch gear 122. Thus, an annular gap is formed between an inner peripheral face of the clutch gear 122 and an outer peripheral face of the side wall portion 140 (see FIG. 3). A friction spring 142 is disposed in this annular gap.

The friction spring 142 is formed in an annular cross-section (a substantially 'C'-shaped cross-section) by a narrow plate member, which is formed of a metallic material or the like that has elasticity. The friction spring 142 is formed such that, in a relaxed state, an outer radius dimension thereof is larger than an inner radius dimension of the clutch gear 122. Therefore, the friction spring 142 is accommodated inside the clutch gear 122 in a state in which the friction spring 142 is resiliently deformed in a direction such that a pair of mutually opposing opening end portions thereof approach one another. Hence, because of resilient force of the friction spring 142, an outer peripheral face of the friction spring 142 abuts against the inner peripheral face of the clutch gear 122.

A pair of rotation-limiting portions 144 is provided at this pair of opening portions of the friction spring 142, respectively extending toward the radial direction inner side. These two rotation-limiting portions 144 oppose a pair of passive rotation-limiting portions 146, which are respectively provided at one circumferential direction end portion and another circumferential direction end portion of the side wall portion 140 of the base 126, such that the rotation-limiting portions 144 are abuttable against the passive rotation-limiting portions 146.

Consequently, rotation of the base 126 relative to the clutch gear 122 is basically limited by the passive rotation-limiting portions 146 abutting against the rotation-limiting portions 144 of the friction spring 142.

Because, as described above, the friction spring 142 is a member which has elasticity, if a rotary force that is caused by relative rotation of the base 126 with respect to the clutch gear 122 is larger than a frictional force that is generated between the outer peripheral face of the friction spring 142 and the inner peripheral face of the clutch gear 122 by spring force of the friction spring 142, the friction spring 142 relatively rotates with respect to the clutch gear 122. Consequently, relative rotation of the base 126 with respect to the clutch gear 122 is enabled.

As shown in FIGS. 7 and 8, the circular disc-form intermediate plate 120 is provided at a side of the base 126 that is opposite from the side thereof at which the clutch gear 122 is disposed. The shaft 106 is inserted into a circular hole 148, which is formed at a central portion of the intermediate plate 120. Thus, the intermediate plate 120 is supported coaxially with respect to the shaft 106. Usually, as shown in FIGS. 5 and 10A, the intermediate plate 120 is disposed with a predetermined gap between the intermediate plate 120 and the base 126.

As shown in FIG. 8, four engaging pawls 150, which correspond with the engaging pawls 132 of the base 126, are provided protruding from an axial direction other end side (i.e., the base 126 side) of the intermediate plate 120. These engaging pawls 150 are disposed at equidistant intervals along the circumferential direction of the intermediate plate 120 (that is, at intervals of 90° along the circumferential direction). Furthermore, one side wall of each of these engaging pawls 150, which corresponds with the circumferential direction of the intermediate plate 120 (a wall at a side in the direction of arrow G of FIGS. 7 and 8), is formed as an inclined surface which is angled with respect to the circumferential direction of the intermediate plate 120. (That is, the engaging pawls 150 are formed with substantially triangular shapes in cross-section.)

A pair of spring-engaging portions 152 is provided at an outer peripheral portion of the intermediate plate 120. These two spring-engaging portions 152 are provided at mutually opposite sides in the circumferential direction (sides which are opposite by 180°, which is to say positions with point symmetry about a center on the axis of the intermediate plate 120). This pair of spring-engaging portions 152 corresponds with a retainer 156, which will be described later.

As shown in FIG. 7, a pair of engaging recess portions 154 is formed in the intermediate plate 120. The engaging recess portions 154 have substantially rectangular cross-sections and oppose the pair of engaging protrusions 116 of the above-described shaft 106. The pair of engaging recess portions 154 open towards the axial direction one end side of the shaft 106 (i.e., a side thereof opposite from the side thereof at which the base 126 is disposed). The pair of engaging protrusions 116 of the shaft 106 removably fit into the pair of engaging recess portions 154 from the opening side thereof.

Thus, the intermediate plate 120 is made to be movable toward the axial direction other side (i.e., the base 126 side) with respect to the shaft 106. When the intermediate plate 120 moves toward the axial direction other side of the shaft 106, the engaging pawls 132 of the base 126 engage with the engaging pawls 150 of the intermediate plate 120.

A length dimension of the pair of engaging protrusions 116 of the shaft 106, along the axial direction of the shaft 106, is specified to be longer than a range of movement of the intermediate plate 120. Therefore, with this specification, when the intermediate plate 120 moves toward the axial direction other side of the shaft 106 and the engaging pawls 132 of the base 126 engage with the engaging pawls 150 of the intermediate plate 120, the pair of engaging protrusions 116 will not completely disengage from the pair of engaging recess portions 154. Thus, the shaft 106 and the intermediate plate 120 basically rotate as one body.

Here, as described above, because the pair of engaging protrusions 116 is formed with cross-sectional forms thereof as trapezoid forms, in the state in which the intermediate plate 120 has moved toward the axial direction other side of the shaft 106, the intermediate plate 120 and the shaft 106 are capable of relative rotation within a range corresponding to a variation in the cross-sectional forms of the pair of engaging protrusions 116.

Meanwhile, the retainer 156 is disposed at the axial direction one end side of the intermediate plate 120 (the side in the direction of arrow E in FIGS. 7 and 8). The retainer 156 is formed in a flat circular disc form of a spring material, such as a metallic material or the like, and is provided with a ring-form main body portion 158. A circular hole 160 is formed at an axial center portion of the main body portion 158, and the shaft 106 is inserted through the circular hole 160. Hence, the main body portion 158 (i.e., the retainer 156) is rotatably supported at the shaft 106, and a hole edge portion of the circular hole 160 abuts against the step portion 108 of the shaft 106 and against the engaging protrusions 116. Thus, movement of the retainer 156 toward the axial direction other side of the shaft 106 (the side in the direction of arrow F in FIGS. 7 and 8) is limited.

A pair of spring portions 162 are provided at a radial direction outer side of the main body portion 158. The spring portions 162 are curved along the circumferential direction of the main body portion 158. This pair of spring portions 162 corresponds with the pair of spring-engaging portions 152 of the above-described intermediate plate 120. Curvature direction one end sides of the spring portions 162 are integrally connected to the main body portion 158, and curvature direction other end sides of the spring portions 162 engage with the pair of spring-engaging portions 152 of the intermediate plate 120.

Hence, by resilient force of the spring portions 162, the retainer 156 applies a predetermined urging force (a returning force when the retainer 156 has been resiliently deformed by axial direction movement of the intermediate plate 120) in response to axial direction movement of the intermediate plate 120 toward the axial direction other side (the base 126 side) of the shaft 106.

Now, in the second clutch 104, when the shaft 106 rotates one way about the axis thereof (in the direction of arrow G in FIGS. 7 to 9), this rotation is transmitted via the pair of engaging protrusions 116 and the pair of engaging recess portions 154 to the intermediate plate 120, and the intermediate plate 120 rotates the one way about the axis together with the shaft 106. At such a time, an inertial force acts to keep the intermediate plate 120 at a current position thereof. As a result, the angled faces 118 of the engaging protrusions 116 are pushed against inner peripheral faces of the engaging recess portions 154 by this inertial force (see arrow T in FIGS. 9 and 10A). At this time, a pressure force P toward the axial direction other side of the shaft 106 is generated at the intermediate plate 120.

Accordingly, when this pressure force P is larger than the urging force of the retainer 156 (that is, when a rotary force of the shaft 106 is equal to or greater than a predetermined value), the intermediate plate 120 rotates together with the shaft 106 and moves toward the axial direction other side (the base 126 side) of the shaft 106, as is shown in FIGS. 6 and 10B, and the engaging pawls 150 of the intermediate plate 120 mesh with the engaging pawls 132 of the base 126. (Note that the retainer 156 is not shown in the drawings of FIGS. 10A and 10B.)

Further, after the engaging pawls 150 and the engaging pawls 132 have meshed, this structure maintains the meshed state, because of rotary torque of the intermediate plate 120 (and the shaft 106) and meshing resistance of the engaging pawls 150 with the engaging pawls 132. Accordingly, rotation of the shaft 106 and the intermediate plate 120 is transmitted to the base 126, and the base 126 rotates integrally with the shaft 106 and the intermediate plate 120. As described earlier, the rotation of the base 126 is transmitted via the friction spring 142 to the clutch gear 122, and the clutch gear 122 rotates accordingly. This rotation of the clutch gear 122 is transmitted through the outward teeth 124 and the outward teeth 44 to the barrel drum 42 (see FIG. 3). Thus, with this structure, the barrel drum 42, and hence the spool 20, is rotated in the winding direction.

Figure 11:
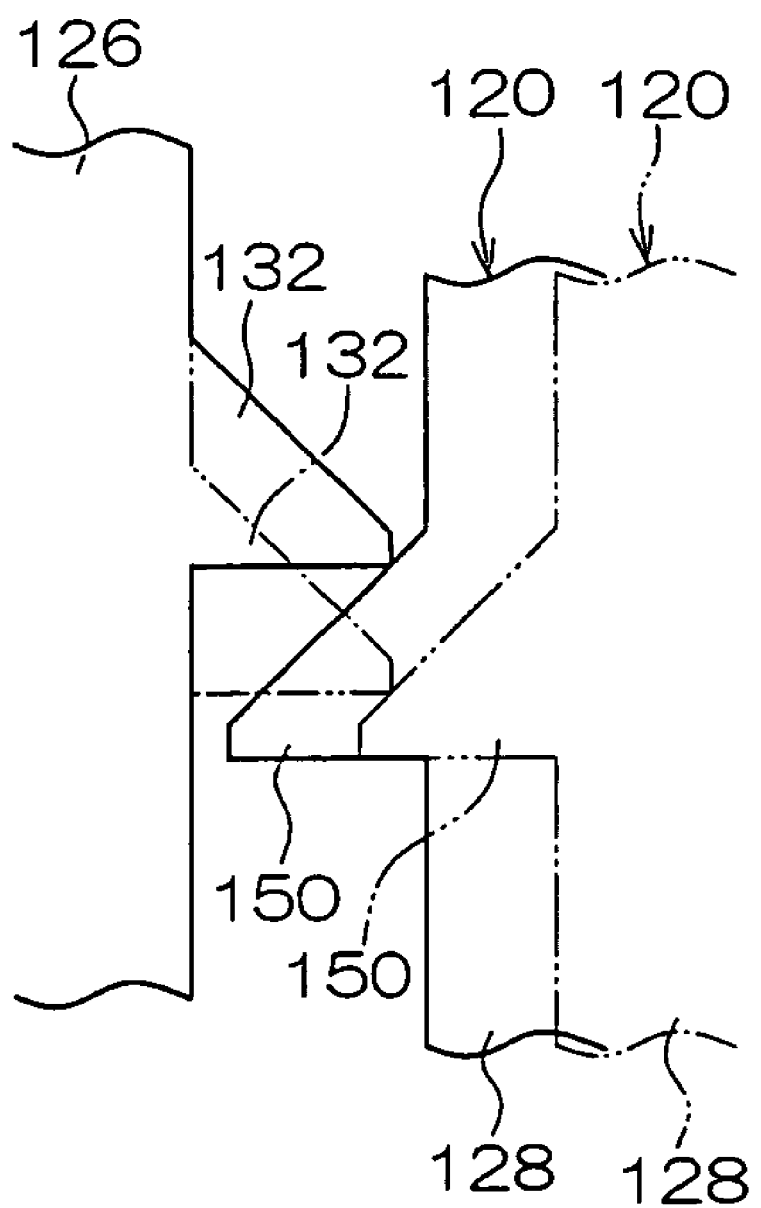
FIG. 11 is a side sectional view showing partial structure of the rotating body and intermediate plate of FIG. 10A.

In this state, as shown in FIG. 11, the inclined faces of the engaging pawls 150 of the intermediate plate 120 are meshed, with line contact or point contact, at end corner portions of the engaging pawls 132 of the base 126, at sides of the engaging pawls 132 that are opposite from the sides at which the inclined faces thereof are formed. As a result, when the rotation of the shaft 106 stops, the meshing of the engaging pawls 132 with the engaging pawls 150 will be immediately released, and the intermediate plate 120 will be immediately separated from the base 126 by the resilient force of the retainer 156.

On the other hand, in this second clutch 104, when the shaft 106 rotates the other way about the axis thereof (in the direction of arrow H in FIGS. 7 to 9), this rotation is transmitted via the pair of engaging protrusions 116 and the pair of engaging recess portions 154 to the intermediate plate 120, and the intermediate plate 120 rotates the other way about the axis together with the shaft 106. At such a time, an inertial force acts on the intermediate plate 120 to keep the intermediate plate 120 at a current position thereof. Therefore, the parallel faces 119 of the engaging protrusions 116 are pushed against inner wall faces of the engaging recess portions 154 by this inertial force. At this time, only a rotary transmission force along the direction of rotation acts on the intermediate plate 120 from the shaft 106. Therefore, the intermediate plate 120 is maintained in the state of being separated from the base 126 by the urging force of the retainer 156, and the intermediate plate 120 rotates freely relative to the base 126.

The second clutch 104 with the structure described above is a structure in which rotary force of the output shaft 68 of the motor 66 is transmitted via the gears 72 and 74, the worm shaft 76, the gear 80 and the face gear 100 to the shaft 106. At such a time, if the output shaft 68 of the motor 66 is turning in the forward direction (the direction of arrow C in FIG. 2), the shaft 106 turns the other way about the axis thereof (in the direction of arrow H in FIG. 2). In contrast, if the output shaft 68 of the motor 66 is turning in the reverse direction (the direction of arrow D in FIG. 2), the shaft 106 turns the one way about the axis thereof (in the direction of arrow G in FIG. 2).

Herein, an overall reduction ratio of the gear 80, the face gear 100, the outward teeth 124 of the clutch gear 122 and the outward teeth 44 of the barrel drum 42 (i.e., the reverse driving force transmission mechanism) is set significantly lower than a reduction ratio of the aforementioned worm gear 84 and worm wheel 96 (i.e., the forward driving force transmission mechanism).

At this motorized retractor 10, as shown in FIG. 1, control of a supply of electricity to the motor 66 is implemented by a control device 164. The control device 164 is structured by a driver 166 and an ECU 168. The motor 66 is electrically connected with a battery 170, which is mounted at the vehicle, via the driver 166. Electric current from the battery 170 is supplied through the driver 166 to the motor 66. The driver 166 is connected to the ECU 168. Whether or not electricity is being supplied through this driver 166 to the motor 66, and directions and magnitudes of supply currents, are controlled by the ECU 168.

The ECU 168 is also connected to both a buckle switch 172 and a forward observation device 174. The buckle switch 172 outputs signals in accordance with whether or not the webbing 28 is applied to a vehicle occupant. The forward observation device 174 outputs signals in accordance with distances between the vehicle and obstacles forward of the vehicle.

The buckle switch 172 outputs an "ON" signal to the ECU 168 when a tongue plate provided at the webbing 28 is joined to a buckle device (which is not illustrated at all herein). The buckle switch 172 outputs an "OFF" signal to the ECU 168 when a state of joining of the tongue plate with the buckle device is released. In other words, the buckle switch 172 is a structure which outputs one or the other of the ON signal and the OFF signal to the ECU 168 in accordance with whether or not the webbing 28 has been applied by the vehicle occupant, i.e., in accordance with the presence or absence of a connection of the tongue plate with the buckle device.

The forward observation device 174 is provided with an infra-red sensor 176, which is disposed in a vicinity of a forward end of the vehicle. The infra-red sensor 176 emits infra-red rays forward of the vehicle, and detects infra-red rays that are reflected from obstacles, other vehicles which are running or stopped in front of the present vehicle, and the like. (Hereafter, other vehicles that are running or stopped will be covered by the term "obstacle" where appropriate.)

The forward observation device 174 is also provided with a calculation section 178. The calculation section 178 calculates a distance to an obstacle in accordance with a time taken from emission of an infrared ray from the infra-red sensor 176 until the infra-red ray that has been reflected at the obstacle returns to the infra-red sensor 176. The calculation section 178 outputs an obstacle detection signal Os to the ECU 168 in accordance with the result of this calculation. This obstacle detection signal Os is set to a "Low" level when the distance to an obstacle is equal to or greater than a predetermined value, and is set to a "High" level when the distance to an obstacle is less than the predetermined value.

Next, operation of this first embodiment will be described.

In the motorized retractor 10 with the structure described above, from the state in which the webbing 28 is wound on in a layered form at the spool 20, when the unillustrated tongue plate is pulled and the webbing 28 is pulled, the spool 20 is rotated in the unwinding direction, against the urging force of the spiral spring 52 which urges the spool 20 in the winding (take-up) direction, and the webbing 28 is drawn out.

In the state in which the webbing 28 has been drawn out in this manner, the webbing 28 is drawn forward around the body of the occupant sitting on the seat, the tongue plate is inserted into the buckle device, and the tongue plate is retained at the buckle device. Thus, the webbing 28 is put into a state of application thereof to the body of the occupant.

In the state in which the webbing 28 is applied to the occupant, the webbing 28 restrains the occupant comparatively weakly with the urging force of the spiral spring 52. Further, in this state, the ON signal is inputted from the buckle switch 172 to the ECU 168.

When the vehicle stops and the occupant removes the tongue plate from the buckle device, the spool 20 is turned in the winding direction by the urging force of the spiral spring 52. Here, because the urging force of the spiral spring 52 is set to be comparatively weak, the spool 20 rotates in the winding direction with a comparatively weak rotary force corresponding to the urging force of the spiral spring 52.

At this time, the OFF signal is inputted to the ECU 168 from the buckle switch 172. The ECU 168 at which the OFF signal has been inputted outputs a control signal to the driver 166 for commencing a supply of electricity to the motor 66. The driver 166 to which this control signal has been inputted causes the output shaft 68 of the motor 66 to rapidly rotate in the reverse direction (i.e., the direction of arrow D in FIG. 2). The rapid rotation of the output shaft 68 in the reverse direction is transmitted through the gears 72 and 74 to the worm shaft 76, and the gear 80 and worm gear 84 also rapidly rotate.

The rapid rotation of the worm gear 84 is transmitted to the worm wheel 96 of the first clutch 94, and the worm wheel 96 is rotated in the unwinding direction (the direction of arrow B in FIG. 2) with a speed of rotation of at least a predetermined value. At this time, the worm wheel 96 and the adaptor (i.e., the spool 20) are maintained in a state in which mechanical coupling by the unillustrated transmission member is released. Therefore, the worm wheel 96 and the adaptor (the spool 20) relatively rotate freely.

Figure 2:
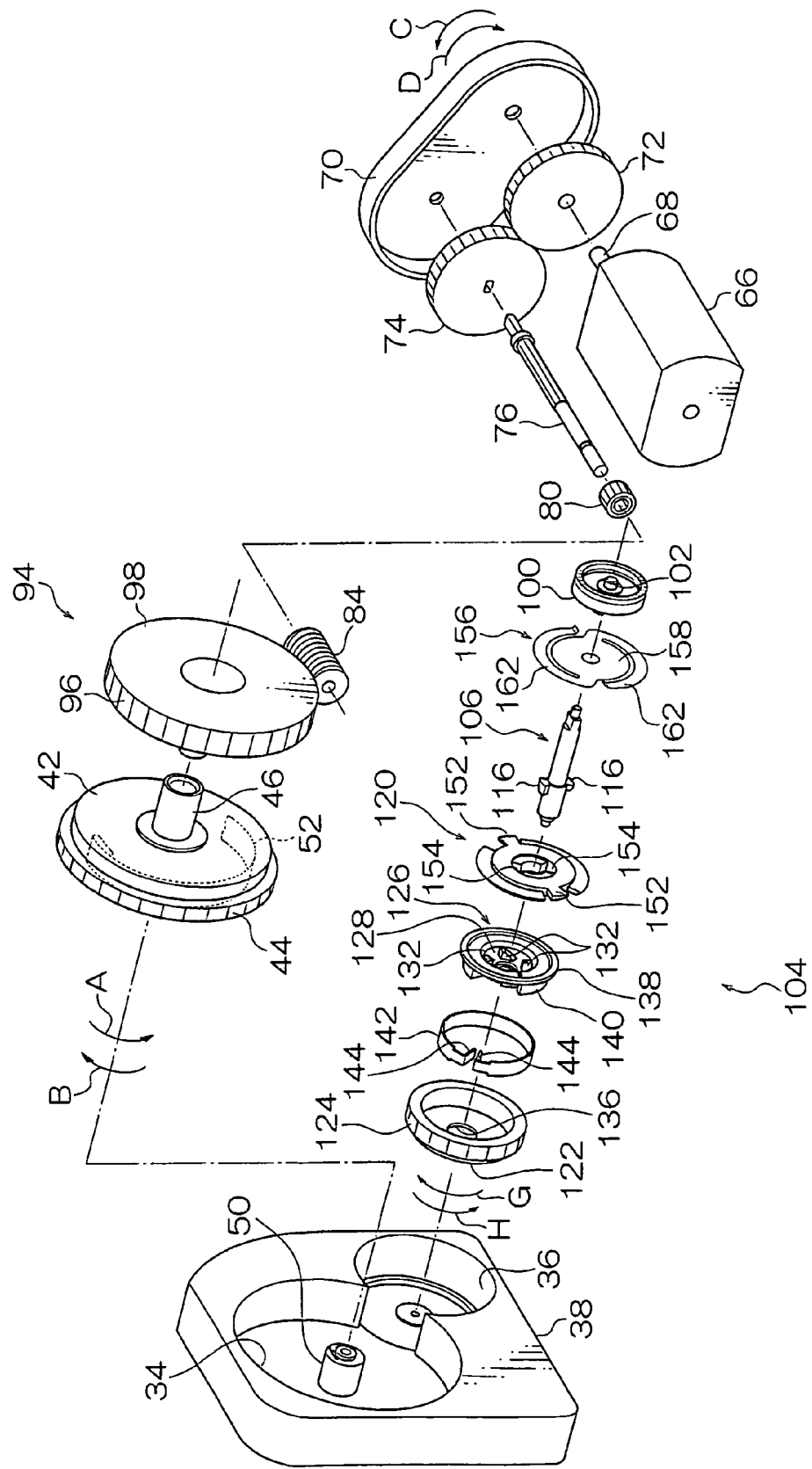
FIG. 2 is an exploded perspective view showing structure of principal elements of the motorized retractor of FIG. 1.

Meanwhile, the rapid rotation of the gear 80 is transmitted to the shaft 106 of the second clutch 104 via the face gear 100, and the shaft 106 rapidly rotates in the one direction about the axis thereof (the direction of arrow G in FIG. 2). The rapid rotation of the shaft 106 is transmitted via the engaging protrusions 116 and the engaging recess portions 154 to the intermediate plate 120. At this time, the intermediate plate 120 acts to rotate to follow the shaft 106, but the intermediate plate 120 also acts to stay at a current position thereof due to inertia. Therefore, the angled faces 118 of the engaging protrusions 116 push against the inner wall faces of the engaging recess portions 154 (see arrow T in FIGS. 9 and 10A). Consequently, the pressure force P toward the axial direction other side of the shaft 106 is generated at the intermediate plate 120. As a result, the intermediate plate 120 moves toward the axial direction other side of the shaft 106, against the urging force of the retainer 156, while rotating with the shaft 106. Accordingly, the engaging pawls 150 of the intermediate plate 120 mesh with the engaging pawls 132 of the base 126 (the state shown in FIG. 10B). Hence, the rotation of the intermediate plate 120 is transmitted to the base 126, and the base 126 rotates together with the intermediate plate 120.

Further, the rotation of the base 126 is transmitted to the clutch gear 122 via the friction spring 142, and the clutch gear 122 rotates in the one direction about the axis thereof. Because the outward teeth 44 of the barrel drum 42 are meshed with the outward teeth 124 of the clutch gear 122, the barrel drum 42 rotates in the winding direction, and thus the spool 20 is rotated in the winding direction. Inadequacy of the urging force of the spiral spring 52 is compensated for by this rotation of the spool 20, and the webbing 28 is wound up and accommodated in the layered form at the spool 20 (the "winding-assistance mechanism").

Moreover, at this time, the overall reduction ratio according to the gear 80, the face gear 100, the outward teeth 124 of the clutch gear 122 and the outward teeth 44 of the barrel drum 42 (the reverse driving force transmission mechanism) is set to be significantly lower than the reduction ratio of the aforementioned worm gear 84 and worm wheel 96 (the forward driving force transmission mechanism). Thus, because the spool 20 is rotated with a low torque, it is possible to wind up and accommodate the webbing 28 at the spool 20 safely.

When the webbing 28 is completely wound up onto the spool 20, electricity supply to the motor 66 is cut off by the ECU 168 and the driver 166, and the rotation of the output shaft 68 of the motor 66 stops. Consequently, the rotation of the shaft 106 stops, and the intermediate plate 120 is promptly separated from the base 126 by the resilient force of the retainer 156. As a result, the coupling of the spool 20 with the output shaft 68 of the motor 66 by the second clutch 104 is cancelled, and it is possible for the webbing 28 that has been wound up on the spool 20 to be drawn out again.

Now, during running of the vehicle, distances to obstacles forward of the vehicle are calculated by the calculation section 178 in accordance with results of detection by the infra-red sensor 176 of the forward observation device 174. If, for example, there is no obstacle in front of the vehicle, or there is an obstacle but the distance to the obstacle is not less than a predetermined value, the Low level signal is outputted from the calculation section 178. On the other hand, if the distance to a forward obstacle from the vehicle is less than the predetermined value, the High level signal is outputted from the calculation section 178.

When the High level signal from the calculation section 178 is inputted to the ECU 168, the ECU 168 outputs a predetermined operation signal to the driver 166. The driver 166 to which the operation signal has been inputted in this state commences a supply of electricity to the motor 66 and causes the output shaft 68 to rapidly rotate forward (i.e., in the direction of arrow C in FIG. 2).

The rapid rotation of the output shaft 68 in the forward direction is transmitted via the gears 72 and 74 to the worm shaft 76, and the gear 80 and the worm gear 84 rapidly rotate.

The rapid rotation of the gear 80 is transmitted via the face gear 100 to the shaft 106 of the second clutch 104, and the shaft 106 rapidly rotates in the other direction about the axis thereof (the direction of arrow H in FIG. 2). The rapid rotation of the shaft 106 is transmitted to the intermediate plate 120 via the engaging protrusions 116 and the engaging recess portions 154, and the intermediate plate 120 also rotates in the other direction about the axis. At this time, inertial force acts on the intermediate plate 120 to keep the intermediate plate 120 at a current position thereof. As a result, the parallel faces 119 of the engaging protrusions 116 are pushed against the inner wall faces of the engaging recess portions 154 by this inertial force. Because, at this time, only the rotary transmission force along the direction of rotation is acting on the intermediate plate 120 from the shaft 106, the intermediate plate 120 is maintained in the state of being separated from the base 126 by the urging force of the retainer 156, and the intermediate plate 120 rotates freely with respect to the base 126.

Meanwhile, the rapid rotation of the worm gear 84 is transmitted to the worm wheel 96 of the first clutch 94, and causes the worm wheel 96 to rotate in the winding direction (the direction of arrow A in FIG. 2) with a speed of rotation of at least a predetermined value. As a result, the worm wheel 96 and the adapter, which is a spool-side member, are coupled by the transmission member and the spool 20 is rotated in the winding direction integrally with the worm wheel 96. The webbing 28 is wound onto the spool 20 by this rotation of the spool 20 in the winding direction. Thus, slackness (looseness) of the webbing 28 is eliminated, and a restraining force on the body of the vehicle occupant from the webbing 28 is increased (the "pretensioner mechanism").

Further, at this time, the rotation of the output shaft 68 of the motor 66 is reduced by the worm gear 84 and the worm wheel 96 (the forward driving force transmission mechanism), which generally have a high reduction ratio, and transmitted to the spool 20. Thus, the spool 20 is turned in the winding direction with a high torque. Therefore, even if, for example, the vehicle rapidly decelerates (suddenly brakes) during the winding of the webbing 28 onto the spool 20 and the vehicle occupant acts to move toward the front of the vehicle as a result, the webbing 28 can be forcibly wound up in opposition to an inertial force of the vehicle occupant.

Thus, with the motorized retractor 10 relating to the first embodiment, it is possible to provide the mutually contrasting characteristics required for both the winding-assistance mechanism and the pretensioner mechanism with the single motor 66.

Furthermore, with the motorized retractor 10 relating to the first embodiment, in the state in which winding of the webbing 28 onto the spool 20 is being assisted by means of the reverse driving force transmission mechanism, if, for example, the webbing 28 is pulled out by a vehicle occupant's arm or the like and a load equal to or greater than a predetermined value acts on the clutch gear 122 of the second clutch 104 via the barrel drum 42 of the spool 20, the friction spring 142 relatively rotates with respect to the clutch gear 122 and relative rotation of the base 126 with respect to the clutch gear 122 is enabled. Therefore, it is possible to prevent the spool 20 from being wound up strongly in a state in which the webbing 28 is interfering with a vehicle occupant or the like, it is possible to prevent excessive loads acting on components beyond the clutch gear 122 (i.e., structures toward the output shaft 68, such as the base 126, the intermediate plate 120, the shaft 106, the face gear 100 and the like), and it is possible to avoid damage to the components, burn-out of the motor 66 and the like.

Note that, the above-described first embodiment has a structure in which the side walls of the pair of engaging protrusions 116 of the shaft 106 that structures the second clutch 104 serve as the helical-form angled faces 118. However, this is not a limitation. For example, a structure is possible in which inner walls of the pair of engaging recess portions 154 of the intermediate plate 120 serve as inclined faces, and a structure is possible in which inclined faces are provided at both the pair of engaging protrusions 116 and the pair of engaging recess portions 154. In such cases too, it is possible to generate pressure forces along the axial direction of the shaft 106 at the intermediate plate 120.

SECOND EMBODIMENT

Next, a second embodiment of the present invention will be described. Note that structures and operations that are essentially the same as in the first embodiment are assigned the same reference numerals as in the first embodiment, and descriptions thereof are omitted.

Figure 12:
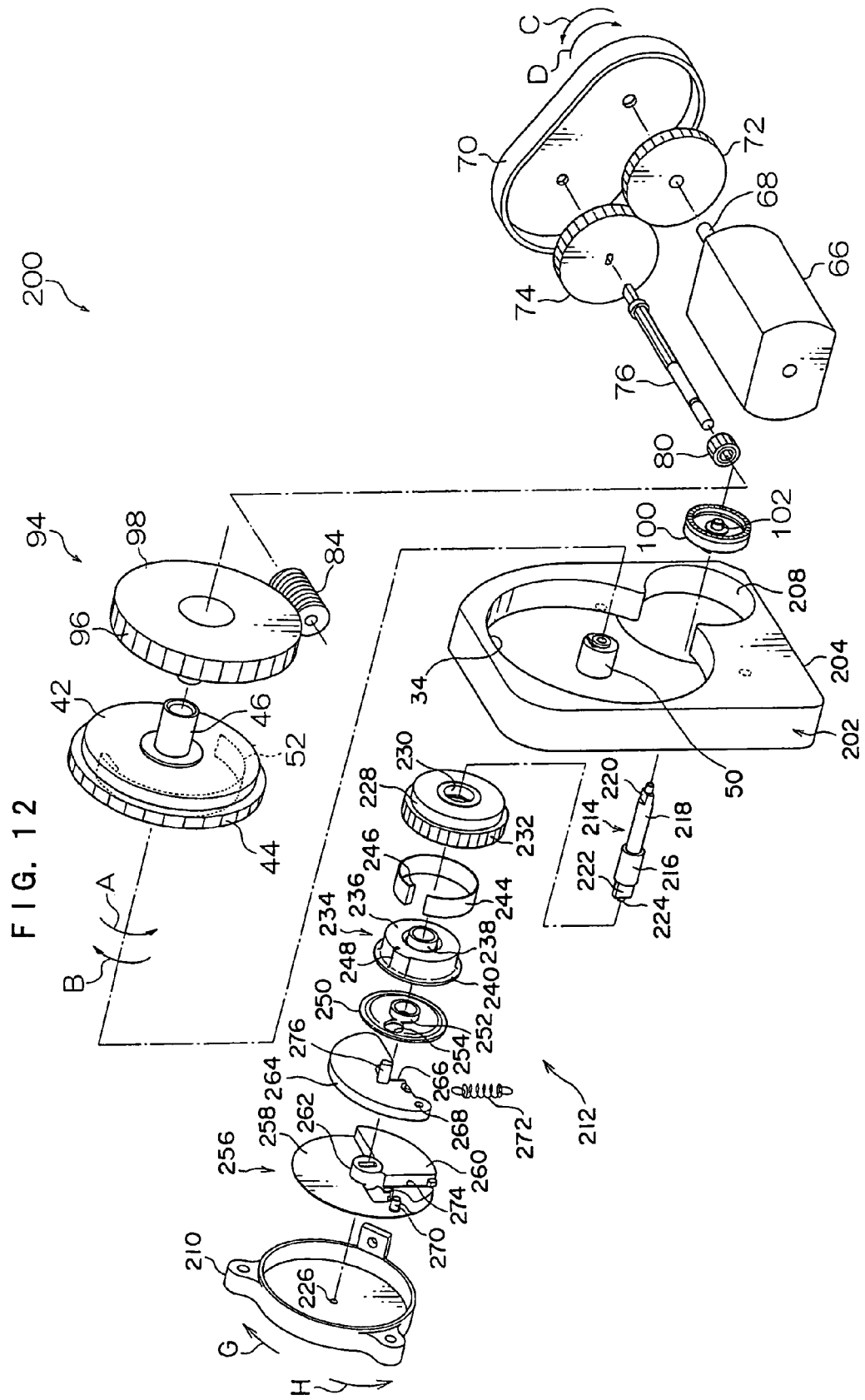
FIG. 12 is an exploded perspective view showing structure of principal elements of a motorized retractor relating to a second embodiment of the present invention.

FIG. 12 shows a schematic exploded perspective view of principal elements of a motorized retractor 200 relating to the second embodiment of the present invention.

The motorized retractor 200 has a structure that is basically similar to the motorized retractor 10 relating to the first embodiment, but differs in the following respects.

As shown in FIG. 12, the motorized retractor 200 is provided with a case 202. The case 202 has a structure basically the same as the case 32 of the motorized retractor 10 relating to the first embodiment, and is provided with a case main body 204 and the cover 40 (see FIG. 13). The case main body 204 is provided with the first accommodation portion 34 and a second accommodation portion 208. Similarly to the motorized retractor 10 relating to the first embodiment, the barrel drum 42 is accommodated inside the first accommodation portion 34. The second accommodation portion 208 penetrates through the case main body 204 in a thickness direction thereof, and a region of this through-penetration is closed off by a rotor cover 210, which has the form of a circular tube with a base.

A second clutch 212, which structures a reverse driving force transmission mechanism, is accommodated inside the second accommodation portion 208 and the rotor cover 210. The second clutch 212 is provided with a circular columnform rod 214. The rod 214 is formed in a stepped shape which features a large-diameter portion 216 and a small-diameter portion 218.

Figure 13:
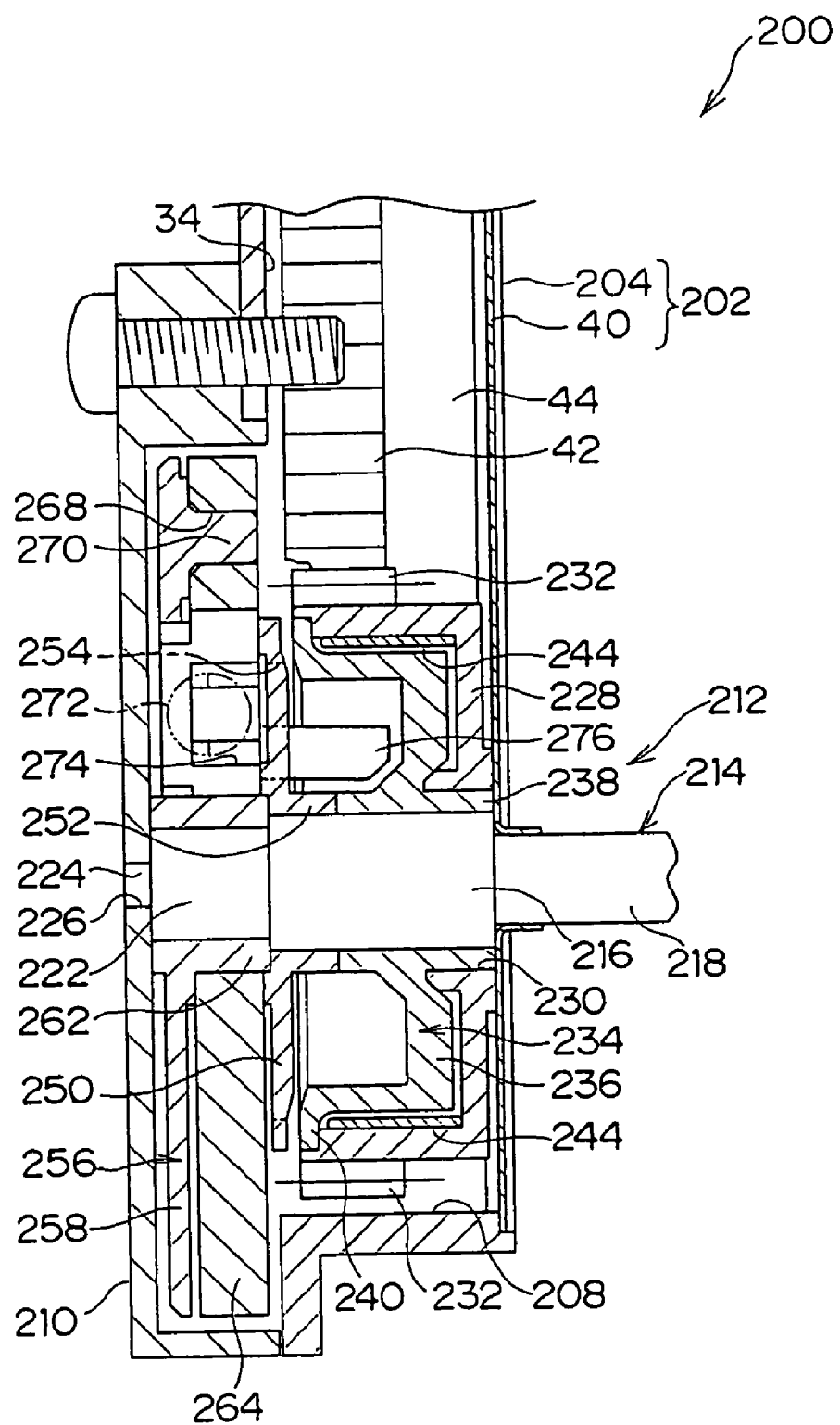
FIG. 13 is a plan sectional view showing partial structure of a reverse driving force transmission mechanism which is a structural member of the motorized retractor of FIG. 12.

As shown in FIG. 13, the small-diameter portion 218 of the rod 214 passes through a through-hole formed in the cover 40 of the case 202 and protrudes to an outer side of the case 202. The small-diameter portion 218 is coaxially and integrally coupled with the face gear 100 via a gear-coupling portion 220, which is provided at a distal end of the small-diameter portion 218 (see FIGS. 14 and 15). At a distal end of the large-diameter portion 216 of the rod 214, a plate-form rotor-coupling portion 222 is protrudingly provided. A cylindrical shaft support portion 224 is provided protruding from a distal end of this rotor-coupling portion 222. This shaft support portion 224 is rotatably supported at a circular hole 226, which is formed at a central portion of a base wall of the rotor cover 210. Thus, the rod 214 is supported, by the face gear 100 and the shaft support portion 224, to be immovable in the axial direction but rotatable about the axis.

Meanwhile, a clutch gear 228, which is formed in the shape of a circular tube with a base, is accommodated inside the second accommodation portion 208 of the case main body 204 to be coaxial with the rod 214. A circular hole 230 is formed at a central portion of a base wall of the clutch gear 228. The circular hole 230 is formed with a larger diameter than the large-diameter portion 216 of the rod 214, and the large-diameter portion 216 of the rod 214 passes through the circular hole 230. Outer teeth 232 are formed at an outer peripheral portion of the clutch gear 228. These outer teeth 232 serve as a spur gear.

A base 234 is accommodated inside the clutch gear 228. The base 234 is provided with a main body portion 236, which has the form of a circular tube with a base. A circular tube-form shaft support portion 238 is provided at an axial center portion of this main body portion 236. The large-diameter portion 216 of the rod 214 passes into the tube of this shaft support portion 238 to be freely rotatable. Thus, the main body portion 236 (and the base 234) is rotatably supported at the rod 214.

As shown in FIG. 13, one end side of this base 234 in the axial direction of the shaft support portion 238 rotatably fits into the circular hole 230 of the clutch gear 228, and a flange portion 240, which is formed at the opening side of the main body portion 236, rotatably fits into the opening portion of the clutch gear 228. Hence, in a state in which the outer teeth 232 of the clutch gear 228 are meshed with the outward teeth 44 of the barrel drum 42, the base 234 rotatably supports the clutch gear 228 (see FIG. 16).

Figure 16:
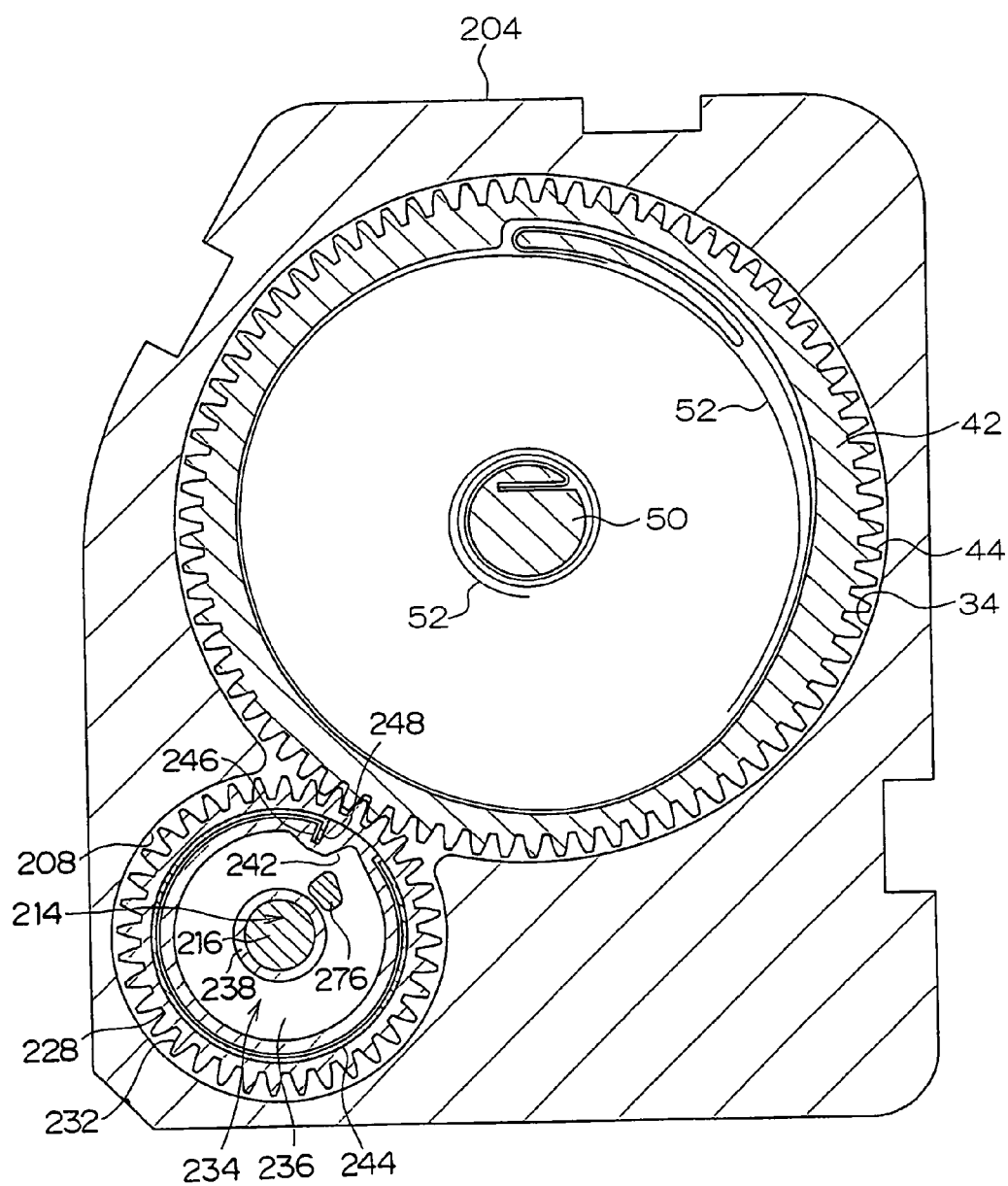
FIG. 16 is a side sectional view showing partial structure of the reverse driving force transmission mechanism which is a structural member of the motorized retractor of FIG. 12.

As shown in FIG. 16, a meshing portion 242 is formed at an inner peripheral face of the main body portion 236. The meshing portion 242 is inclined at a predetermined angle (for example, 15°) with respect to a radial direction of the main body portion 236. This meshing portion 242 corresponds with a meshing protrusion 276 of a meshing weight 264, which will be described later.

An outer radius dimension of the main body portion 236 is significantly smaller than an inner radius dimension of the clutch gear 228, and an annular gap is formed between an outer peripheral face of the main body portion 236 and an inner peripheral face of the clutch gear 228. A friction spring 244 is disposed in this annular gap.

The friction spring 244 is structured basically similar to the friction spring 142 relating to the first embodiment, but a detent pawl 246 is provided at one circumferential direction end portion of the friction spring 244. The detent pawl 246 fits into a slit-like detent groove 248, which is formed in an outer peripheral portion of the main body portion 236 of the base 234. Hence, the friction spring 244 and the base 234 are integrally coupled via the detent pawl 246 and the detent groove 248. Thus, the base 234 and the clutch gear 228 are basically structured to rotate integrally via the friction spring 244.

Similarly to the case of the second clutch 104 described earlier, if a rotary force that is generated by relative rotation of the friction spring 244 with respect to the clutch gear 228 is larger than a frictional force generated between an outer peripheral face of the friction spring 244 and the inner peripheral face of the clutch gear 228, the friction spring 244 will relatively rotate with respect to the clutch gear 228. Therefore, with this structure, relative rotation of the base 234 with respect to the clutch gear 228 is enabled.

Figure 14:
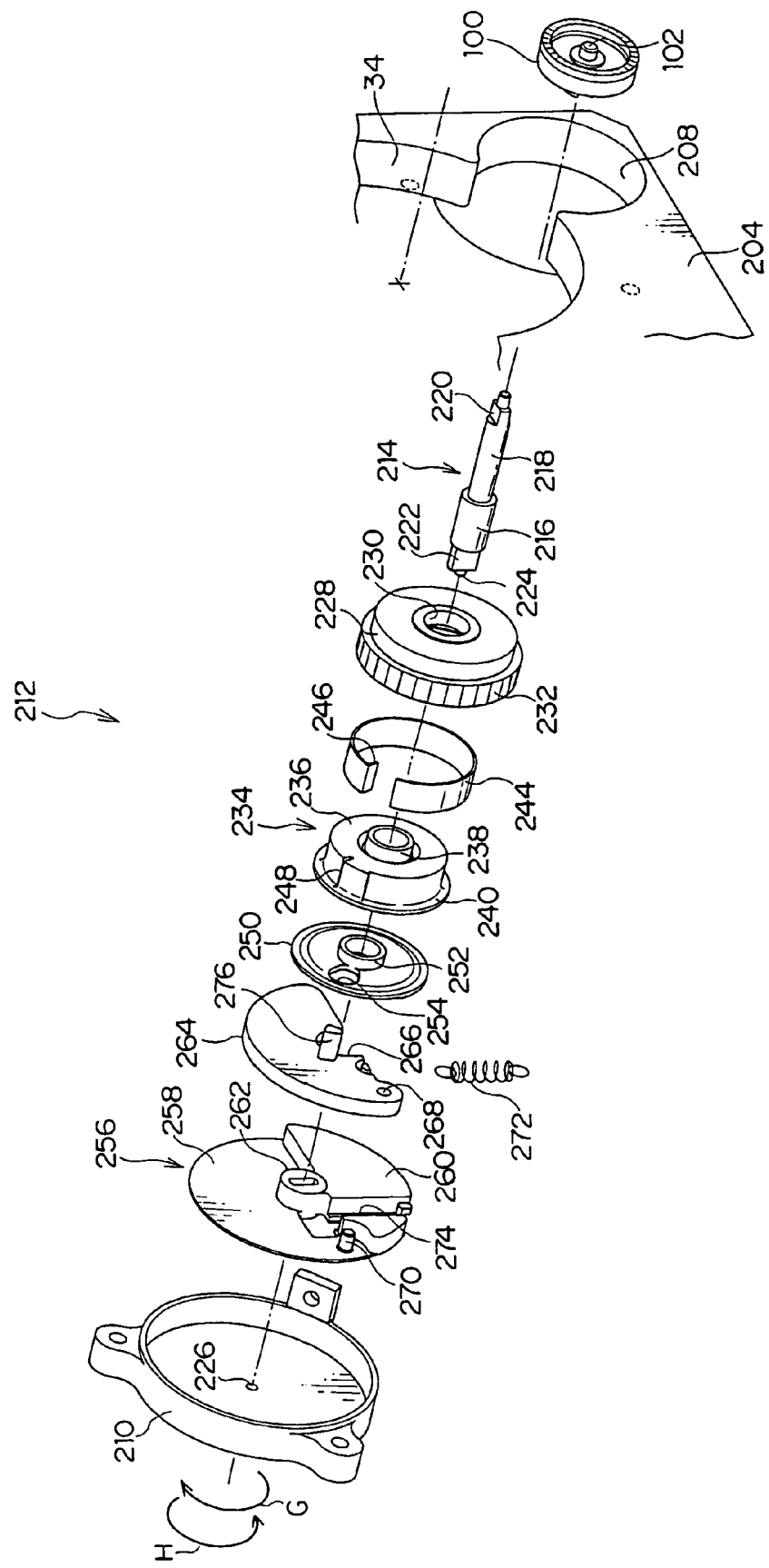
FIG. 14 is an exploded perspective view showing structure of principal elements of the reverse driving force transmission mechanism which is a structural member of the motorized retractor of FIG. 12.
Figure 15:
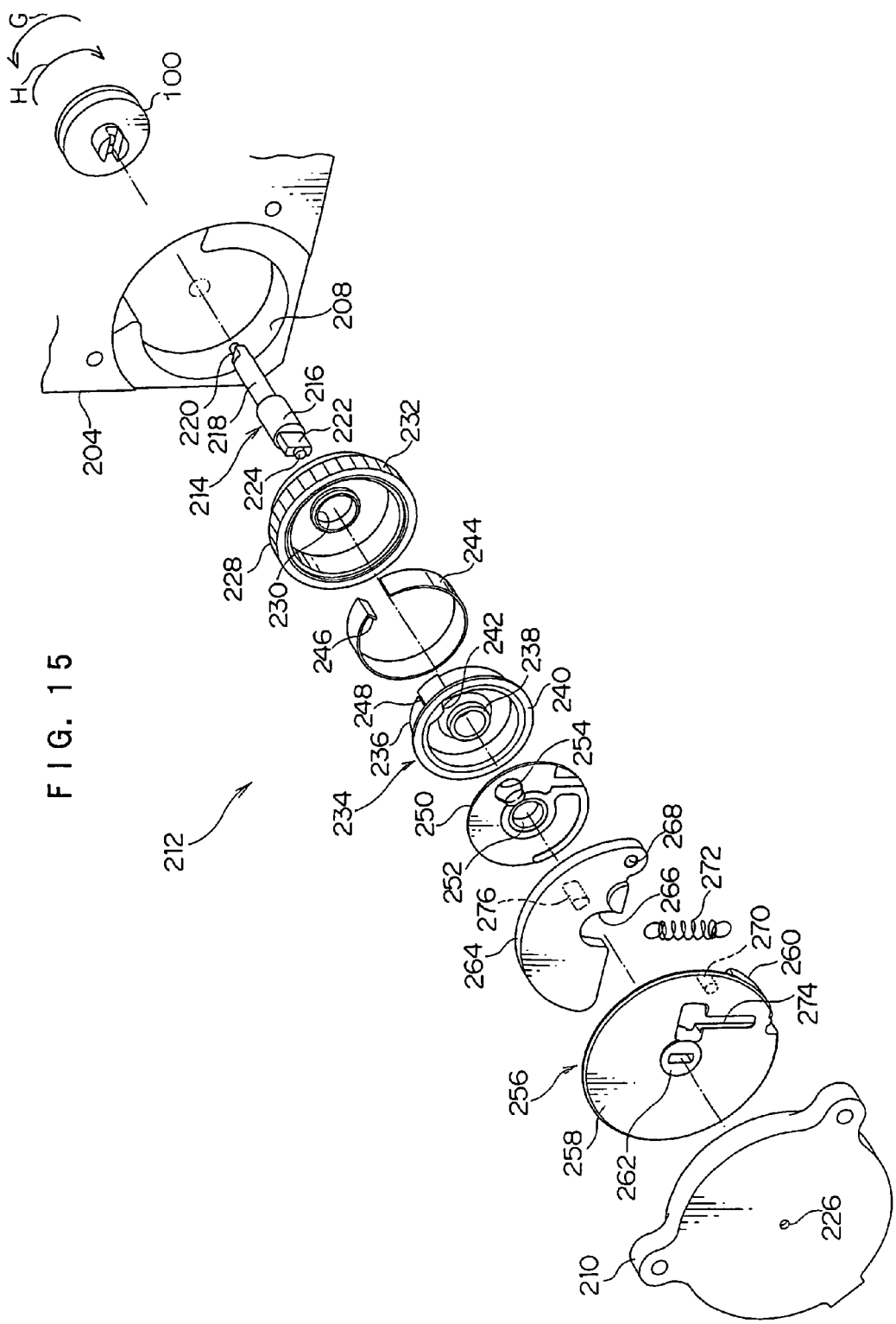
FIG. 15 is an exploded perspective view showing structure of the principal elements of the reverse driving force transmission mechanism which is a structural member of the motorized retractor of FIG. 12.

Meanwhile, as shown in FIGS. 14 and 15, a circular disc-form spacer 250 is disposed at one axial direction side of the base 234 (a side opposite from the side thereof at which the clutch gear 228 is disposed). In a state in which the rod 214 passes through a circular tube-form shaft support portion 252, which is formed at an axial center portion of the spacer 250, the spacer 250 is integrally coupled with the rod 214. A through-hole 254 with a substantially circular cross-section is formed in the spacer 250 at a radial direction outer side relative to the shaft support portion 252. This through-hole 254 corresponds with the meshing protrusion 276 of the meshing weight 264 which will be described later.

Further, a rotor 256 is disposed at one side in the axial direction of the spacer 250 (a side thereof opposite from the side at which the base 234 is disposed). As shown in FIG. 14, the rotor 256 is formed in a circular disc shape overall, which integrally includes a substantially semi-circular thin-wall portion 258 and a substantially semi-circular thick-wall portion 260. The rotor 256 is accommodated inside the rotor cover 210. A cylindrical rod-coupling portion 262 is formed at an axial center portion of the rotor 256, and a coupling hole with a rectangular cross-section is formed at a central portion of this rod-coupling portion 262. When the rotor-coupling portion 222 of the above-described rod 214 is fitted into this coupling hole, the rotor 256 and the rod 214 are coaxially and integrally coupled.

The meshing weight 264 is disposed at the spacer 250 side of the thin-wall portion 258. The meshing weight 264 is formed in a substantially semi-circular plate form which corresponds with the thin-wall portion 258. A cutaway 266 with a substantially semi-circular cross-section is formed in this meshing weight 264, at a region which corresponds with the rod-coupling portion 262 of the rotor 256.

A bearing hole 268 with a circular cross-section is formed at a circumferential direction one end side of this meshing weight 264. A cylindrical support shaft 270, which is provided protruding from the thin-wall portion 258 of the rotor 256, fits into this bearing hole 268 to be freely rotatable. Thus, the meshing weight 264 is supported at the rotor 256 to be rotatable about the support shaft 270 (the bearing hole 268) in the radial direction of the rotor 256.

Figure 17:
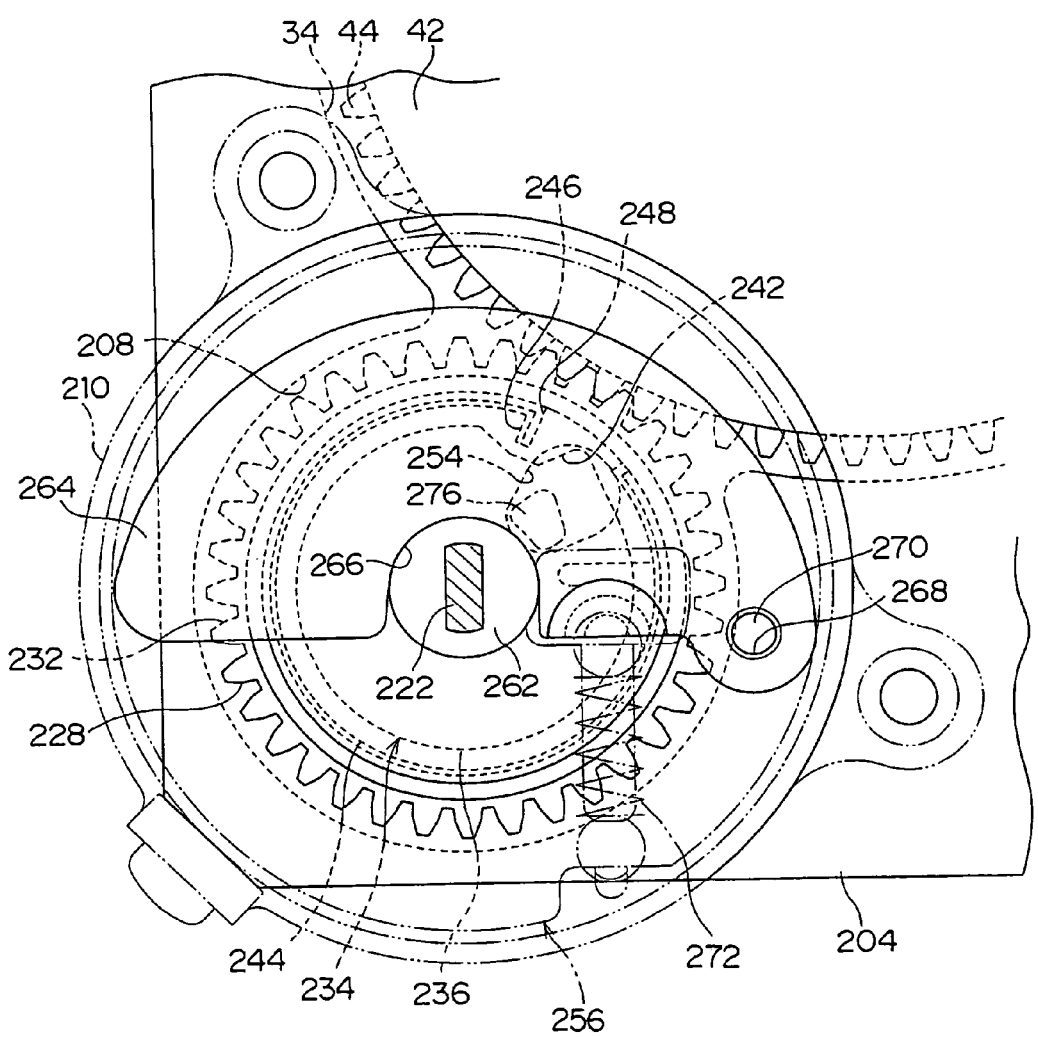
FIG. 17 is a side view showing structure of peripheral members including the reverse driving force transmission mechanism of FIG. 16.

One end portion of a return spring 272, which is a torsion coil spring, is anchored at the meshing weight 264, between the cutaway 266 and the bearing hole 268. The return spring 272 is accommodated in a spring groove 274, which is formed in the thick-wall portion 260 of the rotor 256. Another end portion of the return spring 272 is anchored at the rotor 256. Hence, the meshing weight 264 is continuously urged around the support shaft 270 toward the radial direction inner side (i.e., the thick-wall portion 260 side) of the rotor 256 by urging force of the return spring 272. Thus, as shown in FIG. 17, the meshing weight 264 is usually retained in a state in which an inner peripheral face of the cutaway 266 abuts against an outer peripheral face of the rod-coupling portion 262.

Furthermore, as shown in FIG. 14, the meshing protrusion 276, which has a substantially prismatic form, is provided protruding from a hole edge portion of the cutaway 266 at a surface of the spacer 250 side of the meshing weight 264. As shown in FIG. 13, this meshing protrusion 276 passes through the through-hole 254 of the above-described spacer 250, and a distal end side of the meshing protrusion 276 is inserted into the main body portion 236 of the base 234. Further, as shown in FIG. 17, in the state in which the meshing weight 264 is retained at the radial direction inner side (the thick-wall portion 260 side) of the rotor 256 by the urging force of the return spring 272 (the state in which the cutaway 266 of the meshing weight 264 is abutted against the rod-coupling portion 262 of the rotor 256), the meshing protrusion 276 is disposed with a predetermined separation thereof from the inner peripheral face of the main body portion 236 of the base 234. In this state, the base 234 is freely rotatable relative to the meshing weight 264 (and the rotor 256).

Figure 18:
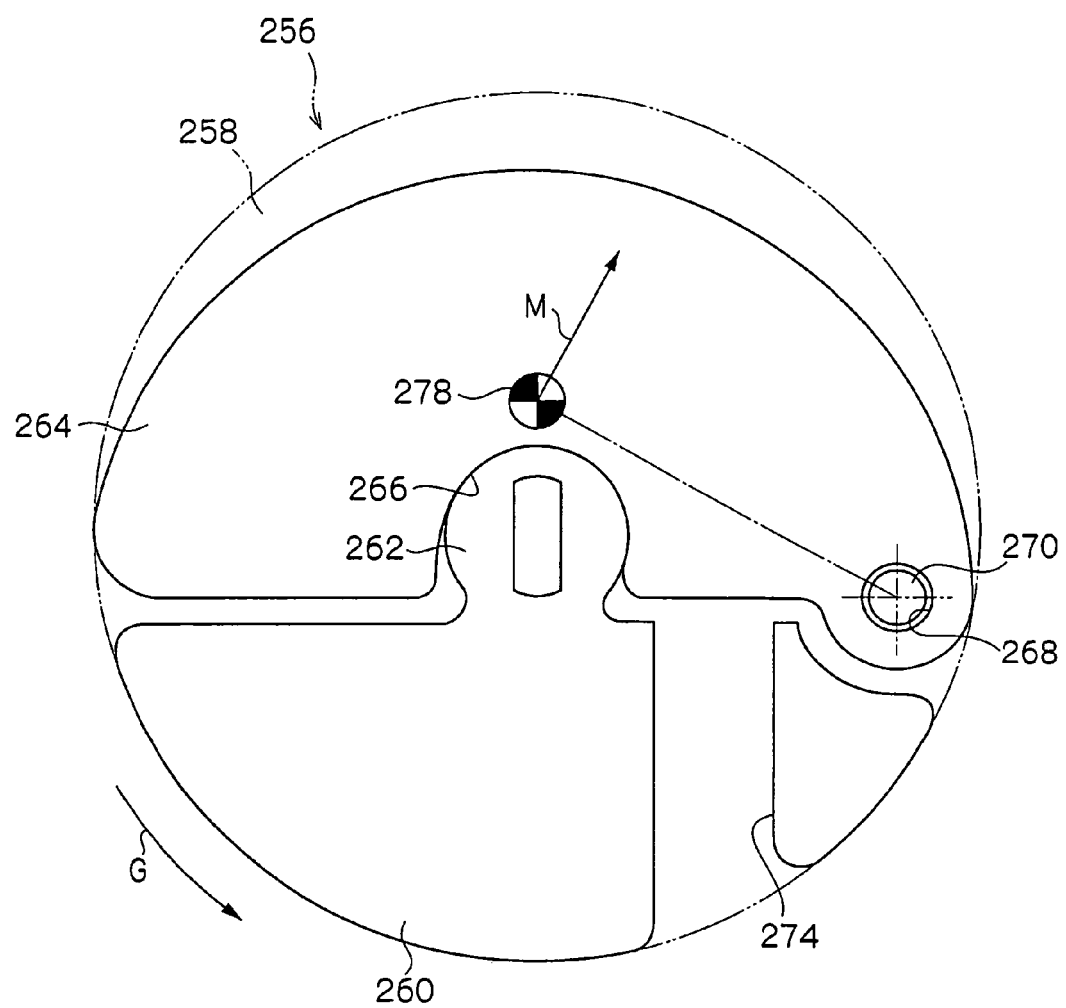
FIG. 18 is a schematic side view showing structure of a meshing weight and a rotor which are structural members of the motorized retractor of FIG. 17.

Now, in this second clutch 212, when the rod 214 rotates one way about the axis thereof (the direction of arrow G in FIGS. 14 and 15), the rotor 256 and the spacer 250, which are integrally coupled with the rod 214, rotate the one way about the axis thereof (the direction of arrow G in FIGS. 14 and 15) together with the rod 214. Further, the rotation of the rotor 256 the one way about the axis is transmitted via the support shaft 270 and the bearing hole 268 to the meshing weight 264, and the meshing weight 264 rotates around the rod 214 to follow the rotor 256. At such a time in this structure, a centrifugal force acts on the meshing weight 264 and, as shown in FIG. 18, a rotary torque M about the support shaft 270 acts at a center of gravity portion 278 of the meshing weight 264.

Figure 19A:
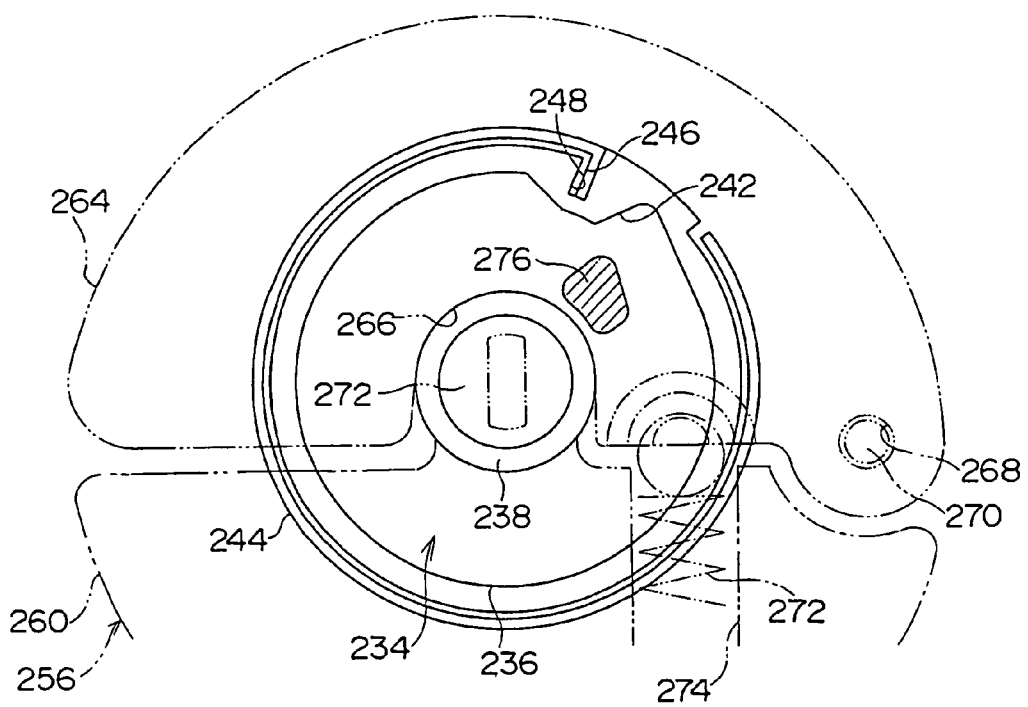
FIG. 19A is a schematic side view showing structure of principal elements of the reverse driving force transmission mechanism of FIG. 17, which shows a state in which the meshing weight is retained at a radial direction inner side of the rotor.
Figure 19B:
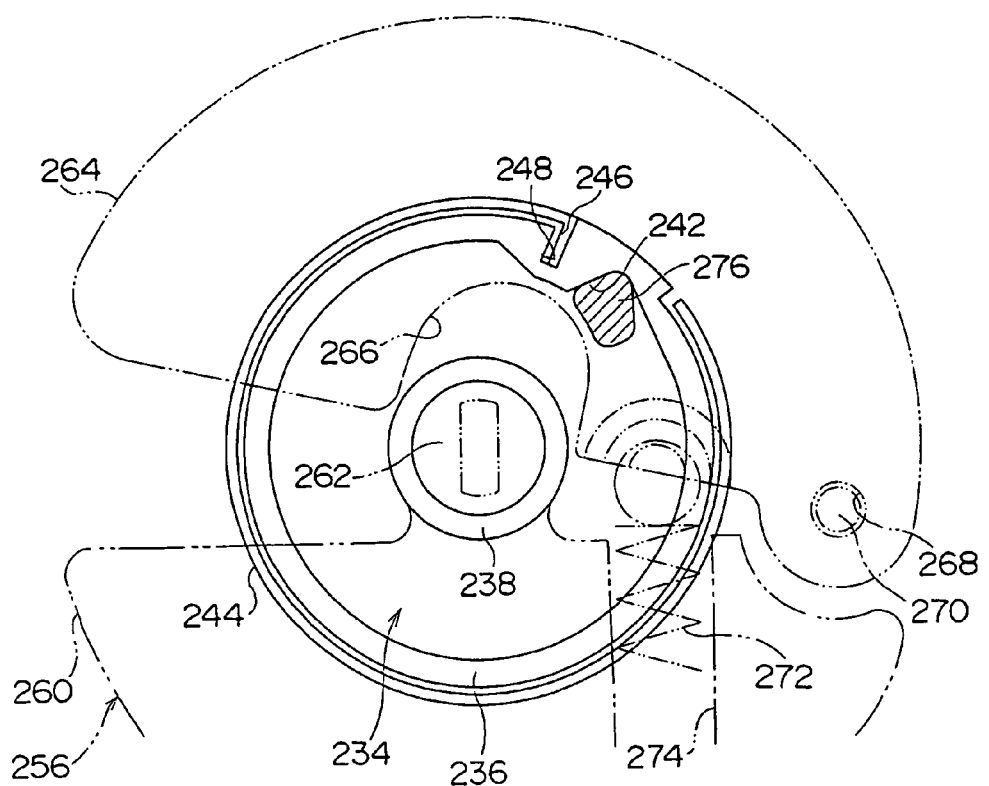
FIG. 19B is a schematic side view showing a state in which the meshing weight of FIG. 19A has moved toward a radial direction outer side of the rotor.

Accordingly, if a magnitude of this rotary torque M is equal to or greater than a predetermined value, that is, if a speed of rotation of the meshing weight 264 (and the rotor 256) is equal to or greater than a predetermined value, the meshing weight 264 rotates about the support shaft 270 toward the radial direction outer side relative to the rotor 256 (i.e., in a direction for separating from the thick-wall portion 260) in opposition to the urging force of the return spring 272 (see FIGS. 19A and 19B).

At this time, the rotation of the meshing weight 264 is limited by the meshing protrusion 276 abutting against the inner peripheral face of the main body portion 236 of the base 234, and the meshing protrusion 276 engages with the meshing portion 242 which is provided protruding from the inner peripheral face of the main body portion 236 (see FIG. 19B). In this state, the rotor 256 and the base 234 are integrally coupled via the meshing weight 264, and the base 234 acts so as to rotate integrally with the rotor 256 (and the rod 214).

On the other hand, when the rotor 256 (the rod 214) stops, the meshing weight 264 starts to rotate toward the radial direction inner side relative to the rotor 256 (i.e., toward the thick-wall portion 260), because of the urging force of the return spring 272. Thus, the above-described engagement of the meshing protrusion 276 with the meshing portion 242 is promptly released (the state shown in FIG. 19A).

At the second clutch 212 with the structure described above, rotary force of the output shaft 68 of the motor 66 is transmitted through the gears 72 and 74, the worm shaft 76, the gear 80 and the face gear 100 to the rod 214. At such a time, if the output shaft 68 of the motor 66 is turning in the forward direction (the direction of arrow C in FIG. 12), the rod 214 turns to the other way around the axis thereof (the direction of arrow H in FIG. 12) with a speed of rotation of at least a predetermined value. Further, with this structure, if the output shaft 68 of the motor 66 is turning in the reverse direction (the direction of arrow D in FIG. 12), the rod 214 turns the one way about the axis thereof (the direction of arrow G in FIG. 12) with a speed of rotation of at least a predetermined value.

Further, with this motorized retractor 200, similarly to the motorized retractor 10 relating to the first embodiment, an overall reduction ratio of the gear 80, the face gear 100, the outer teeth 232 of the clutch gear 228 and the outward teeth 44 of the barrel drum 42 (i.e., the reverse driving force transmission mechanism) is set significantly lower than a reduction ratio of the worm gear 84 and the worm wheel 96 (i.e., the forward driving force transmission mechanism).

At this motorized retractor 200, other structural components have structures similar to the motorized retractor 10 relating to the first embodiment.

Next, operation of this second embodiment will be described.

Operations and effects similar to those of the motorized retractor 10 relating to the first embodiment are realized with the motorized retractor 200 with the structure described above.

Specifically, when a vehicle occupant releases application of the webbing 28 (i.e., disengages the tongue plate from the buckle device), the output shaft 68 of the motor 66 is abruptly rotated in the reverse direction. This abrupt rotation of the output shaft 68 in the reverse direction is transmitted to the worm shaft 76 via the gear 72 and the gear 74, and the gear 80 and worm gear 84 are abruptly rotated.

The abrupt rotation of the gear 80 is transmitted to the rod 214 of the second clutch 212 via the face gear 100, and the rod 214 rotates in one direction about the axis thereof (the direction of arrow G in FIG. 12) with a speed of rotation of at least a predetermined value. Consequently, the rotor 256 and the spacer 250, which are integrally coupled with the rod 214, rotate in the one direction about the axis thereof with a speed of rotation of at least a predetermined value. The rotation of the rotor 256 is transmitted to the meshing weight 264 via the support shaft 270 and the bearing hole 268, and the meshing weight 264 is rotated about the rod 214 to follow the rotor 256 at a speed of rotation of at least a predetermined value.

As a result, a centrifugal force acts on the meshing weight 264 and, as shown in FIG. 18, the rotary torque M about the support shaft 270 acts on the center of gravity portion 278 of the meshing weight 264. Because of this rotary torque M, the meshing weight 264 turns about the support shaft 270 toward the radial direction outer side of the rotor 256 (in the direction of separation from the thick-wall portion 260), in opposition to the urging force of the return spring 272, and the meshing protrusion 276 of the meshing weight 264 engages with the meshing portion 242 of the base 234 (the state shown in FIG. 19B).

As a result, the rotor 256 and the base 234 are coupled by the meshing weight 264, and the base 234 rotates integrally with the rotor 256 in the one direction about the axis thereof. The rotation of the base 234 in the one direction about the axis is transmitted through the friction spring 244 to the clutch gear 228, and the clutch gear 228 also rotates in the one direction about the axis thereof. Because the outer teeth 232 of the clutch gear 228 are meshed with the outward teeth 44 of the barrel drum 42, the barrel drum 42 rotates in the winding direction (the direction of arrow A in FIG. 12), and thus the spool 20 rotates in the winding direction. Inadequacy of the urging force of the spiral spring 52 is compensated for by this rotation of the spool 20, and the webbing 28 is wound up and accommodated in the layered form at the spool 20 (the "winding-assistance mechanism").

Moreover, the overall reduction ratio according to the gear 80, the face gear 100, the outer teeth 232 of the clutch gear 228 and the outward teeth 44 of the barrel drum 42 (the reverse driving force transmission mechanism) is set to be significantly lower than the reduction ratio of the worm gear 84 and the worm wheel 96 (the forward driving force transmission mechanism). Thus, at this time, the spool 20 is rotated with a low torque, and it is possible to wind up and accommodate the webbing 28 at the spool 20 safely.

When the webbing 28 is completely wound up onto the spool 20, electricity supply to the motor 66 is cut off, and the rotation of the output shaft 68 of the motor 66 stops. Consequently, the rotation of the rod 214 and the rotor 256 stops, the meshing weight 264 is turned toward the radial direction inner side of the rotor 256 (toward the thick-wall portion 260) by the urging force of the return spring 272, and the engagement of the meshing protrusion 276 with the meshing portion 242 is cancelled (released). As a result, the coupling of the spool 20 with the output shaft 68 of the motor 66 by the second clutch 212 is cancelled, and it is possible for the webbing 28 that has been wound up on the spool 20 to be drawn out again.

Now, with this motorized retractor 200, when a distance to a forward obstacle from the vehicle is less than the predetermined value during running of the vehicle (in the state in which the webbing 28 is applied to an occupant), similarly to the motorized retractor 10 relating to the first embodiment, the output shaft 68 of the motor 66 turns in the forward direction (the direction of arrow C in FIG. 12), and the spool 20 is turned, by the first clutch 94, in the winding direction with a high torque. Consequently, the webbing 28 is wound onto the spool 20, the slight looseness of the webbing 28 is eliminated, and restraining force on the body of the vehicle occupant from the webbing 28 is increased (the "pretensioner mechanism").

Furthermore, with this motorized retractor 200, in the state in which winding of the webbing 28 onto the spool 20 is being assisted by means of the reverse driving force transmission mechanism, if, for example, the webbing 28 is pulled out by a vehicle occupant's arm or the like and a load equal to or greater than a predetermined value acts on the clutch gear 228 of the second clutch 212 via the spool 20 and the barrel drum 42, the friction spring 244 relatively rotates with respect to the clutch gear 228, and relative rotation of the base 234 with respect to the clutch gear 228 is enabled. Therefore, it is possible to prevent the spool 20 from being wound up strongly in a state in which the webbing 28 is interfering with a vehicle occupant or the like, it is possible to prevent excessive loads acting on components beyond the clutch gear 228 (i.e., structures toward the output shaft 68, such as the base 234, the meshing weight 264, the rotor 256, the rod 214, the face gear 100 and the like), and it is possible to avoid damage to the components, burn-out of the motor 66 and the like.

As described above, the motorized retractor 200 relating to the second embodiment realizes effects similar to those of the motorized retractor 10 relating to the earlier-described first embodiment, and it is possible to provide the mutually contrasting characteristics required for both the winding-assistance mechanism and the pretensioner mechanism with the single motor 66.

THIRD EMBODIMENT

Next, a third embodiment of the present invention will be described. Note that structures and operations that are essentially the same as in the first and second embodiments are assigned the same reference numerals as in the first and second embodiments, and descriptions thereof are omitted.

Figure 20:
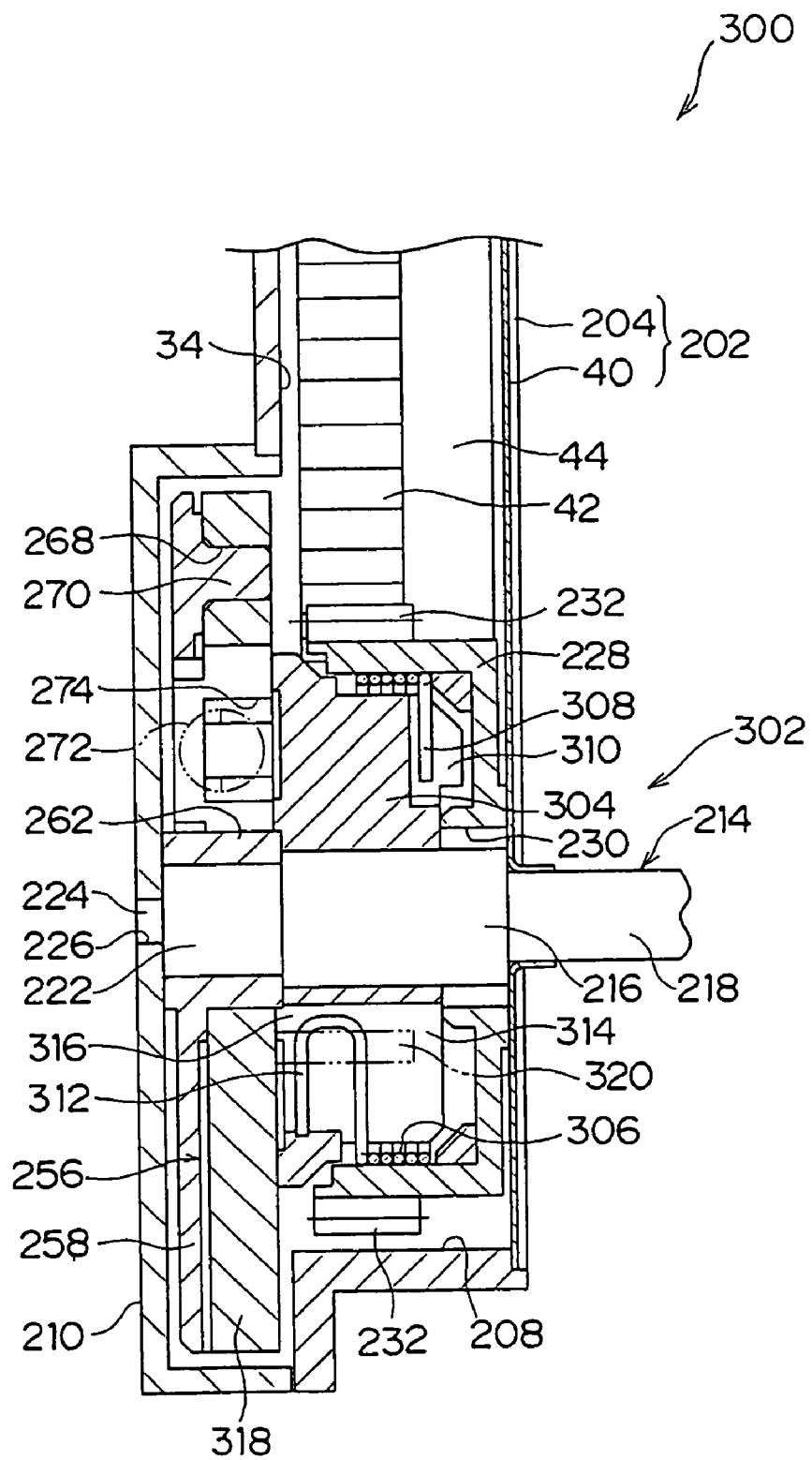
FIG. 20 is a plan sectional view showing partial structure of a reverse driving force transmission mechanism which is a structural member of a motorized retractor relating to a third embodiment of the present invention.

FIG. 20 shows a schematic plan sectional view of principal elements of a reverse driving force transmission mechanism which is a structural member of a motorized retractor 300 relating to the third embodiment of the present invention.

This motorized retractor 300 has a structure that is basically similar to the motorized retractor 200 relating to the second embodiment but, as shown in FIG. 20, a second clutch 302, which structures the reverse driving force transmission mechanism of the motorized retractor 300, is partially different from the second clutch 212 which structures the reverse driving force transmission mechanism of the motorized retractor 200.

Figure 21:
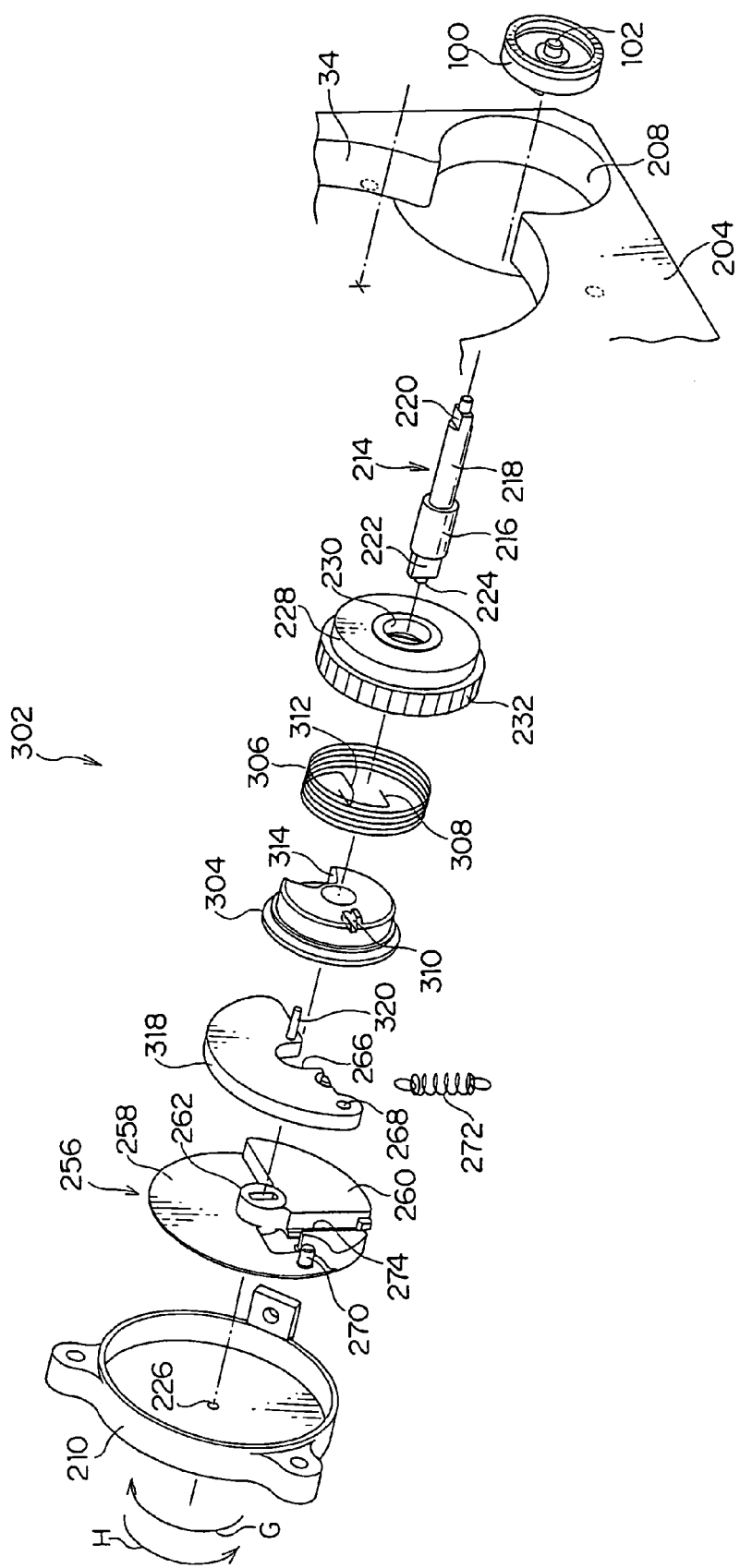
FIG. 21 is an exploded perspective view showing structure of principal elements of the reverse driving force transmission mechanism which is a structural member of the motorized retractor of FIG. 20.
Figure 22:
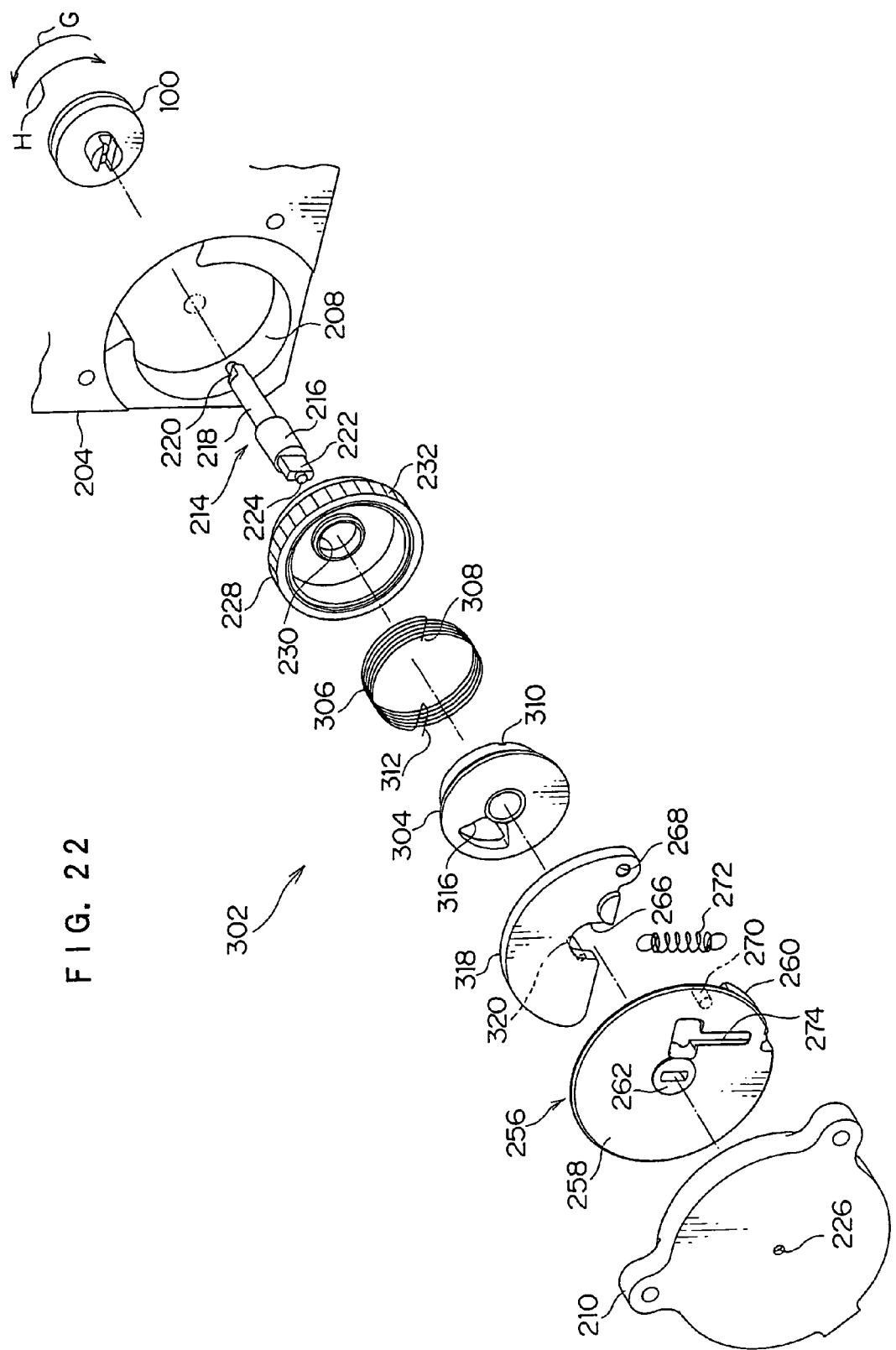
FIG. 22 is an exploded perspective view showing structure of the principal elements of the reverse driving force transmission mechanism which is a structural member of the motorized retractor of FIG. 20.

The second clutch 302 is equipped with the rod 214, with the same structure as the rod 214 that is a structural member of the second clutch 212 relating to the second embodiment. A substantially cylindrical coupling drum 304 is supported at the large-diameter portion 216 of this rod 214 (see FIGS. 21 and 22).

Figure 23:
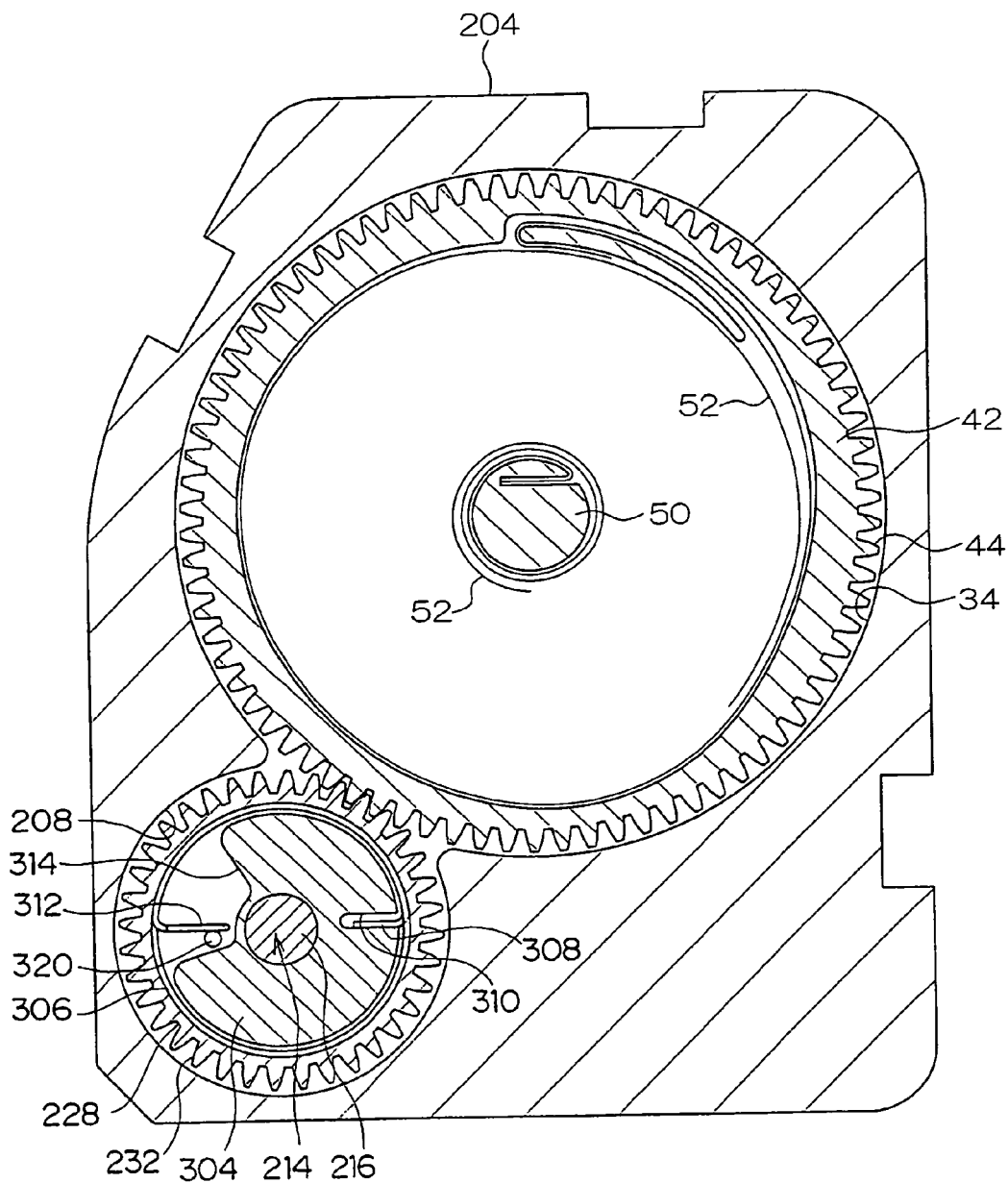
FIG. 23 is a side sectional view showing partial structure of the reverse driving force transmission mechanism which is a structural member of the motorized retractor of FIG. 20.

The coupling drum 304 is disposed inside the clutch gear 228, and is coaxially and integrally coupled with the large-diameter portion 216 of the rod 214. A clutch spring 306 is coaxially disposed between an outer peripheral face of the coupling drum 304 and the inner peripheral face of the clutch gear 228 (see FIG. 23).

An outer radius dimension of the clutch spring 306 is set to be slightly smaller than an inner radius dimension of the clutch gear 228 in a relaxed state of the clutch spring 306. Thus, the clutch spring 306 is usually relatively rotatable with respect to the clutch gear 228.

An anchoring portion 308 is provided protruding toward the radial direction inner side from a coiling direction one end portion of the clutch spring 306. This anchoring portion 308 is fitted into and anchored at an anchoring groove 310, which is formed at an axial direction one end portion of the coupling drum 304 (i.e., an end portion at the clutch gear 228 side thereof). Thus, the coiling direction one end portion of the clutch spring 306 is coupled to the rod 214 via the coupling drum 304.

A substantially squared laterally-facing 'U' shaped movement portion 312 is provided extending toward the radial direction inner side from a coiling direction other end portion of the clutch spring 306. This movement portion 312 is disposed in a recess portion 314, which is formed, with a substantially trapezoid shape in cross-section, in an outer peripheral portion of the coupling drum 304.

This recess portion 314 communicates with a through-hole 316 (see FIG. 22), which is formed, with a substantially trapezoid shape in cross-section, in an axial direction other end portion of the coupling drum 304 (an end portion at a side thereof that is opposite from the side thereof at which the clutch gear 228 is disposed). The recess portion 314 and the through-hole 316 correspond with a spring weight 318.

The spring weight 318 has a structure basically the same as the meshing weight 264 relating to the second embodiment, and is rotatably supported at the rotor 256 via the bearing hole 268 and the support shaft 270. However, the meshing protrusion 276 of the meshing weight 264 is not provided at the spring weight 318. Instead, a circular column-form spring protrusion 320 is provided at the spring weight 318.

Figure 24:
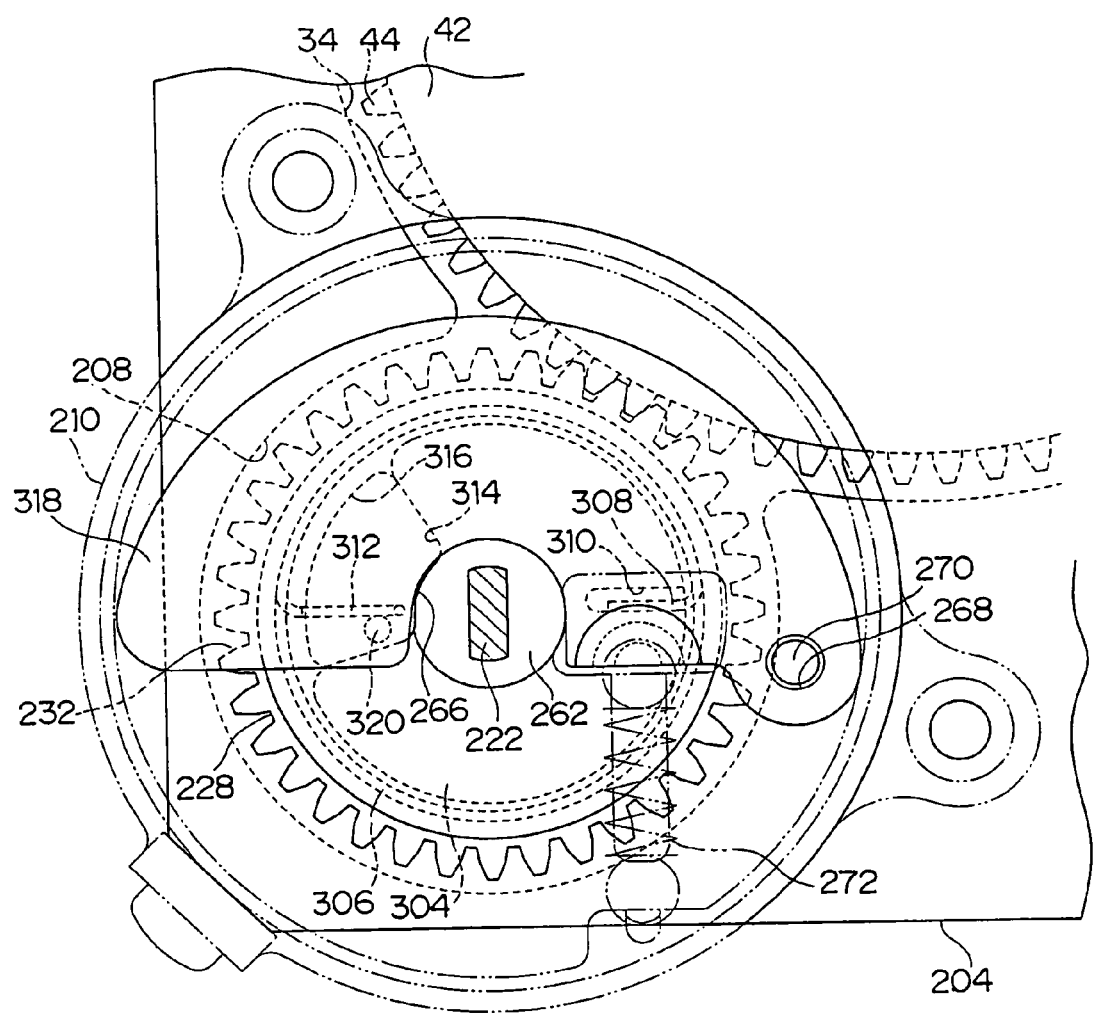
FIG. 24 is a side view showing structure of peripheral members including the reverse driving force transmission mechanism of FIG. 23.

The spring protrusion 320 is disposed at a surface at the coupling drum 304 side of the spring weight 318, at a side of the cutaway 266 that is opposite from the side thereof at which the bearing hole 268 is disposed. The spring protrusion 320 protrudes toward the coupling drum 304. The spring protrusion 320 passes through the above-mentioned through-hole 316 of the coupling drum 304. A distal end side of the spring protrusion 320 is disposed in the recess portion 314 of the coupling drum 304, and engages with the above-mentioned movement portion 312 of the clutch spring 306 (see FIGS. 23 and 24). Consequently, the clutch spring 306 retains the return spring 272 and the spring weight 318 at the radial direction inner side (the thick-wall portion 260 side) of the rotor 256.

Figure 25A:
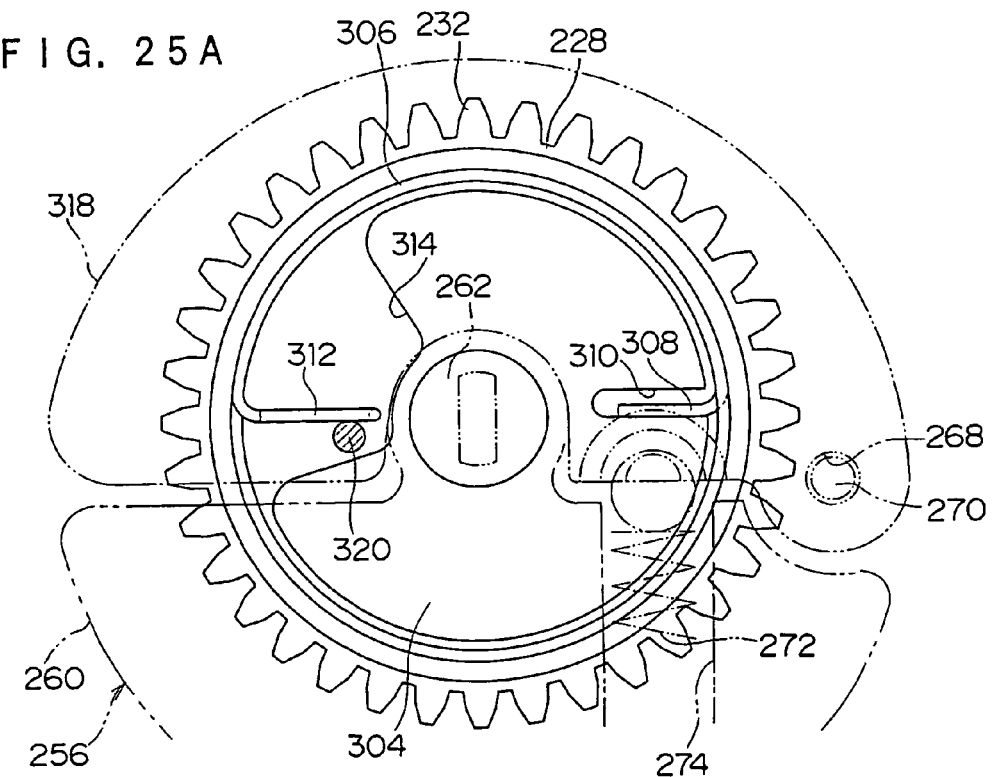
FIG. 25A is a schematic side view showing structure of the principal elements of the reverse driving force transmission mechanism of FIG. 24, which shows a state in which a spring weight is retained at a radial direction inner side of a rotor.

In this second clutch 302, the spring weight 318 can be rotated about the support shaft 270 by a centrifugal force acting on the spring weight 318, in opposition to a resilient force of the clutch spring 306 and the urging force of the return spring 272, toward the radial direction outer side relative to the rotor 256 (i.e., in a direction for separating from the thick-wall portion 260). In a state in which the spring weight 318 has been rotated (see FIGS. 25A and 25B), the spring protrusion 320 causes the movement portion 312 of the clutch spring 306 to move one way in the coiling direction of the clutch spring 306 (the direction of arrow J in FIG. 25B). At such a case, an outer radius dimension of the clutch spring 306 is enlarged, and an outer peripheral portion of the clutch spring 306 is caused to press against the inner peripheral face of the clutch gear 228.

In this state, a predetermined friction force is generated between the outer peripheral portion of the clutch spring 306 and the inner peripheral face of the clutch gear 228. In consequence, the clutch spring 306 and the clutch gear 228 are integrally coupled by this friction force. Hence, the rod 214 and the clutch gear 228 are rotated integrally, via the coupling drum 304 and the clutch spring 306.

At this motorized retractor 300, other structural components have structures similar to the motorized retractor 200 relating to the second embodiment.

Next, operation of this third embodiment will be described.

Operations and effects similar to those of the motorized retractor 10 relating to the first embodiment and the motorized retractor 200 relating to the second embodiment are realized with the motorized retractor 300 with the structure described above.

Specifically, when a vehicle occupant releases application of the webbing 28 (i.e., disengages the tongue plate from the buckle device), the output shaft 68 of the motor 66 is abruptly rotated in the reverse direction. This abrupt rotation of the output shaft 68 in the reverse direction is transmitted to the worm shaft 76 via the gears 72 and 74, and the gear 80 and the worm gear 84 are abruptly rotated.

The abrupt rotation of the gear 80 is transmitted to the rod 214 of the second clutch 302 via the face gear 100, and the rod 214 rotates in the one direction about the axis thereof (the direction of arrow G in FIGS. 21 and 22) with a speed of rotation of at least a predetermined value. Consequently, the rotor 256, the coupling drum 304 and the clutch spring 306, which are integrally coupled with the rod 214, rotate in the one direction about the axis thereof with a speed of rotation of at least a predetermined value.

The rotation of the rotor 256 is transmitted to the spring weight 318 via the support shaft 270 and the bearing hole 268, and the spring weight 318 is rotated about the rod 214 to follow the rotor 256 at a speed of rotation of at least a predetermined value. As a result, a centrifugal force acts on the spring weight 318, and the spring weight 318 turns about the support shaft 270 toward the radial direction outer side of the rotor 256 (in the direction of separation from the thick-wall portion 260), in opposition to the urging force of the return spring 272.

Figure 25B:
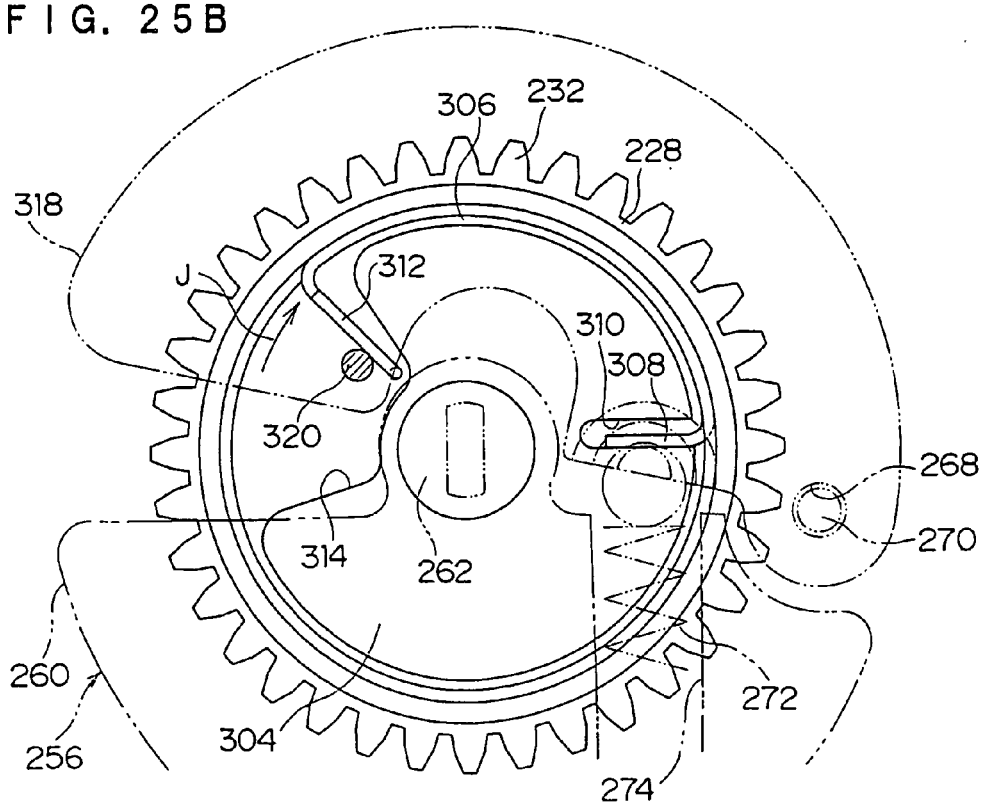
FIG. 25B is a schematic side view showing a state in which the spring weight of FIG. 25A has moved to a radial direction outer side of the rotor.

Consequently, the spring protrusion 320 of the spring weight 318 causes the movement portion 312 of the clutch spring 306 to move the one way in the coiling direction of the clutch spring 306 (the state shown in FIG. 25B). As a result, the outer radius dimension of the clutch spring 306 becomes larger, and the outer peripheral portion of the clutch spring 306 closely contacts the inner peripheral face of the clutch gear 228. Hence, rotation of the clutch spring 306 is transmitted to the clutch gear 228, and the clutch gear 228 rotates in the one direction about the axis thereof. Because the outward teeth 44 of the barrel drum 42 are meshed with the outer teeth 232 of the clutch gear 228, the barrel drum 42 rotates in the winding direction, and thus the spool 20 rotates in the winding direction. Inadequacy of the urging force of the spiral spring 52 is compensated for by this rotation of the spool 20, and the webbing 28 is wound up and accommodated in the layered form at the spool 20 (the "winding-assistance mechanism").

Moreover, at this time, similarly to the motorized retractor 10 relating to the first embodiment and the motorized retractor 200 relating to the second embodiment, the spool 20 is rotated with a low torque, so it is possible to wind up and accommodate the webbing 28 at the spool 20 safely.

When the webbing 28 is completely wound up onto the spool 20, electricity supply to the motor 66 is cut off, and the rotation of the output shaft 68 of the motor 66 stops. Consequently, the rotation of the rod 214 stops, and the rotation of the rotor 256, the coupling drum 304 and the clutch spring 306, which are coupled to the rod 214, also stops.

When the rotation of the rotor 256 stops, the spring weight 318 is turned toward the radial direction inner side of the rotor 256 (toward the thick-wall portion 260) by the resilient force of the clutch spring 306 and the urging force of the return spring 272. Consequently, the clutch spring 306 twists back to the relaxed state, the outer peripheral portion thereof separates from the inner peripheral face of the clutch gear 228, and the above-described coupling of the clutch spring 306 with the clutch gear 228 is immediately released. Thus, the coupling of the spool 20 with the output shaft 68 of the motor 66 by the second clutch 302 is cancelled, and it is possible for the webbing 28 that has been wound up on the spool 20 to be drawn out again.

With this motorized retractor 300, when a distance to a forward obstacle from the vehicle is less than the predetermined value during running of the vehicle (in the state in which the webbing 28 is applied to an occupant), similarly to the motorized retractor 10 relating to the first embodiment and the motorized retractor 200 relating to the second embodiment, the output shaft 68 of the motor 66 turns in the forward direction, and the spool 20 is turned, by the first clutch 94, in the winding direction with a high torque. In consequence, the webbing 28 is wound onto the spool 20, the slight looseness of the webbing 28 is eliminated, and restraining force on the body of the vehicle occupant from the webbing 28 is increased (the "pretensioner mechanism").

Furthermore, with this motorized retractor 300, in the state in which winding of the webbing 28 onto the spool 20 is being assisted by means of the reverse driving force transmission mechanism, if, for example, the webbing 28 is pulled out by a vehicle occupant's arm or the like and a load acts on the clutch gear 228 of the second clutch 302 via the spool 20 and the barrel drum 42, a force of relative rotation is generated between the clutch gear 228 and the clutch spring 306.

If this rotary force is greater than the frictional force that acts between the inner peripheral face of the clutch gear 228 and the outer peripheral portion of the clutch spring 306 (in other words, if the load that acts on the clutch gear 228 is equal to or greater than a predetermined value), the clutch gear 228 freely rotates relative to the clutch spring 306. Therefore, it is possible to prevent the spool 20 from being wound up strongly in a state in which the webbing 28 is interfering with a vehicle occupant or the like, it is possible to prevent excessive loads acting on components beyond the clutch gear 228 (i.e., structures toward the output shaft 68, such as the coupling drum 304, the spring weight 318, the rotor 256, the rod 214, the face gear 100 and the like), and it is possible to avoid damage to the components, burn-out of the motor 66 and the like.

As described above, the motorized retractor 300 relating to the third embodiment realizes effects similar to those of the motorized retractor 10 relating to the first embodiment and the motorized retractor 200 relating to the second embodiment, and it is possible to provide the mutually contrasting characteristics required for both the winding-assistance mechanism and the pretensioner mechanism with the single motor 66.

The third embodiment described above has a structure in which the spring weight 318 is urged (retained) toward the radial direction inner side relative to the rotor 256 by the return spring 272. However, this is not a limitation. With a structure in which the spring weight 318 is urged (retained) toward the radial direction inner side of the rotor 256 by the urging force of the clutch spring 306, employment of the return spring 272 may be eliminated.

Further, the first, second and third embodiments described above have structures in which the gear 80 and the face gear 100 are employed as structural members of the reverse driving force transmission mechanism and rotation of the worm shaft 76 is transmitted to the shaft 106 or the rod 214 by the gear 80 and the face gear 100. However, this is not a limitation. For example, structures are also possible in which two helical gears are employed instead of the gear 80 and the face gear 100, and rotation of the worm shaft 76 is transmitted to the shaft 106 or the rod 214 by these two helical gears.

FOURTH EMBODIMENT

Next, a fourth embodiment of the present invention will be described. Note that structures and operations that are essentially the same as in the first, second and/or third embodiments are assigned the same reference numerals as in the first to third embodiments, and descriptions thereof are omitted.

Figure 26:
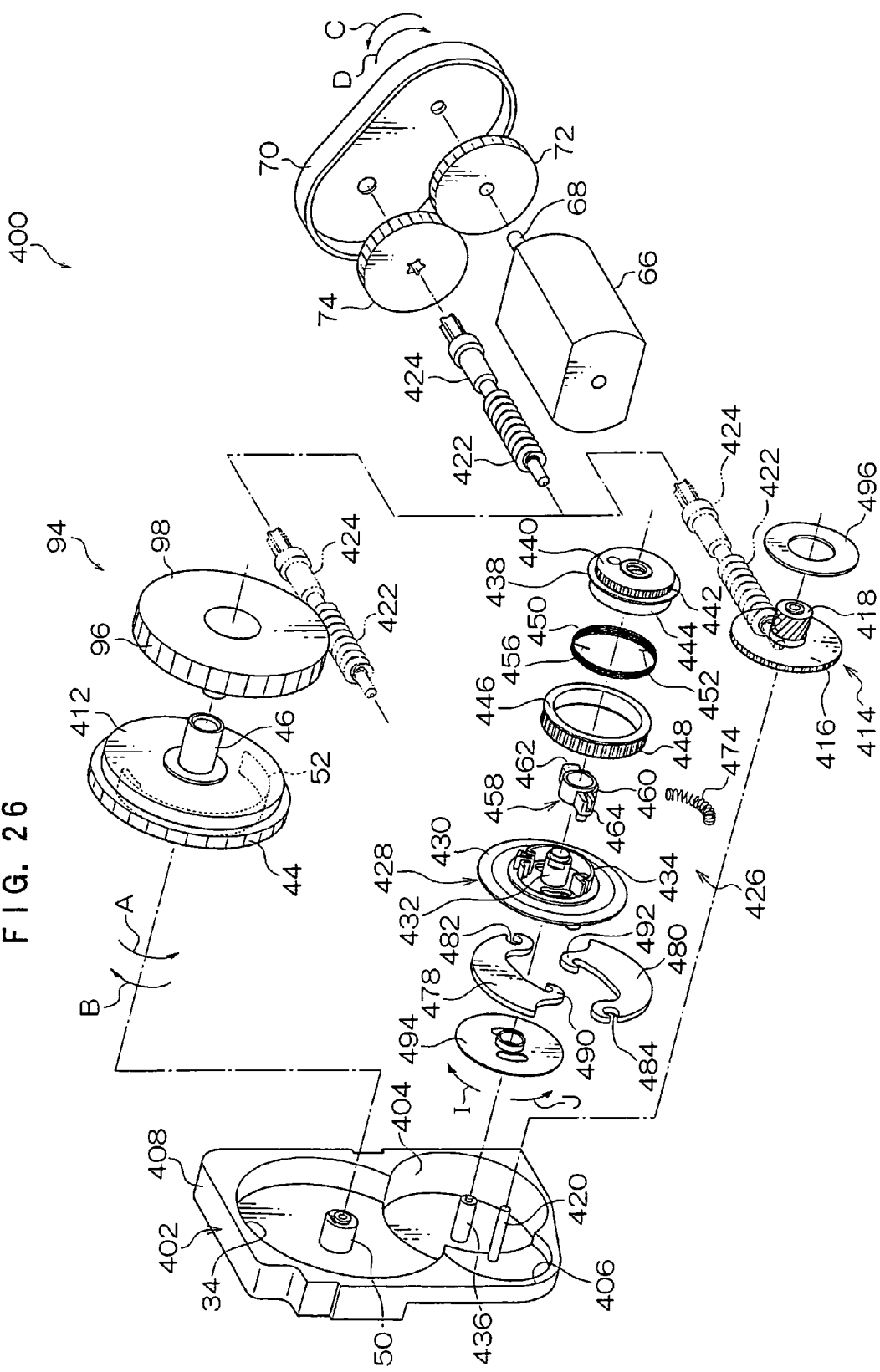
FIG. 26 is an exploded perspective view showing structure of principal elements of a motorized retractor relating to a fourth embodiment of the present invention.
Figure 27:
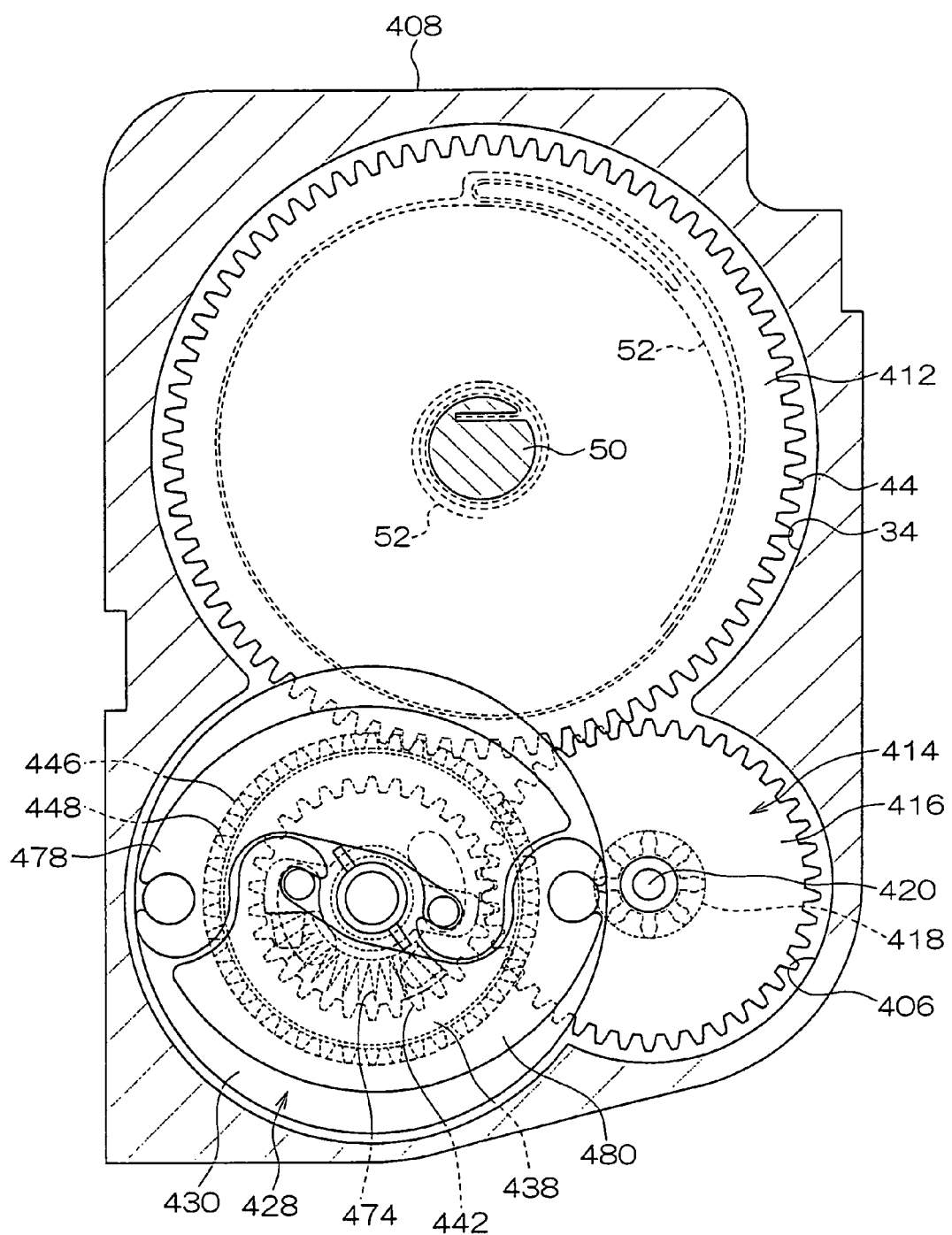
FIG. 27 is a side sectional view showing partial structure of a reverse driving force transmission mechanism which is a structural member of the motorized retractor of FIG. 26.
Figure 28:
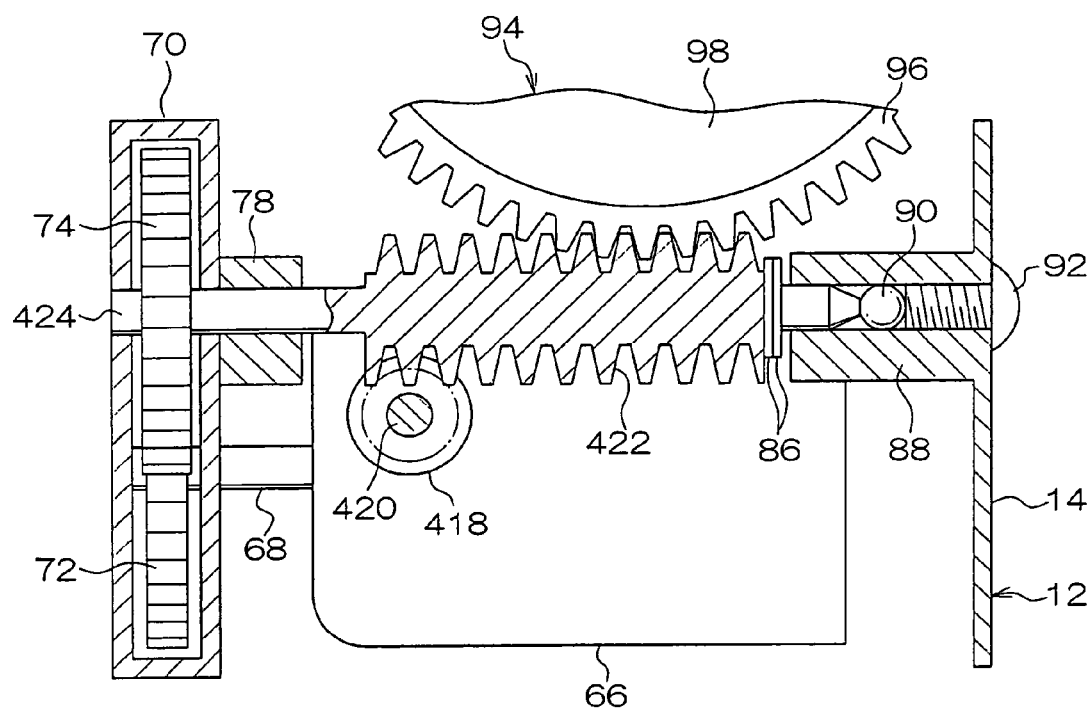
FIG. 28 is a side sectional view showing structure of peripheral members including a motor which is a structural member of the motorized retractor of FIG. 26.
Figure 29:
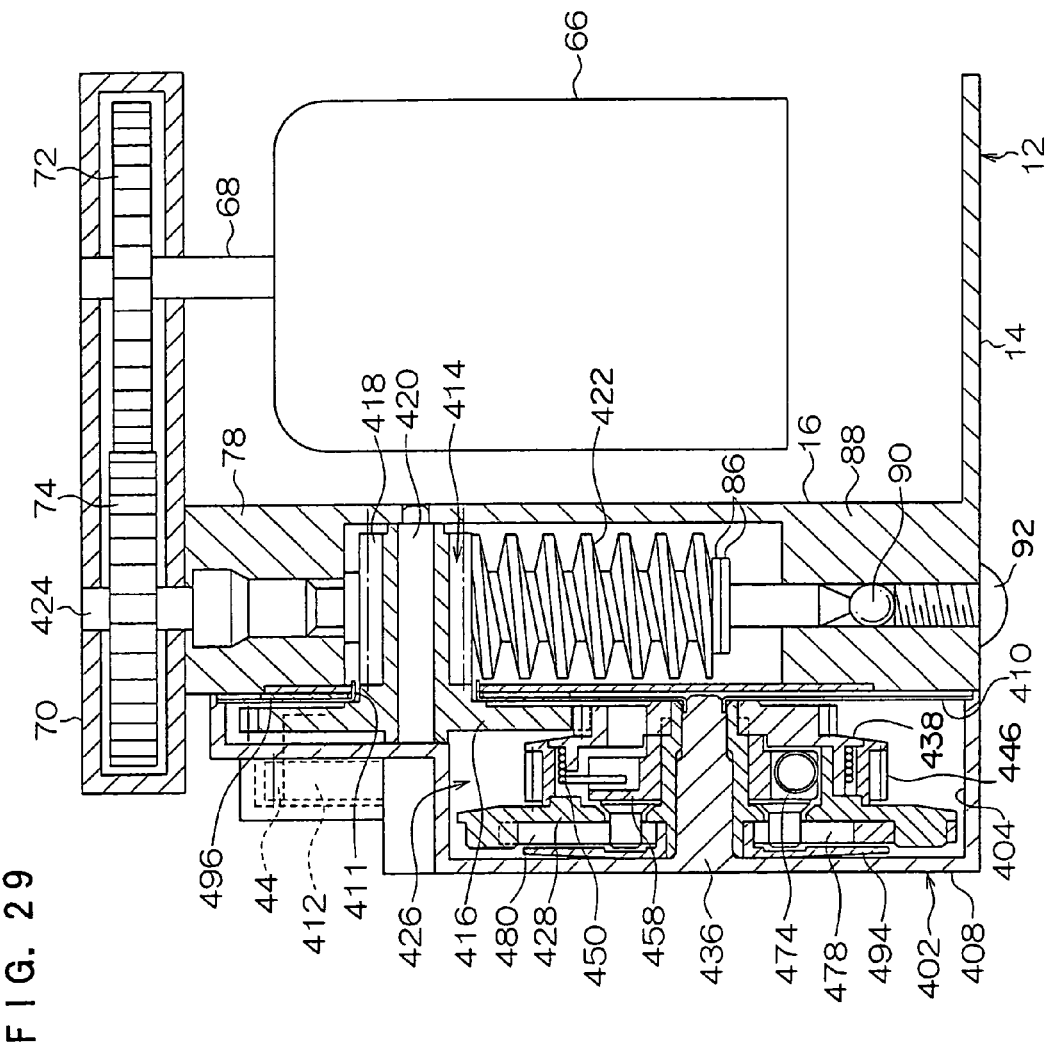
FIG. 29 is a plan sectional view showing structure of peripheral members including the reverse driving force transmission mechanism which is a structural member of the motorized retractor of FIG. 26.

FIG. 26 is an exploded perspective view showing structure of principal elements of a motorized retractor 400 relating to the fourth embodiment of the present invention. FIG. 27 is a side sectional view showing structure of peripheral members including a reverse driving force transmission mechanism of this motorized retractor 400. FIG. 28 is a side sectional view showing a portion of the structure of this motorized retractor 400. FIG. 29 is a plan sectional view showing structure of the peripheral members including the reverse driving force transmission mechanism of this motorized retractor 400.

As is shown in these drawings, the motorized retractor 400 has a basically similar structure to the motorized retractor 10 relating to the first embodiment, but differs in the following respects.

The motorized retractor 400 is provided with a case 402 which structures the reverse driving force transmission mechanism. The case 402 is provided with a case main body 408 and a cover 410 (see FIG. 29). The case main body 408 includes the first accommodation portion 34 and a second accommodation portion 404, which have circular cross-sections, and a third accommodation portion 406, which has a substantially semi-circular cross section. The cover 410 has the form of a thin, flat plate which closes off the first accommodation portion 34, the second accommodation portion 404 and the third accommodation portion 406. The cover 410 is attached to the case main body 408 by unillustrated screws or the like.

A barrel drum 412, which structures the reverse driving force transmission mechanism, is accommodated inside the first accommodation portion 34 of the case main body 408. The barrel drum 412 has a basically similar structure to the barrel drum 42 relating to the first embodiment. However, the coupling portion 46 relating to the first embodiment is omitted. The barrel drum 412 is coaxially and integrally coupled to the spool 20 by an unillustrated coupling screw.

An output-splitting gear 414, which structures the reverse driving force transmission mechanism, is accommodated inside the third accommodation portion 406 of the case main body 408. The output-splitting gear 414 includes a cog portion 416, which is a spur gear, and a worm wheel portion 418, which is coaxially and integrally provided at one axial direction end side of the cog portion 416. Worm wheel teeth are formed at an outer peripheral portion of the worm wheel portion 418. A circular through-hole is formed through an axial central portion of the worm wheel portion 418 and the cog portion 416, and a cylindrical support rod 420, which is provided protruding from a central portion of a base wall of the third accommodation portion 406, is inserted into this through-hole. Thus, the output-splitting gear 414 is supported at the case main body 408 to be rotatable about the support rod 420.

The worm wheel portion 418 of the output-splitting gear 414 is set to a smaller diameter than the cog portion 416. The worm wheel portion 418 passes through a through-hole 411, which is formed in the cover 410 (see FIG. 29), and is exposed (projected) to an outer side of the case 402. This worm wheel portion 418 meshes with a worm gear 422, which structures a forward driving force transmission mechanism.

The worm gear 422 is coaxially and integrally provided at a worm shaft 424 with a structure basically similar to the worm shaft 76 relating to the first embodiment. The worm gear 422 meshes with the worm wheel 96 of the first clutch 94 in a similar manner to the first embodiment described above. However, the worm gear 422 is formed with a longer length dimension along an axial direction than the worm gear 84 relating to the first embodiment. The portion thereof which is protruded further meshes with the worm wheel portion 418 of the output-splitting gear 414. Therefore, when the worm gear 422 (and the worm shaft 424) rotates, the worm wheel 96 rotates together with the output-splitting gear 414.

Meanwhile, a second clutch 426, which structures the reverse driving force transmission mechanism, is accommodated in the second accommodation portion 404 of the case main body 408.

Figure 30:
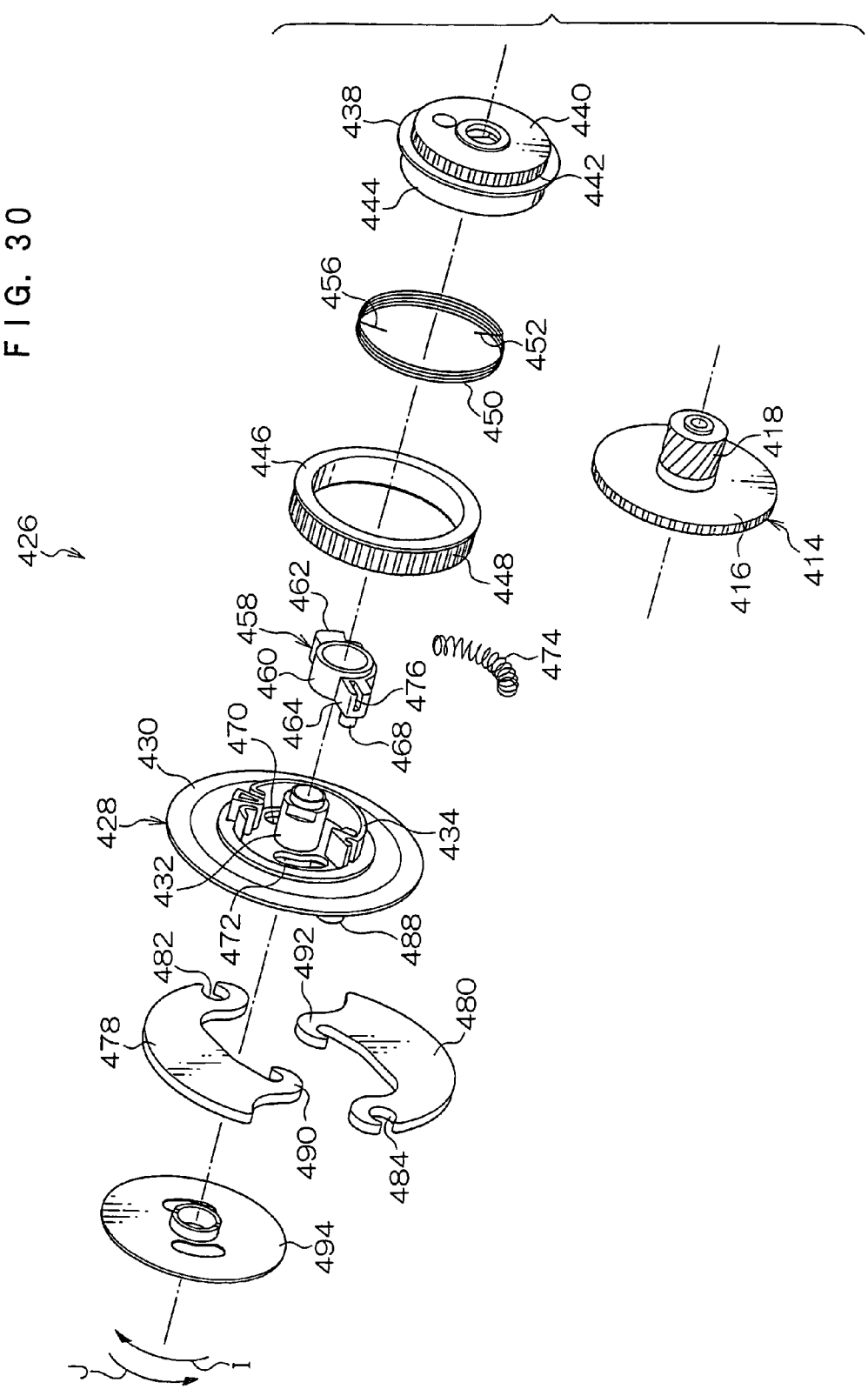
FIG. 30 is an exploded perspective view showing structure of principal elements of the reverse driving force transmission mechanism which is a structural member of the motorized retractor of FIG. 26.
Figure 31:
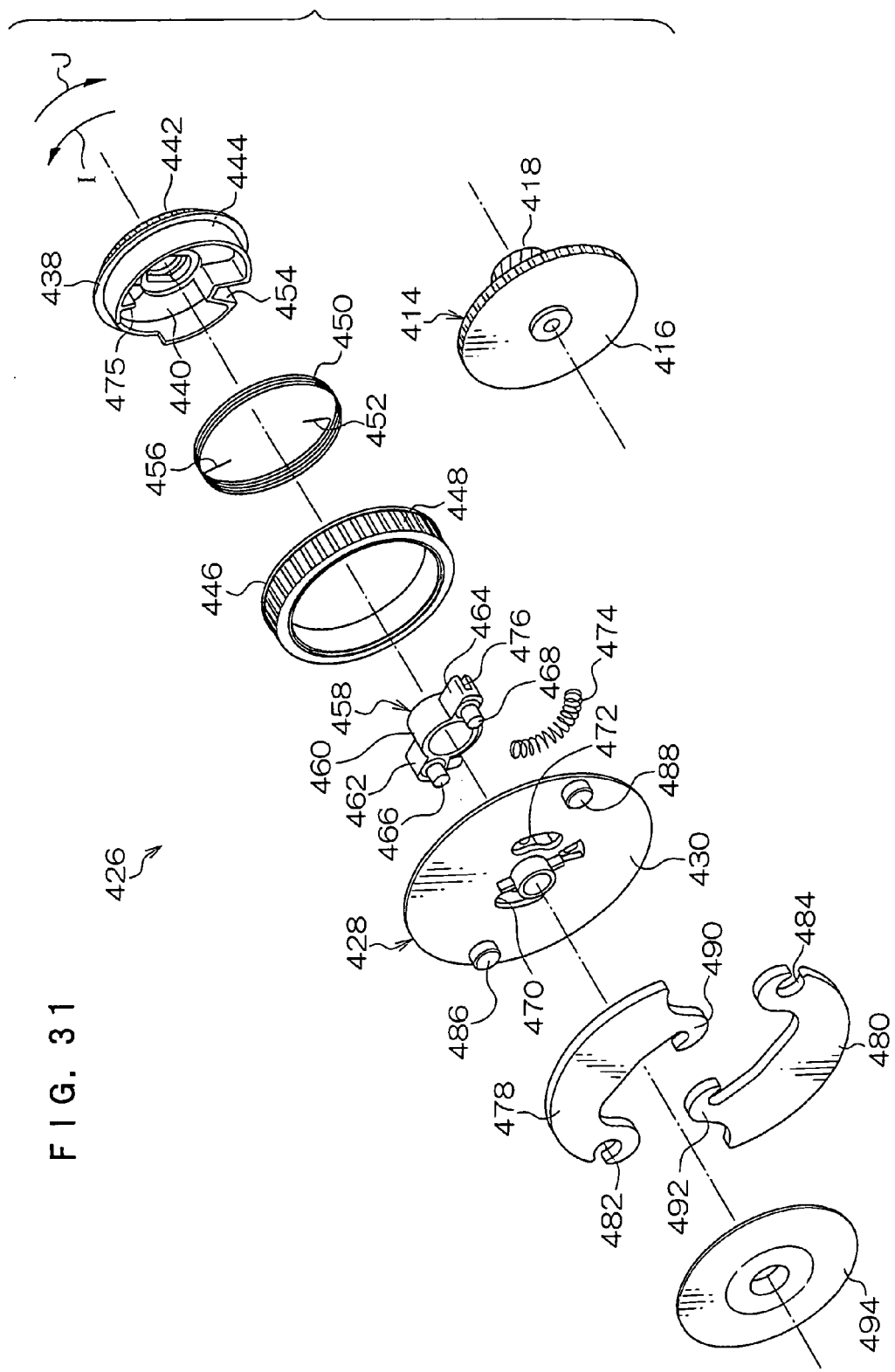
FIG. 31 is an exploded perspective view showing structure of the principal elements of the reverse driving force transmission mechanism which is a structural member of the motorized retractor of FIG. 26.
Figure 32:
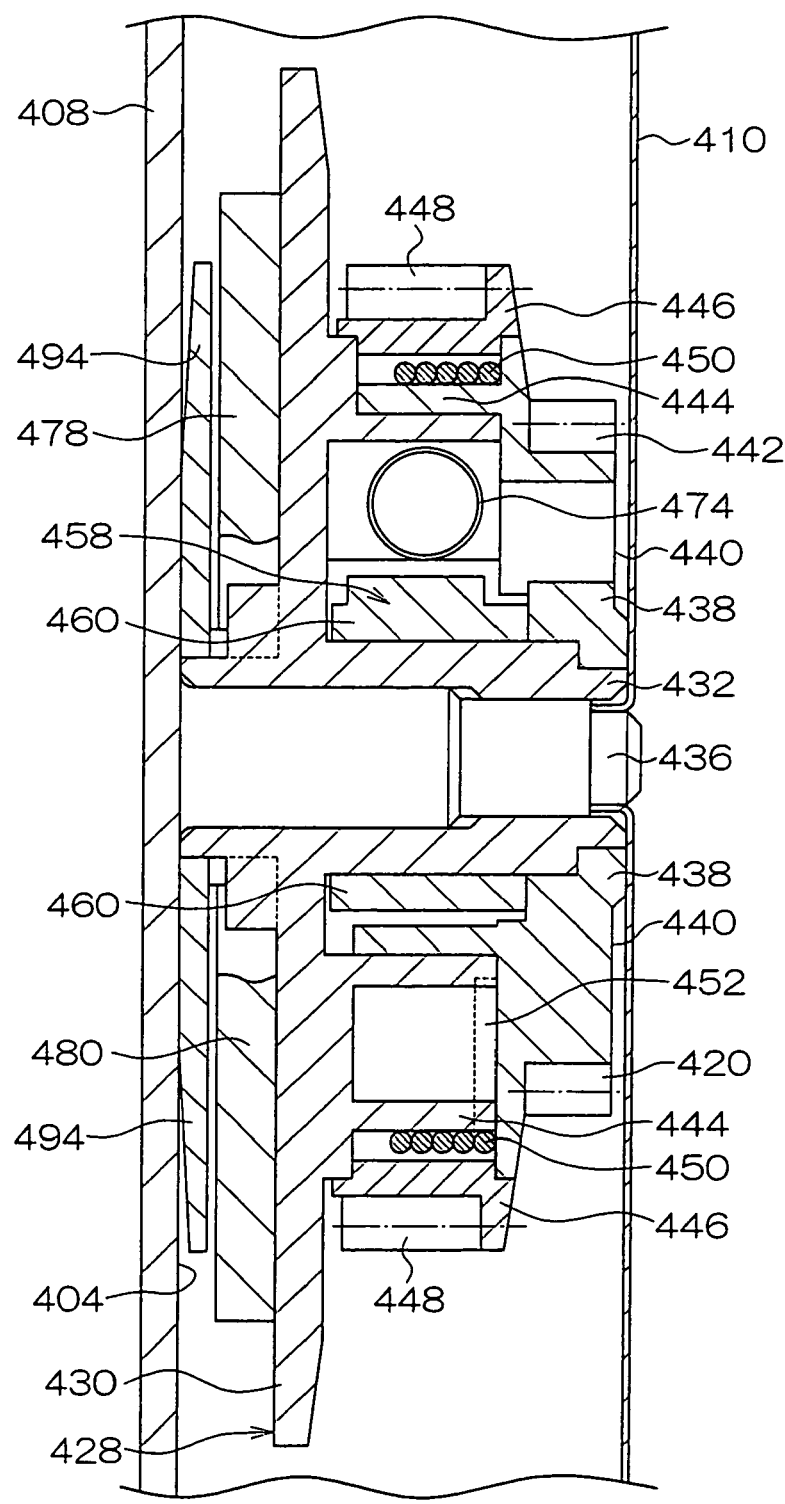
FIG. 32 is a sectional view showing structure of the principal elements of the reverse driving force transmission mechanism which is a structural member of the motorized retractor of FIG. 26.

FIGS. 30 and 31 show exploded perspective views of structure of the second clutch 426. FIG. 32 shows a sectional view of structure of the second clutch 426.

The second clutch 426 is provided with a base 428. The base 428 is integrally provided with a main body portion 430, a shaft support portion 432 and a side wall portion 434. The main body portion 430 is formed with a circular disc shape. The shaft support portion 432 has the form of a circular tube, which is provided protruding from an axial center portion of the main body portion 430 toward one axial direction side of the main body portion 430. The side wall portion 434 has a substantially 'C'-shaped cross-section, which is formed to be coaxial around the shaft support portion 432. A support shaft 436 is provided protruding from a central portion of a base wall of the second accommodation portion 404, and is inserted into the tube of the shaft support portion 432. Thus, the base 428 is supported at the case main body 408 to be rotatable about the support shaft 436.

A rotor 438 is coaxially disposed at the axial direction one end side (the right side of FIGS. 30 and 31) of the shaft support portion 432. The rotor 438 is formed in the shape of a substantially circular tube with a base. In a state in which the side wall portion 434 of the base 428 is fitted into the rotor 438, the rotor 438 is coupled integrally, with respect to the circumferential direction thereof, with the base 428. Spur gear outward teeth 442 are formed at an outer peripheral portion of a base wall 440 of the rotor 438. These outward teeth 442 mesh with the aforementioned cog portion 416 of the output-splitting gear 414.

A clutch gear 446 is provided at a radial direction outer side of a side wall portion 444 of the rotor 438. The clutch gear 446 is formed in a circular tube shape and is provided to be coaxial and relatively rotatable with respect to the rotor 438. Spur gear outward teeth 448 are formed at an outer peripheral portion of the clutch gear 446. These outward teeth 448 mesh with the aforementioned outward teeth 44 of the barrel drum 412. An inner radius dimension of the clutch gear 446 is significantly smaller than an outer radius dimension of the side wall portion 444 of the rotor 438, and an annular gap is formed between an inner peripheral face of the clutch gear 446 and an outer peripheral face of the side wall portion 444. A clutch spring 450, which is a torsion coil spring, is coaxially disposed in this annular gap.

Dimensions of the clutch spring 450 are specified such that, in a relaxed state, an inner radius dimension of the clutch spring 450 is substantially the same as the outer radius dimension of the side wall portion 444 of the rotor 438. An outer radius dimension of the clutch spring 450 in the relaxed state is set to be slightly smaller than the inner radius dimension of the clutch gear 446. Thus, the clutch spring 450 is usually relatively rotatable with respect to the clutch gear 446.

An anchoring portion 452 is provided extending toward the radial direction inner side from a coiling direction one end portion of the clutch spring 450 (an end portion thereof at a side in the direction of arrow I in FIGS. 30 and 31). This anchoring portion 452 fits into and is anchored at an anchoring recess portion 454, which is formed in the side wall portion 444 of the rotor 438 (see FIG. 31).

A movement portion 456 is provided extending toward the radial direction inner side from a coiling direction other end portion of the clutch spring 450 (an end portion thereof at a side in the direction of arrow J in FIGS. 30 and 31). This movement portion 456 corresponds with a lever 458, which is disposed inside the tube of the rotor 438 (at an inner side of the side wall portion 444).

The lever 458 is provided with a circular tube-form bearing portion 460. The shaft support portion 432 of the base 428 passes through the interior of the bearing portion 460. Thus, the lever 458 is supported to be relatively rotatable about the axis with respect to the shaft support portion 432 (and the base 428). Further, a pair of coupling portions 462 and 464, which protrude in radial directions, are provided at an outer peripheral portion of the bearing portion 460, at opposite sides from one another along the circumferential direction (i.e., at sides which are opposite by 180°).

A cylindrical coupling protrusion 466 and a cylindrical coupling protrusion 468 are provided protruding from the coupling portion 462 and the coupling portion 464, respectively. The coupling protrusion 466 and the coupling protrusion 468 protrude toward the main body portion 430 of the base 428. The coupling protrusions 466 and 468 penetrate through a long hole 470 and a long hole 472, respectively, which are formed in the main body portion 430 of the base 428. The long hole 470 and the long hole 472 are formed at opposite sides from one another (sides which are opposite by 180°) along the circumferential direction of the main body portion 430. The two long holes 470 and 472 are both curved along the circumferential direction of the main body portion 430. Therefore, the coupling protrusions 466 and 468 of the lever 458 can move along the circumferential direction of the main body portion 430 in the long holes 470 and 472, but a range of rotation (turning) of the lever 458 relative to the base 428 is limited by the coupling protrusions 466 and 468 abutting against curvature direction one end portions or curvature direction other end portions of the long holes 470 and 472. Further, the coupling protrusions 466 and 468 correspond with a pair of weights 478 and 480, which will be described later.

One end portion of a return spring 474, which is a torsion coil spring, is anchored at the one coupling portion 462 of the lever 458. Another end portion of this return spring 474 abuts against an anchoring wall 475, which is formed at the side wall portion 444 of the rotor 438. The return spring 474 constantly urges the lever 458 one way about the axis of the base 428 (in the direction of arrow J in FIGS. 30 and 31). Thus, the lever 458 is usually retained in a state in which the pair of coupling protrusions 466 and 468 abut against the curvature direction one end portions (which are end portions at sides in the direction of arrow J in FIGS. 30 and 31) of the pair of long holes 470 and 472 of the main body portion 430.

Figure 33A:
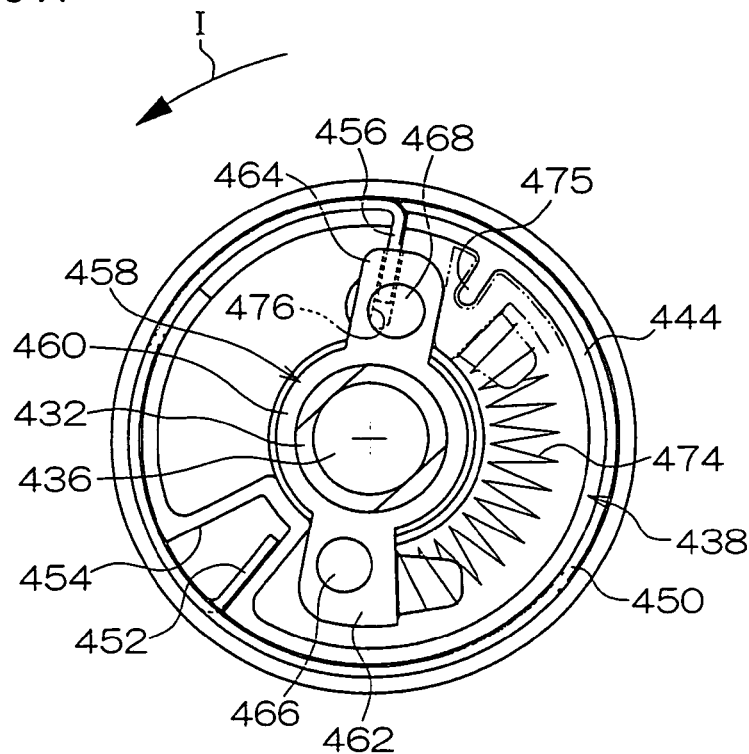
FIG. 33A is a side view showing partial structure of the reverse driving force transmission mechanism which is a structural member of the motorized retractor of FIG. 26, which shows a usual state of a clutch spring.
Figure 33B:
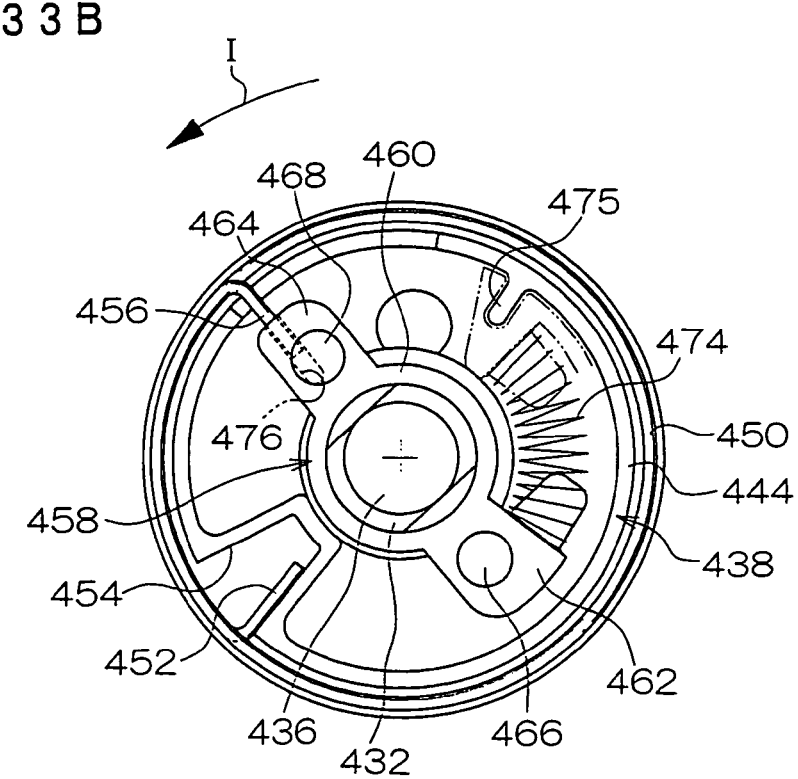
FIG. 33B is a side view showing a state in which an outer radius dimension of the clutch spring of FIG. 33A has been enlarged.

An anchoring groove 476 is formed in the other coupling portion 464 of the lever 458. The aforementioned movement portion 456 of the clutch spring 450 fits into and is anchored at the anchoring groove 476. Therefore, as shown in FIGS. 33A and 33B, if the lever 458 rotates the other way about the axis (in the direction of arrow I in FIGS. 33A and 33B) with respect to the base 428 (and the rotor 438) in opposition to a resilient force of the return spring 474, the movement portion 456 of the clutch spring 450 will be moved one way in the coiling direction of the clutch spring 450 (in the direction of arrow I in FIGS. 33A and 33B), and the outer radius dimension of the clutch spring 450 will be enlarged.

Figure 34A:
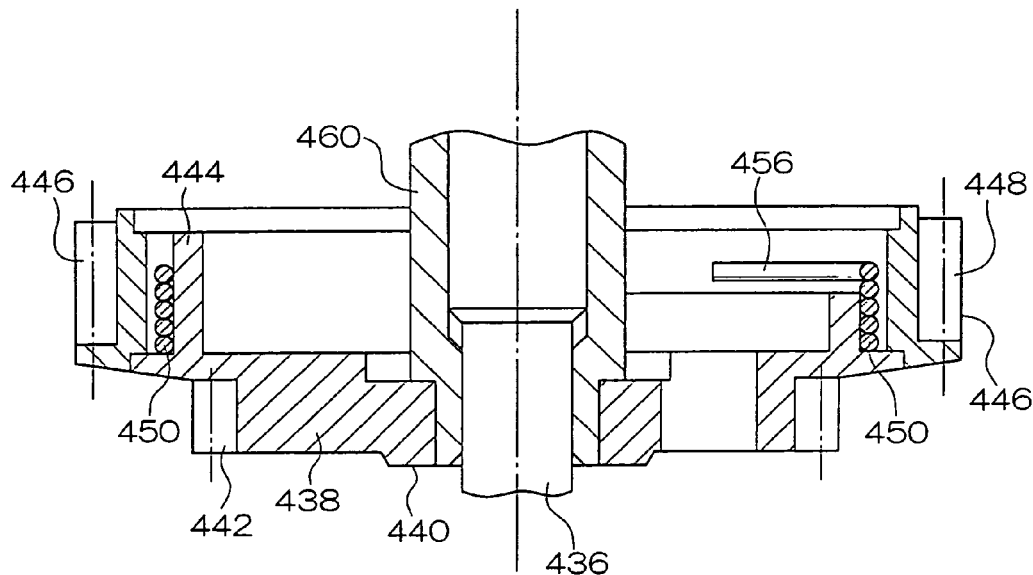
FIG. 34A is a plan sectional view showing partial structure of the reverse driving force transmission mechanism of FIG. 26, which shows the usual state of the clutch spring.
Figure 34B:
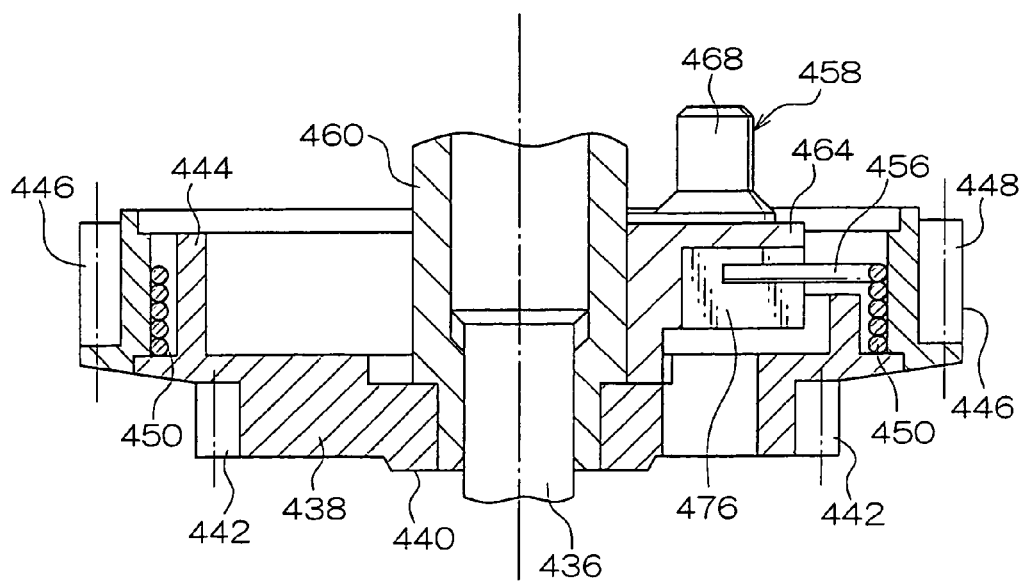
FIG. 34B is a plan sectional view showing the state in which the outer radius dimension of the clutch spring of FIG. 34A has been enlarged.

Further, when the outer radius dimension of the clutch spring 450 thus becomes larger, as shown in FIGS. 34A and 34B, the outer peripheral portion of the clutch spring 450 is caused to press against the inner peripheral face of the clutch gear 446. In this state, a predetermined friction force is generated between the outer peripheral portion of the clutch spring 450 and the inner peripheral face of the clutch gear 446. In consequence, the clutch spring 450 and the clutch gear 446 are integrally coupled by this friction force.

On the other hand, as is shown in FIGS. 30 to 32, the weight 478 and the weight 480 are provided at the axial direction other side of the base 428 (the side thereof that is opposite from the side at which the rotor 438 is disposed). The weights 478 and 480 are each formed in a substantially semi-circular plate form. These two weights 478 and 480 are formed with equal weights, and are disposed at opposite sides from one another along the circumferential direction of the main body portion 430 (sides which are opposite by 180°). Circular bearing holes 482 and 484 are formed at circumferential direction one end sides of the two weights 478 and 480. Cylindrical support shafts 486 and 488, which are provided protruding from the main body portion 430 of the base 428, rotatably fit into the bearing holes 482 and 484. Thus, the weights 478 and 480 are supported at the base 428 to be rotatable about the support shafts 486 and 488 (the bearing holes 482 and 484), respectively, in radial directions of the base 428.

Figure 35A:
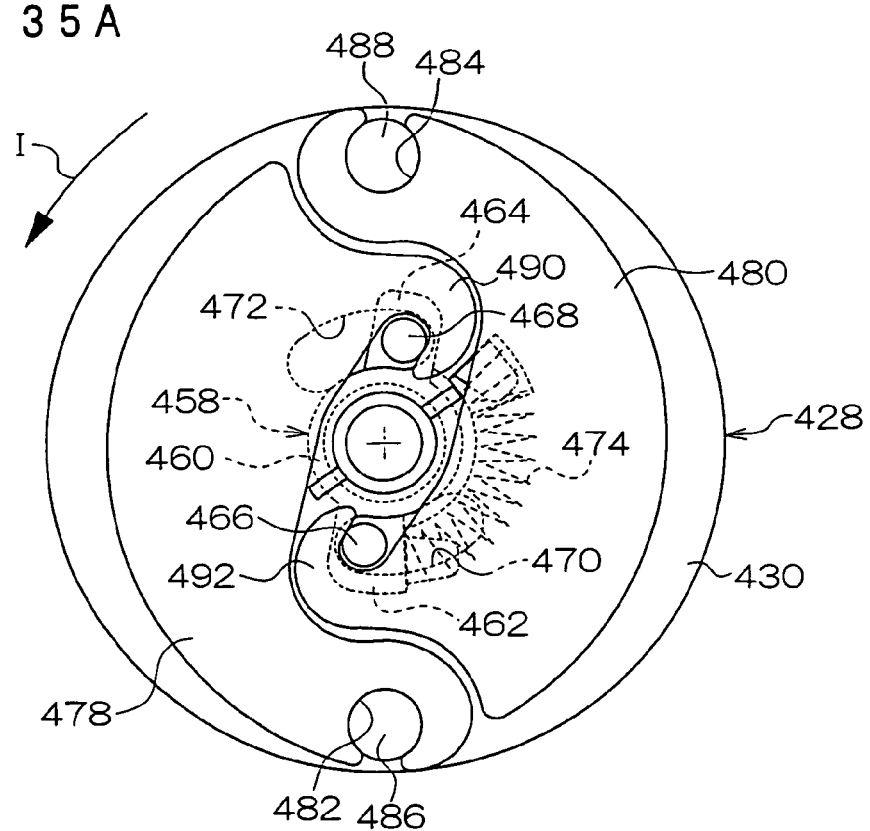
FIG. 35A is a side view showing partial structure of the reverse driving force transmission mechanism of FIG. 33A, which shows a state in which a pair of weights are retained at a radial direction inner side of a base.

The one weight 478 is provided with a substantially 'U'-shaped engaging pawl 490, which engages with the above-mentioned coupling protrusion 468 of the lever 458. Further, the other weight 480 is provided with a substantially 'U'-shaped engaging pawl 492, which similarly engages with the coupling protrusion 466 of the lever 458. Thus, the weight 478 and the weight 480 are synchronized (interlocked) via the lever 458. Usually, as shown in FIG. 35A, the weight 478 and the weight 480 are retained at radial direction inner sides relative to the base 428 by the urging force of the return spring 474 acting on the lever 458.

Further, as shown in FIGS. 30 to 32, a disc-form spacer 494 is disposed at a side of the pair of weights 478 and 480 that is opposite from the side thereof at which the base 428 is disposed. This spacer 494 prevents the pair of weights 478 and 480 from falling off the base 428, and prevents the pair of weights 478 and 480 from interfering with the base wall of the second accommodation portion 404 of the case main body 408.

Now, in this second clutch 426, when the rotor 438 rotates the one way about the axis thereof (in the direction of arrow I in FIGS. 30 and 31), the base 428, which is integrally coupled with the rotor 438, rotates the one way about the axis thereof together with the rotor 438. Consequently, the weight 478 and the weight 480, which are supported at the base 428, rotate about the axis of the base 428 to follow the base 428. At such a time, centrifugal force acts on the pair of weights 478 and 480. Thus, a rotary torque about the support shaft 486 acts on the weight 478, and a rotary torque about the support shaft 488 acts on the weight 480.

Figure 35B:
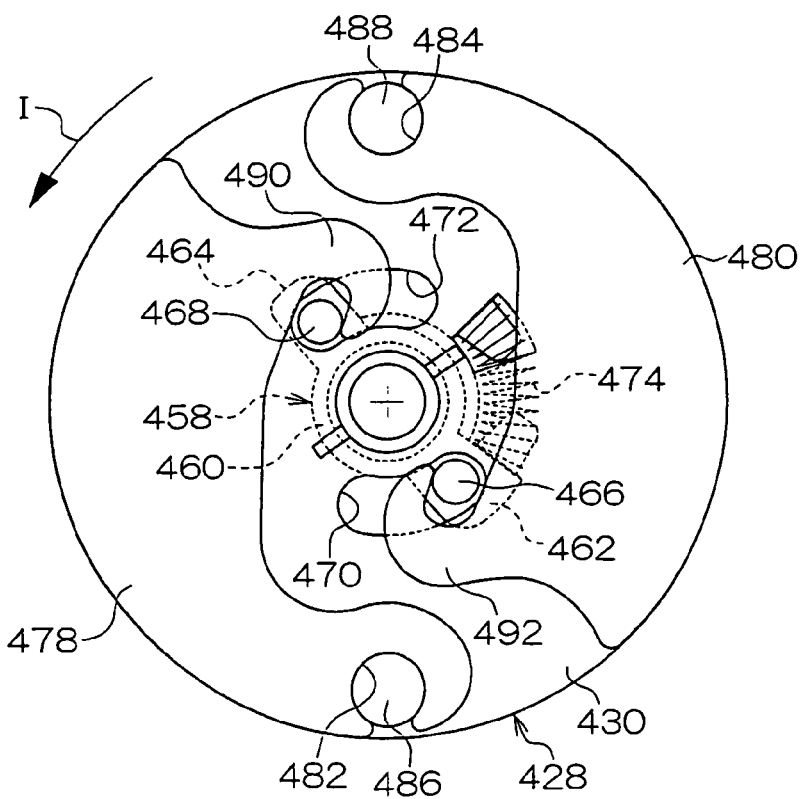
FIG. 35B is a side view showing a state in which the pair of weights of FIG. 35A have moved to a radial direction outer side of the base.

Hence, if a magnitude of these rotary torques is equal to or greater than a predetermined value, that is, if a speed of rotation of the pair of weights 478 and 480 is equal to or greater than a predetermined value, the weight 478 and the weight 480 turn about the support shaft 486 and the support shaft 488 towards radial direction outer sides relative to the base 428, as shown in FIG. 35, in opposition to the urging force of the return spring 474 that acts on the lever 458. As a result, the lever 458, of which the coupling protrusion 468 is engaged with the engaging pawl 490 of the weight 478 and the coupling protrusion 466 is engaged with the engaging pawl 492 of the weight 480, turns the other way about the axis relative to the base 428 (in the direction of arrow I in FIGS. 33A and 33B).

At the second clutch 426 with the structure described above, rotary force of the output shaft 68 of the motor 66 is transmitted through the gears 72 and 74, the worm shaft 424, the worm gear 422 and the output-splitting gear 414 to the rotor 438. At such a time, if the output shaft 68 of the motor 66 is turning in the forward direction (the direction of arrow C in FIG. 26), the rotor 438 turns together with the base 428 in an other direction around the axis thereof (the direction of arrow J in FIG. 26), but if the output shaft 68 of the motor 66 is turning in the reverse direction (the direction of arrow D in FIG. 26), the rotor 438 turns together with the base 428 in one direction about the axis thereof (the direction of arrow I in FIG. 26).

Further, an overall reduction ratio of the worm gear 422, the worm wheel portion 418 of the output-splitting gear 414, the cog portion 416 of the output-splitting gear 414, the outward teeth 442 of the rotor 438, the outward teeth 448 of the clutch gear 446 and the outward teeth 44 of the barrel drum 412 (i.e., the reverse driving force transmission mechanism) is set significantly lower than a reduction ratio of the worm gear 422 and the worm wheel 96 (i.e., the forward driving force transmission mechanism).

Furthermore, this second clutch 426 is a structure which is integrally accommodated inside the single case 402 (the case main body 408 and the cover 410), together with the barrel drum 412 and the output-splitting gear 414, to all together form a unit. Further, this case 402 is a structure which is removably assembled to the leg piece 16 of the frame 12 by unillustrated screws or the like. Moreover, a ring-form packing 496 is disposed around the through-hole 411 between the cover 410 of the case 402 and the leg piece 16 of the frame 12. Thus, in this structure, the interior of the case 402 is sealed off by this packing 496.

Next, operation of this fourth embodiment will be described.

Operations and effects basically similar to those of the motorized retractor 10 relating to the first embodiment, the motorized retractor 200 relating to the second embodiment and the motorized retractor 300 relating to the third embodiment are realized with the motorized retractor 400 with the structure described above.

Specifically, when a vehicle occupant releases application of the webbing 28 (i.e., disengages the tongue plate from the buckle device), the output shaft 68 of the motor 66 is abruptly rotated in the reverse direction. This abrupt rotation of the output shaft 68 in the reverse direction is transmitted to the worm shaft 424 via the gears 72 and 74, and the worm gear 422 is abruptly rotated.

The abrupt rotation of the worm gear 422 is transmitted to the rotor 438 of the second clutch 426 via the output-splitting gear 414, and the rotor 438 rotates in the one direction about the axis thereof (the direction of arrow I in FIGS. 30 and 31) with a speed of rotation of at least a predetermined value. Consequently, the base 428, which is integrally coupled with the rotor 438, rotates in the one direction about the axis thereof with a speed of rotation of at least a predetermined value.

The rotation of the base 428 is transmitted via the support shaft 486 and the bearing hole 482 to the weight 478 and is transmitted via the support shaft 488 and the bearing hole 484 to the weight 480. Thus, the weight 478 and the weight 480 are rotated about the axis of the base 428 to follow the base 428 with a speed of rotation of at least a predetermined value. As a result, centrifugal forces act on the weights 478 and 480, and the weights 478 and 480 rotate about the support shafts 486 and 488 toward the radial direction outer side of the base 428, in opposition to the urging force of the return spring 474 that acts on the lever 458.

Consequently, the lever 458, at which the coupling protrusion 468 is engaged with the engaging pawl 490 of the weight 478 and the coupling protrusion 466 is engaged with the engaging pawl 492 of the weight 480, is turned, relative to the base 428, in the other direction about the axis (the direction of arrow I in FIGS. 33A and 33B).

When the lever 458 turns in the other direction about the axis with respect to the base 428, the movement portion 456 of the clutch spring 450 is moved the one way in the coiling direction of the clutch spring 450 (in the direction of arrow I in FIGS. 33A and 33B) by the lever 458. As a result, the outer radius dimension of the clutch spring 450 becomes larger, and the outer peripheral portion of the clutch spring 450 closely contacts the inner peripheral face of the clutch gear 446. Hence, rotation of the clutch spring 450 is transmitted to the clutch gear 446, and the clutch gear 446 rotates in the one direction about the axis thereof. Because the outward teeth 44 of the barrel drum 412 are meshed with the outward teeth 448 of the clutch gear 446, the barrel drum 412 rotates in the winding direction, and thus the spool 20 rotates in the winding direction. Inadequacy of the urging force of the spiral spring 52 is compensated for by this rotation of the spool 20, and the webbing 28 is wound up and accommodated in the layered form at the spool 20 (the "winding-assistance mechanism").

Moreover, at this time, similarly to the motorized retractor 10 relating to the first embodiment, the motorized retractor 200 relating to the second embodiment and the motorized retractor 300 relating to the third embodiment, the spool 20 is rotated with a low torque, and thus it is possible to wind up and accommodate the webbing 28 at the spool 20 safely.

When the webbing 28 is completely wound up onto the spool 20, electricity supply to the motor 66 is cut off, and the rotation of the output shaft 68 of the motor 66 stops. Consequently, the rotation of the rotor 438 stops, and the rotation of the base 428 which is integrally coupled to the rotor 438 also stops.

When the rotation of the base 428 stops, the weight 478 and the weight 480 are turned toward the radial direction inner side of the base 428 by a resilient force of the clutch spring 450 and the resilient force of the return spring 474 acting on the lever 458. Consequently, the clutch spring 450 twists back to the relaxed state thereof, the outer peripheral portion thereof separates from the inner peripheral face of the clutch gear 446, and the above-described coupling of the clutch spring 450 with the clutch gear 446 is immediately released. Thus, the coupling of the spool 20 with the output shaft 68 of the motor 66 by the second clutch 426 is cancelled, and it is possible for the webbing 28 that has been wound up on the spool 20 to be drawn out again.

Now, with this motorized retractor 400, when a distance to a forward obstacle from the vehicle is less than the predetermined value during running of the vehicle (in the state in which the webbing 28 is applied to an occupant), the output shaft 68 of the motor 66 turns in the forward direction and the spool 20 is turned, by the first clutch 94, in the winding direction with a high torque. Consequently, the webbing 28 is wound onto the spool 20, the slight looseness of the webbing 28 is eliminated, and restraining force on the body of the vehicle occupant from the webbing 28 is increased (the "pretensioner mechanism").

Furthermore, with this motorized retractor 400, in the state in which winding of the webbing 28 onto the spool 20 is being assisted by means of the reverse driving force transmission mechanism, if, for example, the webbing 28 is pulled out by a vehicle occupant's arm or the like and a load acts on the clutch gear 446 of the second clutch 426 via the spool 20 and the barrel drum 412, a force of relative rotation is generated between the clutch gear 446 and the clutch spring 450.

If this rotary force is greater than the frictional force that acts between the inner peripheral face of the clutch gear 446 and the outer peripheral portion of the clutch spring 450 (in other words, if the load that acts on the clutch gear 446 is equal to or greater than a predetermined value), the clutch gear 446 freely rotates relative to the clutch spring 450. Therefore, it is possible to prevent the spool 20 from being wound up strongly in a state in which the webbing 28 is interfering with a vehicle occupant or the like, it is possible to prevent excessive loads acting on components beyond the clutch gear 446 (i.e., structures toward the output shaft 68, such as the clutch spring 450, the rotor 438, the output-splitting gear 414, .the worm gear 422 and the like), and it is possible to avoid damage to the components, burn-out of the motor 66 and the like.

As described above, the motorized retractor 400 relating to the fourth embodiment realizes effects basically similar to those of the motorized retractor 10 relating to the first embodiment, the motorized retractor 200 relating to the second embodiment and the motorized retractor 300 relating to the third embodiment, and it is possible to provide the mutually contrasting characteristics required for both the winding-assistance mechanism and the pretensioner mechanism with the single motor 66.

Furthermore, in the second clutch 426 of this motorized retractor 400, the weight 478 and the weight 480 are formed with the same weight, and are disposed at opposite sides (sides which are opposite by 180°) along the circumferential direction of the base 428. Therefore, the balance of weights is excellent and operations are stable.

Moreover, in this second clutch 426, the two weights 478 and 480 disposed at opposite sides (the sides which are opposite by 180°) along the circumferential direction of the base 428 are coupled by the lever 458, and this is a structure in which the centrifugal forces that act on the weight 478 and the weight 480 are combined by the lever 458 and transmitted to the clutch spring 450. Therefore, it is possible to obtain sufficient centrifugal force in a small space, and it is possible to specify a lower speed of rotation of the base 428 (and the rotor 438) for activation of the second clutch 426. As a result, noise at times of winding-assistance can be reduced.

Further again, in this motorized retractor 400, the worm gear 422 that structures the forward driving force transmission mechanism is lengthened along the axial direction, the lengthened portion thereof is meshed with a small worm wheel (the worm wheel portion 418 of the output-splitting gear 414) and the cog portion 416 which is provided integrally at the worm wheel portion 418 is meshed with the outward teeth 442 of the rotor 438, and this structure diverts output power from the motor 66 to the reverse driving force transmission mechanism. That is, the single output-splitting gear 414 meshes with both the worm gear 422 which structures the forward driving force transmission mechanism and the rotor 438 which structures the reverse driving force transmission mechanism, and splits the output of the motor 66. Thus, it is possible for the output-splitting structure to be simple and to achieve a reduction in size.

Further still, this motorized retractor 400 has a structure in which the structural members which structure the reverse driving force transmission mechanism (the barrel drum 412, the output-splitting gear 414 and the second clutch 426) are integrally accommodated in the case 402 and structured as a unit, and the worm wheel portion 418 of the output-splitting gear 414 alone is exposed through the cover 410 of the case 402 for meshing with the worm gear 422. That is, in this motorized retractor 400, the reverse driving force transmission mechanism is a structure in which all structural members subsequent to an output splitting point are formed as a sub-assembly. Therefore, it is possible to handle the reverse driving force transmission mechanism as a single component, and hence for assembly characteristics to be excellent and productivity to be improved.

Further yet, the motorized retractor 400 is a structure in which the interior of the case 402 is sealed off simply by attaching the ring-form packing 496 around the through-hole 411 of the cover 410 and assembling the case 402 to the leg piece 16. Thus, because it is possible to implement waterproofing at the case 402 simply, productivity is further improved.

As has been described above, with the motorized retractors relating to the embodiments of the present invention, it is possible to provide, with a single motor, the mutually contrasting capabilities required for both a winding-assistance mechanism and a pretensioner mechanism.

What is claimed is:

1. A motorized retractor comprising:
   a spool, around which a webbing for restraint of an occupant is wound;
   a motor capable of rotating in a forward direction and in a reverse direction, the motor including an output shaft;
   a forward driving force transmission mechanism provided between the spool and the output shaft of the motor, the forward driving force transmission mechanism reducing a forward direction rotation of the output shaft by a predetermined reduction ratio and transmitting the rotation to the spool for rotating the spool in a winding direction, and the forward driving force transmission mechanism blocking transmission of a rotation generated at the spool side thereof to the output shaft; and
   a reverse driving force transmission mechanism provided between the spool and the output shaft separately from the forward driving force transmission mechanism, the reverse driving force transmission mechanism reducing a reverse direction rotation of the output shaft by a reduction ratio which is lower than the predetermined reduction ratio of the forward driving force transmission mechanism, and transmitting the rotation to the spool for rotating the spool in the winding direction, and the reverse driving force transmission mechanism blocking transmission of a rotation generated at the spool side thereof to the output shaft, wherein the reverse driving force transmission mechanism comprises:

a base which is capable of rotation about an axis thereof;

a rotor which is integrally coupled with the base and connected with the output shaft of the motor, rotation of the output shaft being transmitted to the rotor for rotating the rotor;

a clutch gear which is provided to be relatively rotatable with respect to the rotor and which is connected with the spool, the clutch gear being capable of rotating the spool;

a clutch spring provided to be coaxial and relatively rotatable with respect to the clutch gear, a coiling direction one end portion of the clutch spring being coupled with the rotor, and, due to a coiling direction other end portion of the clutch spring moving to one way in the coiling direction, an outer radius dimension of the clutch spring being enlarged for engaging the clutch spring with the clutch gear and causing the clutch gear to rotate integrally with the rotor;

a lever provided to be rotatable relative to the base about the axis thereof, the lever being continuously urged one way about the axis of the base, the lever being engaged with the coiling direction other end portion of the clutch spring, and, due to the lever turning to another way about the axis of the base, the lever causing the coiling direction other end portion of the clutch spring to move to the one way in the coiling direction; and a plurality of weights supported at the base to be movable in respective radial directions of the base, the plurality of weights being coupled with the lever, the plurality of weights being retained at inner sides in the radial directions of the base by the lever, and, at a time of rotation of the base by reverse direction rotation of the output shaft, the plurality of weights being moved toward respective outer sides in the radial directions of the base by centrifugal forces which act on the plurality of weights, and causing the lever to turn to the other way about the axis of the base.

2. The motorized retractor of claim 1, wherein the forward driving force transmission mechanism includes a worm gear connected with the output shaft of the motor, rotation of the output shaft being transmitted to the worm gear for rotating the worm gear, and the reverse driving force transmission mechanism includes a worm wheel portion, which meshes with the worm gear, and an output-splitting gear which is provided to be coaxial and integral with respect to the worm wheel portion, the output-splitting gear including a cog portion which meshes with outward teeth which are formed at the rotor.

3. The motorized retractor of claim 2, further comprising a case, wherein the reverse driving force transmission mechanism is formed as a unit in which the base, the rotor, the clutch gear, the clutch spring, the lever, the plurality of weights and the output-splitting gear are accommodated all together in the case, and the worm wheel portion of the output-splitting gear is exposed from the case for meshing with the worm gear.

4. The motorized retractor of claim 1, wherein, each of the plurality of weights is supported at a shaft of the base at one end and each another end of the plurality of weights engages with the lever, the plurality of weights being turned, by the centrifugal forces which act on the plurality of weights at the time of rotation of the base, about the shafts toward the outer sides in the radial directions of the base for causing the lever to move the other way about the axis of the base.

* * * * *